(12) United States Patent
Faccin et al.

(10) Patent No.: US 10,645,746 B2
(45) Date of Patent: *May 5, 2020

(54) MECHANISMS FOR ESTABLISHING USER PLANE CONNECTIVITY FOR NON-3GPP ACCESS

(71) Applicant: QUALCOMM Incorporated, San Diego, CA (US)

(72) Inventors: Stefano Faccin, San Ysidro, CA (US); Miguel Griot, La Jolla, CA (US); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/411,442

(22) Filed: May 14, 2019

(65) Prior Publication Data

US 2019/0268960 A1 Aug. 29, 2019

Related U.S. Application Data

(63) Continuation of application No. 15/884,613, filed on Jan. 31, 2018, now Pat. No. 10,327,278.

(Continued)

(51) Int. Cl.
*H04W 76/18* (2018.01)
*H04W 68/00* (2009.01)
(Continued)

(52) U.S. Cl.
CPC ......... *H04W 76/18* (2018.02); *H04W 68/005* (2013.01); *H04W 68/12* (2013.01); *H04W 76/16* (2018.02)

(58) Field of Classification Search
CPC .... H04W 76/18; H04W 68/005; H04W 68/12
See application file for complete search history.

(56) References Cited

U.S. PATENT DOCUMENTS

| 2013/0016696 A1 | 1/2013 | Adjakple et al. |
| 2014/0194111 A1 | 7/2014 | Aso et al. |

(Continued)

FOREIGN PATENT DOCUMENTS

WO WO2013059392 A1 4/2013

OTHER PUBLICATIONS

Huawei Hisilicon: "Network-Initiated Service Request for Non-3GPP Access", 3GPP Draft; S2-172036_23.502_NW-Initiated Service Request, 3rd Generation Partnership Project (3GPP), Mobile Competence Centre; 650, Route Des Lucioles; F-06921 Sophia Antipolis Cedex; France, vol. SA WG2, No. Susan, South Korea; 20170327-20170331, Mar. 21, 2017 (Mar. 21, 2017), XP051257609, 4 pages, Retrieved from the Internet: URL:http://www.3gpp.org/ftp/tsg_sa/WG2_Arch/TSGS2_120_Busan/Docs/ [retrieved on Mar. 21, 2017].

(Continued)

*Primary Examiner* — Ernest G Tacsik
(74) *Attorney, Agent, or Firm* — Holland & Hart LLP

(57) ABSTRACT

Methods, systems, and devices for wireless communication are described. A wireless device transmits an indication of whether the device should be paged over a 3GPP access when a core network has data ready to transmit for PDU sessions over a non-3GPP access. A session management function (SMF) of the core network receives a data notification indicating that the core network has data ready to transmit to the wireless device for a PDU session over the non-3GPP access. The SMF determines whether to transmit a paging request to an access and mobility management function (AMF) of the core network based on a paging state (Continued)

of the SMG, a paging state of the wireless device, or a connection management idleness state of the wireless device. The AMF determines whether to transmit a paging message to the wireless device.

28 Claims, 27 Drawing Sheets

Related U.S. Application Data

(60) Provisional application No. 62/476,429, filed on Mar. 24, 2017.

(51) Int. Cl.
*H04W 68/12* (2009.01)
*H04W 76/16* (2018.01)

(56) References Cited

U.S. PATENT DOCUMENTS

| | | |
|---|---|---|
| 2016/0057729 A1 | 2/2016 | Horn et al. |
| 2016/0135231 A1 | 5/2016 | Lee et al. |
| 2016/0198400 A1 | 7/2016 | Cho et al. |
| 2016/0227597 A1 | 8/2016 | Cho et al. |
| 2018/0279400 A1 | 9/2018 | Faccin et al. |

OTHER PUBLICATIONS

International Search Report and Written Opinion—PCT/US2018/016479—ISA/EPO—Apr. 18, 2018.
Qualcomm Incorporated et al., "TS 23.501: PDU Session Management for Non 3GPP and UE Reachability", 3GPP Draft; S2-171704-N3GPP UE_REACHABILITY V2, 3rd Generation Partnership Project (3GPP), Mobile Competence Centre; 650, Route Des Lucioles; F-06921 Sophia-Antipolis Cedex; France, vol. SA WG2, No. Susan, South Korea; 20170327-20170331, Mar. 21, 2017 (Mar. 21, 2017), 2 pages, XP051257306, Retrieved from the Internet: URL:http://www.3gpp.org/ftp/tsg_sa/WG2_Arch/TSGS2_120_Busan/Docs/ [retrieved on Mar. 21, 2017].

MECHANISMS FOR ESTABLISHING USER PLANE CONNECTIVITY FOR NON-3GPP ACCESS

CROSS REFERENCES

The present application for patent is a Continuation application of U.S. patent application Ser. No. 15/884,613 by Faccin et al., entitled "Mechanisms For Establishing User Plane Connectivity For Non-3GPP Access" filed Jan. 31, 2018, which claims priority to U.S. Provisional Patent Application No. 62/476,429 by Faccin et al., entitled "Mechanisms For Establishing User Plane Connectivity For Non-3GPP Access," filed Mar. 24, 2017, assigned to the assignee hereof.

INTRODUCTION

The following relates generally to wireless communication, and more specifically to mechanisms for establishing user plane connectivity for non-3GPP access.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communication systems, a UE may be capable of communicating with a core network over a first radio access technology (e.g., a 3GPP access such as 5G) and a second radio access technology (e.g., a non-3GPP access such as Wi-Fi via a wireless local area network). Each radio access technology is associated with a connection management (CM) state, which may be a CM idle state or a CM connected state.

SUMMARY

A method of wireless communication is described. The method may include determining, by a wireless device, whether paging is permitted for a protocol data unit (PDU) session over a first radio access technology (RAT) when the wireless device is in a connection management (CM) idle state over the first RAT and transmitting a session establishment message to a receiving device in a communications network, the session establishment message comprising an indicator of whether paging is permitted for the PDU session over the first RAT when the wireless device is in a CM idle state over the first RAT.

An apparatus for wireless communication is described. The apparatus may include means for determining, by a wireless device, whether paging is permitted for a protocol data unit PDU session over a first RAT when the wireless device is in a CM idle state over the first RAT and means for transmitting a session establishment message to a receiving device in a communications network, the session establishment message comprising an indicator of whether paging is permitted for the PDU session over the first RAT when the wireless device is in a CM idle state over the first RAT.

Another apparatus for wireless communication is described. The apparatus may include a processor, memory in electronic communication with the processor, and instructions stored in the memory. The instructions may be operable to cause the processor to determine, by a wireless device, whether paging is permitted for a PDU session over a first RAT when the wireless device is in a CM idle state over the first RAT and transmit a session establishment message to a receiving device in a communications network, the session establishment message comprising an indicator of whether paging is permitted for the PDU session over the first RAT when the wireless device is in a CM idle state over the first RAT.

A non-transitory computer readable medium for wireless communication is described. The non-transitory computer-readable medium may include instructions operable to cause a processor to determine, by a wireless device, whether paging is permitted for a PDU session over a first RAT when the wireless device is in a CM idle state over the first RAT and transmit a session establishment message to a receiving device in a communications network, the session establishment message comprising an indicator of whether paging is permitted for the PDU session over the first RAT when the wireless device is in a CM idle state over the first RAT.

Some examples of the method, apparatus, and non-transitory computer-readable medium described above may further include processes, features, means, or instructions for transmitting a modification request comprising a second indicator that indicates whether paging may be permitted for a PDU session over the first RAT when the wireless device may be in CM idle mode.

Some examples of the method, apparatus, and non-transitory computer-readable medium described above may further include processes, features, means, or instructions for receiving a paging request over a second RAT when the indicator indicates that paging may be permitted for the PDU session over the first RAT. Some examples of the method, apparatus, and non-transitory computer-readable medium described above may further include processes, features, means, or instructions for determining that the PDU session may be to be established over the first RAT.

Some examples of the method, apparatus, and non-transitory computer-readable medium described above may further include processes, features, means, or instructions for transmitting a modification request comprising a second indicator that indicates that paging may be not permitted for the PDU session over the first RAT.

In some examples of the method, apparatus, and non-transitory computer-readable medium described above, the first RAT may be a non-3GPP access and the second RAT may be a 3GPP access.

In some examples of the method, apparatus, and non-transitory computer-readable medium described above, the session establishment message comprises a session establishment message for a communication session over the first RAT.

In some examples of the method, apparatus, and non-transitory computer-readable medium described above, the session establishment message comprises a session establishment message for a communication session over the second RAT.

In some examples of the method, apparatus, and non-transitory computer-readable medium described above, the receiving device comprises an access and mobility management function (AMF) module.

In some examples of the method, apparatus, and non-transitory computer-readable medium described above, the receiving device comprises a session management function (SMF) module.

In some examples of the method, apparatus, and non-transitory computer-readable medium described above, the indication may be included in non-access stratum (NAS) signaling.

In some examples of the method, apparatus, and non-transitory computer-readable medium described above, the first RAT comprises a non-3GPP access.

A method of wireless communication is described. The method may include receiving, at a wireless device in a CM idle state for both a first RAT and a second RAT, a paging request over the first RAT and initiating a user plane establishment procedure in response to the paging request.

An apparatus for wireless communication is described. The apparatus may include means for receiving, at a wireless device in a CM idle state for both a first RAT and a second RAT, a paging request over the first RAT and means for initiating a user plane establishment procedure in response to the paging request.

Another apparatus for wireless communication is described. The apparatus may include a processor, memory in electronic communication with the processor, and instructions stored in the memory. The instructions may be operable to cause the processor to receive, at a wireless device in a CM idle state for both a first RAT and a second RAT, a paging request over the first RAT and initiate a user plane establishment procedure in response to the paging request.

A non-transitory computer readable medium for wireless communication is described. The non-transitory computer-readable medium may include instructions operable to cause a processor to receive, at a wireless device in a CM idle state for both a first RAT and a second RAT, a paging request over the first RAT and initiate a user plane establishment procedure in response to the paging request.

In some examples of the method, apparatus, and non-transitory computer-readable medium described above, initiating the user place establishment procedure comprises: transmitting a service request over the first RAT, the service request comprising a list of PDU sessions for which a user plane cannot be established over the first RAT.

In some examples of the method, apparatus, and non-transitory computer-readable medium described above, the list of PDU sessions may be generated based at least in part on policies associated with each of the PDU sessions.

In some examples of the method, apparatus, and non-transitory computer-readable medium described above, the list of PDU sessions comprises PDU sessions that may be active over the second RAT.

Some examples of the method, apparatus, and non-transitory computer-readable medium described above may further include processes, features, means, or instructions for receiving downlink data over the first RAT.

In some examples of the method, apparatus, and non-transitory computer-readable medium described above, the downlink data comprises downlink data associated with at least one PDU session that was not included on the list of PDU sessions.

Some examples of the method, apparatus, and non-transitory computer-readable medium described above may further include processes, features, means, or instructions for receiving a service reject message when the list includes all PDU sessions for which downlink data may be available.

Some examples of the method, apparatus, and non-transitory computer-readable medium described above may further include processes, features, means, or instructions for initiating the user plane establishment procedure over the second RAT.

Some examples of the method, apparatus, and non-transitory computer-readable medium described above may further include processes, features, means, or instructions for receiving downlink data over the second RAT.

Some examples of the method, apparatus, and non-transitory computer-readable medium described above may further include processes, features, means, or instructions for determining whether access to the second RAT may be available.

Some examples of the method, apparatus, and non-transitory computer-readable medium described above may further include processes, features, means, or instructions for transmitting the list of PDU sessions for which a user plane cannot be established over the first RAT comprises all PDU sessions active over the second RAT when the second RAT may be not available.

Some examples of the method, apparatus, and non-transitory computer-readable medium described above may further include processes, features, means, or instructions for initiating the user plane establishment procedure comprises transmitting a service request, the service request comprising an indicator of whether paging may be permitted for the PDU session over the second RAT when the wireless device may be in a CM idle state over the second RAT.

Some examples of the method, apparatus, and non-transitory computer-readable medium described above may further include processes, features, means, or instructions for initiating the user plane establishment procedure comprises transmitting a service request, the service request comprising a cause code indicating that the wireless device may be not pageable.

In some examples of the method, apparatus, and non-transitory computer-readable medium described above, receiving the paging request comprises: receiving the paging request comprises receiving an access type identifier that identifies at least one RAT type corresponding to the PDU sessions for which the paging request may be transmitted.

In some examples of the method, apparatus, and non-transitory computer-readable medium described above, the access type identifier identifies the first RAT.

In some examples of the method, apparatus, and non-transitory computer-readable medium described above, the access type identifier identifies the second RAT.

In some examples of the method, apparatus, and non-transitory computer-readable medium described above, the access type identifier identifies both the first RAT and the second RAT.

In some examples of the method, apparatus, and non-transitory computer-readable medium described above, the user plane establishment procedure may be initiated over the first RAT when the access type identifier identifies the first RAT.

In some examples of the method, apparatus, and non-transitory computer-readable medium described above, the user plane establishment procedure may be initiated over the second RAT when the access type identifier identifies the second RAT.

In some examples of the method, apparatus, and non-transitory computer-readable medium described above, initiating the user plane establishment procedure comprises: transmitting a service request comprising a response indicator that indicates that the service request may be being transmitted in response to the paging request.

In some examples of the method, apparatus, and non-transitory computer-readable medium described above, initiating the user plane establishment procedure over the second RAT comprises: transmitting a registration request over the second RAT, the registration request comprising a user plane establishment request indicator that indicates that a NAS procedure may be a user plane establishment procedure and a list of PDU session identifiers that identify each PDU session for which a user plane may be to be re-established.

In some examples of the method, apparatus, and non-transitory computer-readable medium described above, initiating the user plane establishment procedure over the second RAT comprises: performing a registration procedure over the second RAT, wherein performing the registration procedure comprises identifying each PDU session for which a user plane may be to be re-established.

Some examples of the method, apparatus, and non-transitory computer-readable medium described above may further include processes, features, means, or instructions for determining that a user plane cannot be established for any PDU session over the second RAT when the access type identifier indicates that the paging request relates to a PDU session over the second RAT.

In some examples of the method, apparatus, and non-transitory computer-readable medium described above, initiating the user plane establishment procedure comprises: transmitting a message over the first RAT, the message indicating that a user plane for the PDU sessions cannot be established.

In some examples of the method, apparatus, and non-transitory computer-readable medium described above, initiating the user plane establishment procedure comprises: initiating the user plane establishment procedure over the first RAT and the second RAT when the access type identifier identifies both the first RAT and the second RAT.

In some examples of the method, apparatus, and non-transitory computer-readable medium described above, the first RAT may be a 3GPP access and the second RAT may be a non-3GPP access.

A method of wireless communication is described. The method may include receiving, at a first network device, a notification that there is data to be delivered to a wireless device for a PDU session and determining whether to transmit a paging request to a second network device, based at least in part on a paging state of the first network device, a paging state of the wireless device, a CM idleness state of the wireless device, or a combination thereof.

An apparatus for wireless communication is described. The apparatus may include means for receiving, at a first network device, a notification that there is data to be delivered to a wireless device for a PDU session and means for determining whether to transmit a paging request to a second network device, based at least in part on a paging state of the first network device, a paging state of the wireless device, a CM idleness state of the wireless device, or a combination thereof.

Another apparatus for wireless communication is described. The apparatus may include a processor, memory in electronic communication with the processor, and instructions stored in the memory. The instructions may be operable to cause the processor to receive, at a first network device, a notification that there is data to be delivered to a wireless device for a PDU session and determine whether to transmit a paging request to a second network device, based at least in part on a paging state of the first network device, a paging state of the wireless device, a CM idleness state of the wireless device, or a combination thereof.

A non-transitory computer readable medium for wireless communication is described. The non-transitory computer-readable medium may include instructions operable to cause a processor to receive, at a first network device, a notification that there is data to be delivered to a wireless device for a PDU session and determine whether to transmit a paging request to a second network device, based at least in part on a paging state of the first network device, a paging state of the wireless device, a CM idleness state of the wireless device, or a combination thereof.

In some examples of the method, apparatus, and non-transitory computer-readable medium described above, determining whether to transmit the paging request comprises: determining that the paging state of the first network device may be a no paging state. Some examples of the method, apparatus, and non-transitory computer-readable medium described above may further include processes, features, means, or instructions for determining not to transmit the paging request to the second network device based at least in part on determining that the first network device may be in the no paging state.

In some examples of the method, apparatus, and non-transitory computer-readable medium described above, determining whether to transmit the paging request comprises: determining that the paging state of the wireless device may be a paging prohibited state. Some examples of the method, apparatus, and non-transitory computer-readable medium described above may further include processes, features, means, or instructions for determining that the CM idleness state of the wireless device may be a CM idle state. Some examples of the method, apparatus, and non-transitory computer-readable medium described above may further include processes, features, means, or instructions for determining not to transmit the paging request to the second network device based at least in part on determining that the wireless device may be in the paging prohibited state and the wireless device may be in the CM idle state.

In some examples of the method, apparatus, and non-transitory computer-readable medium described above, determining that the paging state of the wireless device may be the paging prohibited state comprises: determining that a subscription profile for the wireless device indicates that the wireless device may be in the paging prohibited state.

Some examples of the method, apparatus, and non-transitory computer-readable medium described above may further include processes, features, means, or instructions for receiving a no paging indication from the wireless device prior to determining that the paging state of the wireless device may be the paging prohibited state.

In some examples of the method, apparatus, and non-transitory computer-readable medium described above, the first network device determines that the paging state of the wireless device may be the paging prohibited station based at least in part on the no paging indication.

Some examples of the method, apparatus, and non-transitory computer-readable medium described above may further include processes, features, means, or instructions for setting the paging state of the first network device to a no paging state.

In some examples of the method, apparatus, and non-transitory computer-readable medium described above, determining whether to transmit the paging request comprises: determining that the paging state of the wireless device may be a paging prohibited state. Some examples of the method, apparatus, and non-transitory computer-readable medium described above may further include processes, features, means, or instructions for determining that the CM idleness state of the wireless device may be unknown. Some examples of the method, apparatus, and non-transitory computer-readable medium described above may further include processes, features, means, or instructions for determining to transmit the paging request to the second network device based at least in part on determining that the CM idleness state of the wireless device may be unknown. Some examples of the method, apparatus, and non-transitory computer-readable medium described above may further include processes, features, means, or instructions for transmitting the paging request to the second network device, the paging request comprising an indication that the wireless device may be in the paging prohibited state.

Some examples of the method, apparatus, and non-transitory computer-readable medium described above may further include processes, features, means, or instructions for receiving, from the second network device, a paging request rejection.

In some examples of the method, apparatus, and non-transitory computer-readable medium described above, the paging request rejection indicates that the wireless device may be not able to be paged.

In some examples of the method, apparatus, and non-transitory computer-readable medium described above, the paging request rejection indicates that user plane resources cannot be established.

Some examples of the method, apparatus, and non-transitory computer-readable medium described above may further include processes, features, means, or instructions for setting the paging state of the first network device to a no paging state.

In some examples of the method, apparatus, and non-transitory computer-readable medium described above, determining whether to transmit the paging request comprises: determining that the paging state of the wireless device may be unknown. Some examples of the method, apparatus, and non-transitory computer-readable medium described above may further include processes, features, means, or instructions for determining to transmit the paging request to the second network device based at least in part on determining that the paging state of the wireless device may be unknown.

Some examples of the method, apparatus, and non-transitory computer-readable medium described above may further include processes, features, means, or instructions for transmitting the paging request to the second network device. Some examples of the method, apparatus, and non-transitory computer-readable medium described above may further include processes, features, means, or instructions for receiving a paging request rejection in response to the paging request.

In some examples of the method, apparatus, and non-transitory computer-readable medium described above, the paging request rejection indicates that the wireless device may be not able to be paged.

In some examples of the method, apparatus, and non-transitory computer-readable medium described above, the paging request rejection indicates that user plane resources cannot be established.

Some examples of the method, apparatus, and non-transitory computer-readable medium described above may further include processes, features, means, or instructions for setting the paging state of the first network device to a no paging state.

Some examples of the method, apparatus, and non-transitory computer-readable medium described above may further include processes, features, means, or instructions for determining whether to set the paging state of the network device to a no paging state.

In some examples of the method, apparatus, and non-transitory computer-readable medium described above, determining whether to set the paging state of the network device to the no paging state comprises: receiving a no paging indication from the wireless device. Some examples of the method, apparatus, and non-transitory computer-readable medium described above may further include processes, features, means, or instructions for determining whether to set the paging state of the first network device to the no paging state based at least in part on the no paging indication.

Some examples of the method, apparatus, and non-transitory computer-readable medium described above may further include processes, features, means, or instructions for determining whether to set the paging state of the first network device to the no paging state based at least in part on the CM idleness state of the wireless device.

Some examples of the method, apparatus, and non-transitory computer-readable medium described above may further include processes, features, means, or instructions for setting the paging state of the first network device to the no paging state.

Some examples of the method, apparatus, and non-transitory computer-readable medium described above may further include processes, features, means, or instructions for setting the paging state of the first network device to the no paging state comprises starting a timer.

Some examples of the method, apparatus, and non-transitory computer-readable medium described above may further include processes, features, means, or instructions for setting the paging state of the first network device to a paging permitted state when the timer expires.

Some examples of the method, apparatus, and non-transitory computer-readable medium described above may further include processes, features, means, or instructions for setting the paging state of the first network device to the no paging state comprises transmitting a message to a third network device to stop sending notifications to the first network device regarding data to be transmitted to the wireless device.

In some examples of the method, apparatus, and non-transitory computer-readable medium described above, the data comprises data to be transmitted to the wireless device over a first RAT.

Some examples of the method, apparatus, and non-transitory computer-readable medium described above may further include processes, features, means, or instructions for setting the paging state of the first network device to the no paging state comprises transmitting a message to a third network device to stop buffering of data to be transmitted to the wireless device.

In some examples of the method, apparatus, and non-transitory computer-readable medium described above, the data comprises data to be transmitted to the wireless device over a first RAT.

In some examples of the method, apparatus, and non-transitory computer-readable medium described above, the first RAT may be a non-3GPP access.

In some examples of the method, apparatus, and non-transitory computer-readable medium described above, the first network device comprises a session management function (SMF) module and the second network device comprises an access and mobility management function (AMF) module.

A method of wireless communication is described. The method may include receiving, at a first network device, a paging request related to data to be delivered to a wireless device for at least one PDU session over a first RAT and determining whether to transmit a paging message to the wireless device based at least in part on a paging state of the wireless device, an CM idleness state of the wireless device, or a combination thereof.

An apparatus for wireless communication is described. The apparatus may include means for receiving, at a first network device, a paging request related to data to be delivered to a wireless device for at least one PDU session over a first RAT and means for determining whether to transmit a paging message to the wireless device based at least in part on a paging state of the wireless device, an CM idleness state of the wireless device, or a combination thereof.

Another apparatus for wireless communication is described. The apparatus may include a processor, memory in electronic communication with the processor, and instructions stored in the memory. The instructions may be operable to cause the processor to receive, at a first network device, a paging request related to data to be delivered to a wireless device for at least one PDU session over a first RAT and determine whether to transmit a paging message to the wireless device based at least in part on a paging state of the wireless device, an CM idleness state of the wireless device, or a combination thereof.

A non-transitory computer readable medium for wireless communication is described. The non-transitory computer-readable medium may include instructions operable to cause a processor to receive, at a first network device, a paging request related to data to be delivered to a wireless device for at least one protocol data unit (PDU) session over a first RAT and determine whether to transmit a paging message to the wireless device based at least in part on a paging state of the wireless device, an CM idleness state of the wireless device, or a combination thereof.

In some examples of the method, apparatus, and non-transitory computer-readable medium described above, determining whether to transmit the paging message to the wireless device comprises: determining that the paging state of the wireless device may be a paging prohibited state. Some examples of the method, apparatus, and non-transitory computer-readable medium described above may further include processes, features, means, or instructions for determining that the CM idleness state of the wireless device may be a CM idle state. Some examples of the method, apparatus, and non-transitory computer-readable medium described above may further include processes, features, means, or instructions for determining not to transmit the paging message to the wireless device based at least in part on determining that the paging state of the wireless device may be a paging prohibited state and determining that the CM idleness state of the wireless device may be a CM idle state.

Some examples of the method, apparatus, and non-transitory computer-readable medium described above may further include processes, features, means, or instructions for determining that the paging state of the wireless device may be the paging prohibited state comprises receiving an indication that the paging state of the wireless device may be a paging prohibited state from the wireless device.

Some examples of the method, apparatus, and non-transitory computer-readable medium described above may further include processes, features, means, or instructions for determining that the paging state of the wireless device may be a paging prohibited state comprises receiving an indication that the paging state of the wireless device may be a paging prohibited state in the paging request.

In some examples of the method, apparatus, and non-transitory computer-readable medium described above, the paging request rejection comprises an indication that user plane resources cannot be established.

In some examples of the method, apparatus, and non-transitory computer-readable medium described above, the paging request rejection comprises an indication that the wireless device may be not pageable.

In some examples of the method, apparatus, and non-transitory computer-readable medium described above, the paging request rejection comprises an indication that user plane resources cannot be established.

In some examples of the method, apparatus, and non-transitory computer-readable medium described above, determining whether to transmit the paging request to the wireless device comprises: determining that the CM idleness state of the wireless device may be a CM idle state. Some examples of the method, apparatus, and non-transitory computer-readable medium described above may further include processes, features, means, or instructions for determining to transmit the paging message to the wireless device based at least in part on determining that the CM idleness state of the wireless device may be a CM idle state. Some examples of the method, apparatus, and non-transitory computer-readable medium described above may further include processes, features, means, or instructions for transmitting the paging message to the wireless device over a second RAT.

Some examples of the method, apparatus, and non-transitory computer-readable medium described above may further include processes, features, means, or instructions for receiving a user plane establishment request in response to the paging message over the second RAT. Some examples of the method, apparatus, and non-transitory computer-readable medium described above may further include processes, features, means, or instructions for transmitting the data to the wireless device over the second RAT.

Some examples of the method, apparatus, and non-transitory computer-readable medium described above may further include processes, features, means, or instructions for receiving a first user plane establishment request in response to the paging message over the second RAT, the first user plane establishment request comprising a list of PDU sessions that may be forbidden over the second RAT.

Some examples of the method, apparatus, and non-transitory computer-readable medium described above may further include processes, features, means, or instructions for transmitting a data message to the wireless device over the second RAT, the data message comprising data related to PDU sessions not included in the list of PDU sessions that may be forbidden over the second RAT.

Some examples of the method, apparatus, and non-transitory computer-readable medium described above may further include processes, features, means, or instructions for receiving a second user plane establishment request in response to the paging message over the first RAT. Some examples of the method, apparatus, and non-transitory computer-readable medium described above may further include processes, features, means, or instructions for transmitting a data message to the wireless device over the first RAT.

In some examples of the method, apparatus, and non-transitory computer-readable medium described above, the paging message comprises an access type identifier that indicates whether the paging message relates to a PDU session over the first RAT or a PDU session over the second RAT.

In some examples of the method, apparatus, and non-transitory computer-readable medium described above, the access type identifier indicates that the paging message relates to a PDU session over the second RAT.

Some examples of the method, apparatus, and non-transitory computer-readable medium described above may further include processes, features, means, or instructions for receiving a user plane establishment request over the second RAT in response to the paging message.

In some examples of the method, apparatus, and non-transitory computer-readable medium described above, the access type identifier indicates that the paging message relates to a PDU session over the first RAT.

Some examples of the method, apparatus, and non-transitory computer-readable medium described above may further include processes, features, means, or instructions for receiving a user plane establishment request over the second RAT in response to the paging message, the user plane establishment request indicating that a communication session over the first RAT cannot be established.

Some examples of the method, apparatus, and non-transitory computer-readable medium described above may further include processes, features, means, or instructions for receiving a user plane establishment request over the first RAT in response to the paging message, the user plane establishment request comprising a paging message identifier that indicates that the user plane establishment request was sent in response to the paging message.

In some examples of the method, apparatus, and non-transitory computer-readable medium described above, the access type identifier indicates that the paging message relates to a PDU session over the first RAT and a PDU session over the second RAT.

Some examples of the method, apparatus, and non-transitory computer-readable medium described above may further include processes, features, means, or instructions for receiving a first user plane establishment request over the first RAT in response to the paging message. Some examples of the method, apparatus, and non-transitory computer-readable medium described above may further include processes, features, means, or instructions for receiving a second user plane establishment request over the second RAT in response to the paging message.

In some examples of the method, apparatus, and non-transitory computer-readable medium described above, the first RAT may be a non-3GPP access and the second RAT may be a 3GPP access.

In some examples of the method, apparatus, and non-transitory computer-readable medium described above, the first network device comprises an access and mobility management function (AMF) module.

DETAILED DESCRIPTION

Figure 1:
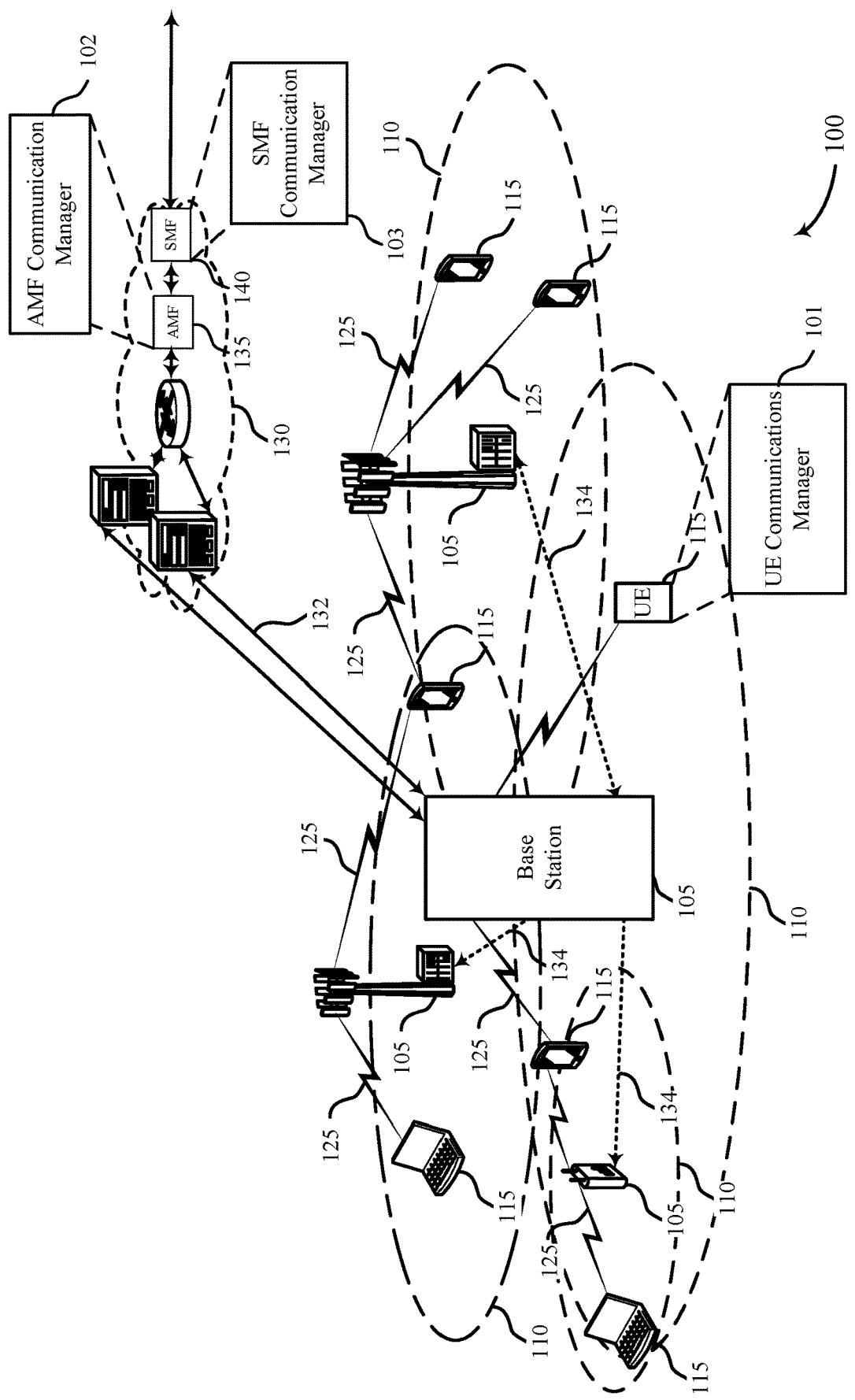
FIG. 1 illustrates an example of a system for wireless communication that supports mechanisms for establishing user plane connectivity for non-3GPP access in accordance with one or more aspects of the present disclosure.

In a wireless communication system, a wireless device may be capable of communicating with a core network over at least two radio access technologies. The first radio access technology (RAT) may be a 3rd Generation Partnership Project (3GPP) technology, e.g., an access using the 5G protocols standardized by the 3GPP. The second RAT may be a non-3GPP technology. For example, the second RAT may be an access using wireless local area network (WLAN) protocols standardized by the IEEE 802.11 Working Group and commonly referred to as "Wi-Fi." When a communication session is established between the wireless device and the core network, the communication session is created over a particular RAT.

Each RAT may be associated with a CM idleness state, e.g., a CM idle state or a CM connected state. When the wireless device is in the CM idle state over the 3GPP access, the wireless device may be paged by the network over the 3GPP access and may transition to the CM connected state with a service request. When the wireless device is in the CM idle state over the non-3GPP access, the wireless device may not be paged over the non-3GPP access and may transition to the CM connected state with a re-registration request. However, executing a re-registration procedure may decrease throughput within the wireless communications system.

Some communication sessions that were created over the non-3GPP access may be maintained when a wireless device enters the CM idle state over the non-3GPP access, e.g., to avoid requiring the wireless device to perform another session registration procedure. In such cases, when data to be transmitted to the wireless device for communications sessions that were created over the non-3GPP access arrives at the core network, the core network cannot transmit the data to the wireless device over the non-3GPP access on the downlink channel or page the wireless device over the non-3GPP access when the wireless device is in the CM idle mode over the non-3GPP access.

In order to transmit the downlink data to the wireless device, the core network may page the wireless device over the 3GPP access. The wireless device may respond with a user plane establishment request over the 3GPP access, and the downlink data may be transmitted to the wireless device over the 3GPP access.

The wireless device may have policies that forbid data related to a communication session over non-3GPP from being transmitted over the 3GPP access. The wireless device may therefore provide an indication that certain PDU sessions cannot be transmitted over the 3GPP access. The indication may be, for example, an identification of communication sessions that are forbidden over the 3GPP access, e.g., a list of session identifiers for communication sessions that are forbidden over the 3GPP access, or a message indicating that the wireless device is not to be paged for those communication sessions. Alternatively or additionally, the wireless device may transmit a user plane establishment request over the non-3GPP access to allow the downlink data to be transmitted over the non-3GPP access.

Aspects of the disclosure are initially described in the context of a wireless communications system. Aspects of the disclosure are then illustrated by and described with reference to communication flows between various components of the wireless communications system. Aspects of the disclosure are further illustrated by and described with reference to apparatus diagrams, system diagrams, and flowcharts that relate to mechanisms for establishing user plane connectivity for non-3GPP access.

FIG. 1 illustrates an example of a wireless communications system 100 in accordance with one or more aspects of the present disclosure. The wireless communications system 100 includes base stations 105 (e.g., gNodeBs (gNBs), and/or radio heads (RHs)), UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

UEs 115 may include a UE Communication Manager that manages communications between UE 115 and the core network 130 in accordance with one or more aspects of the present disclosure.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105-a may include subcomponents such as an access network entity 105-b, which may be an example of an access node controller (ANC). Each access network entity 105-b may communicate with a number of UEs 115 through a number of other access network transmission entities 105-c, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The core network 130 may include several entities (e.g., functions) such as access and mobility management functions (AMFs) 135, session management functions (SMFs) 140, and others, that may be virtually implemented in software. In some examples, the UEs 115 may communicate with an entity of the core network 130 over a first radio access technology (e.g., a 3rd Generation Partnership Project (3GPP) access) and a second radio access technology (e.g., a non-3GPP access).

AMF 135 may include an AMF Communications Manager 102 that manages communications between the AMF 135 and one or more SMFs 140 and communications between AMF 135 and one or more UEs 115 in accordance with one or more aspects of the present disclosure. SMF 140 may include an SMF Communications Manager 103 that manages communications between SMF 140 and a User Plane Function (UPF) and communications between SMF 140 and one or more AMFs 135 in accordance with one or more aspects of the present disclosure.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 115) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of Ts=1/30,720,000 seconds). Time resources may be organized according to radio frames of length of 10 ms (Tf=307200 Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
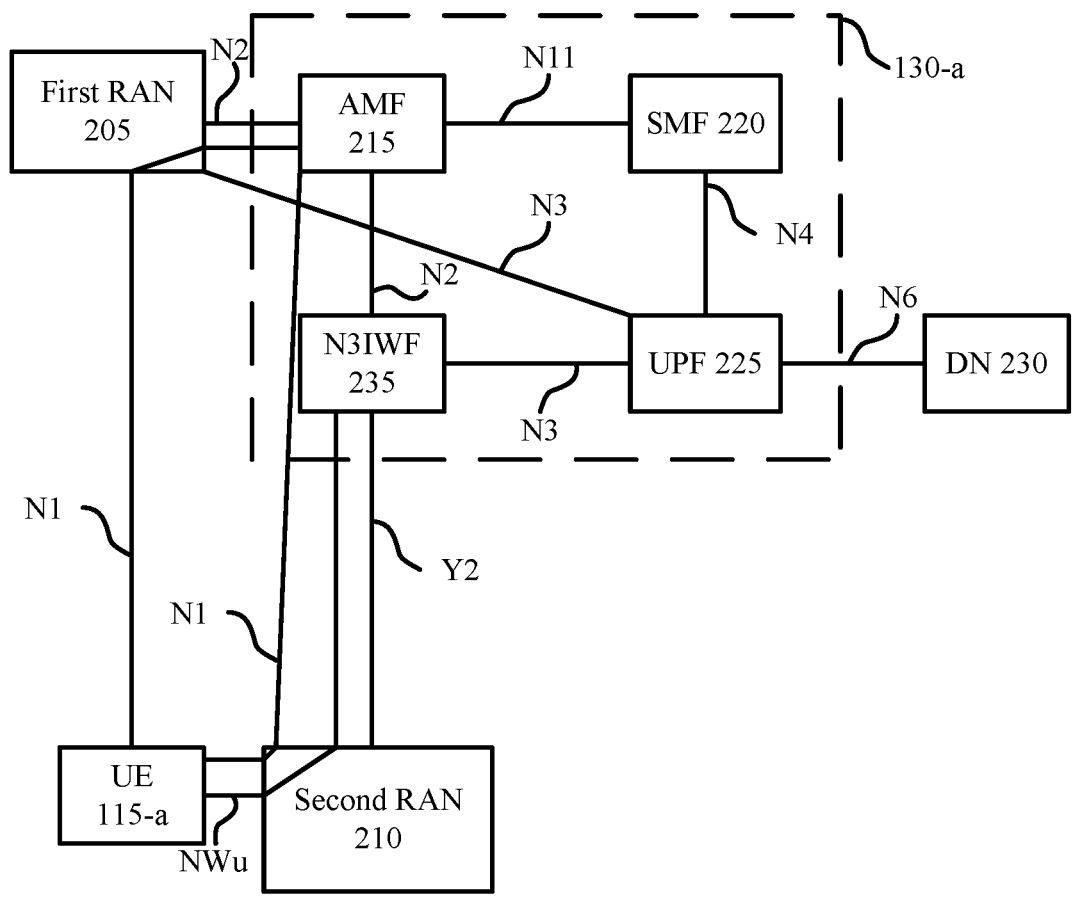
FIG. 2 illustrates an example of a wireless communication system that supports mechanisms for establishing user plane connectivity for non-3GPP access in accordance with one or more aspects of the present disclosure.

FIG. 2 illustrates an example of a wireless communications system 200 in accordance with one or more aspects of the present disclosure. The wireless communication systems 200 may include UE 115-a and core network 130-a, which may be examples of the corresponding devices described with reference to FIG. 1. The UE 115-a may communicate with the core network 130-a via a first radio access network (RAN) 205 over a first RAT and a second RAN 210 over a second RAT. The first RAN 205 may be a 3GPP network in which communications are transmitted over a 3GPP access, and the second RAN may be a non-3GPP network in which communications are transmitted over a non-3GPP access. The core network 130-a may include one or more access and mobility management functions (AMFs) 215, session management functions (SMFs) 220, user plane functions (UPFs) 225 (e.g., in communication with a data network (DN) 230), and a Non-3GPP Interworking Function (N3IWF) 235.

In some wireless systems (e.g., a 5G wireless system), a UE 115-a may access the DN 230 to exchange data packets using a protocol data unit (PDU) session. The PDU session may provide a PDU connectivity service, which may support the transmission of one or more PDUs between the UE 115-a and the DN 230. An association between the UE 115-a and the DN 230 in a PDU session may use internet protocol (IP) or Ethernet, or the association may be unstructured. In some cases, the DN 230 may be an example of a local DN, a central DN, or a public land mobile network (PLMN).

The AMF 215 may provide access and mobility management services for the UE 115-a. In some examples, the AMF 215 may serve as the primary point of communication with the UE 115, such that all communications between the UE 115-a and the UE 115 may pass through the AMF 215 (either directly, in the case of communications over 3GPP access, or both directly and indirectly via the N3IWF 235, in the case of non-3GPP access). For example, for uplink communication, the UE 115-a may identify a payload to transmit to a specific entity (or function) of the core network 130-a, and may transmit the payload to the AMF 215. Similarly, for downlink communication, an entity (or function) may transmit a payload to the AMF 215, and the AMF 215 may relay the payload to the UE 115-a.

The AMF 215 may communicate with the SMF 220 over a communication link N11. The AMF 215 may also communicate with the UE 115-a over the communication link N1. Communication between the AMF 215 and the UE 115-a may be over 3GPP access or non-3GPP access.

In some examples, the AMF 215 may receive a paging request from the SMF 220 over the communications link N11. The AMF 215 may then determine whether to transmit a paging message to the UE 115-a. The AMF 215 may determine whether to transmit a paging message to the UE 115-a based at least in part on a paging state of the UE 115-a, a connection management (CM) idleness state of the UE 115-a, or a combination thereof. For example, the AMF 215 may determine not to transmit the paging message to the UE 115-a when the paging state of the UE 115-a is a paging prohibited state and the CM idleness state of the UE 115-a is a CM idle state. The AMF 215 may determine that the paging state of the UE 115-a is a paging prohibited state based on the receipt of an indicator of whether paging is permitted from the UE 115-a (e.g., in a session establishment message) or receipt of an indicator of whether paging is permitted from the SMF 220 (e.g., in the paging request). When the AMF 215 determines not to transmit the paging message to the UE 115-a, the AMF 215 may transmit a paging request rejection to the SMF 220. The paging request rejection may indicate that the UE 115-a is not pageable or that user plane resources cannot be established.

In some other examples, the AMF 215 may determine to transmit the paging request to the UE 115-a when the CM idleness state of the UE 115-a is the CM idle state. The AMF 215 may transmit the paging message to the UE 115-a over the 3GPP access.

In some examples, the AMF 215 may receive a user plane establishment request from the UE 115-a in response to the paging message. The user plane establishment request may be received over the 3GPP access, and the AMF 215 may subsequently transmit data to the UE 115-a over the 3GPP access.

In some other examples, the AMF 215 may receive a first user plane establishment request from the UE 115-a over the 3GPP access. The first user plane establishment request may include a list of PDU sessions that are forbidden over the 3GPP access. The AMF 215 may subsequently transmit data to the UE 115-a over the 3GPP access, but it may not transmit any data over the 3GPP access that is related to a PDU session that was included in the list of PDU sessions that are forbidden over the 3GPP access. The AMF 215 may also receive a second user plane establishment request from the UE 115-a in response to the paging message. The second user plane establishment request may be received over the non-3GPP access. The AMF 215 may subsequently transmit data over the non-3GPP access. In some examples, the data transmitted over the non-3GPP access may include data related to PDU sessions included on the list of PDU sessions that are forbidden over the 3GPP access.

In some examples, the paging message may include an access type identifier that indicates whether the paging message relates to a PDU session over the 3GPP access or a PDU session over the non-3GPP access. The access type identifier may indicate that the paging message relates to one or more PDU sessions over the 3GPP access only, one or more PDU sessions over the non-3GPP access only, or PDU sessions over both the 3GPP access and the non-3GPP access.

When the paging message indicates that the paging message relates to one or more PDU sessions over the 3GPP access only, the AMF 215 may receive a user plane establishment request over the 3GPP access in response to the paging message.

When the paging message indicates that the paging message relates to one or more PDU sessions over the non-3GPP access only, the AMF 215 may receive a user plane establishment request over the non-3GPP access. The user plane establishment request may include a paging message identifier that indicates that the user plane establishment request was sent in response to the paging message (which was transmitted over the 3GPP access). In other examples, the AMF may receive a user plane establishment request over the 3GPP access. The user plane establishment request received over the 3GPP access may indicate that a communication session over the non-3GPP access cannot be established.

When the paging message indicates that the paging message relates to PDU sessions over the 3GPP access and PDU sessions over the non-3GPP access, the AMF 215 may receive a first user plane establishment request over the 3GPP access and a second user plane establishment request over the non-3GPP access.

The SMF 220 may provide session management services for the UE 115-*a*. Specifically, the SMF 220 may establish, modify, and release sessions (or bearers) for communication between the UE 115-*a* and the DN 230. For example, the SMF 220 may maintain a tunnel for communication between the UPF 225 and an access network (AN) node. In addition, the SMF 220 may allocate and manage IP addresses for the UE 115-*a*, select and control user plane functions, configure traffic steering at the UPF 225 to rout traffic to proper destinations, terminate SM parts of NAS messages, and provide roaming functionality.

The SMF 220 may communicate with the UPF 225 over a communications link N4 and may communicate with the AMF 215 over a communications link N11. For example, the SMF 220 may receive a notification from the UPF 225 over the communications link N4. The notification may indicate that there is data (e.g., one or more PDUs) ready for transmission to the UE 115-*a* for a PDU session. In some examples, the SMF 220 may relay this information to the AMF 215 over the communications link N11. In other examples, the SMF 220 may determine whether to transmit a paging request to the AMF 215 over the communications link N11 based at least in part on information stored at the SMF 220.

For example, the SMF 220 may store data related to a paging state of the SMF 220. The paging state SMF 220 may be a no paging state or a paging state. The paging state of the SMF 220 may be indicated by a timer such that the SMF 220 is in the no paging state while the timer is active and the paging state when the timer is inactive.

The SMF 220 may also store data related to the paging state of the UE 115-*a*. The data related to the paging state of the UE 115-*a* may indicate whether the UE 115-*a* has sent information to the SMF 220, either directly or via the AMF 215, indicating whether paging should be performed when the connection management (CM) idleness state of the UE 115-*a* is an idle mode. In other examples, the SMF 220 may store data related to the paging state of the UE 115-*a* based on a subscription profile for the UE 115-*a* that indicates the paging state of the UE 115-*a*. The SMF 220 may store information indicating that the UE 115-*a* is in a paging permitted mode, a paging prohibited mode, or an unknown mode. In other examples, the SMF 220 may not have any such information about the paging state of the UE 115-*a*, and the SMF 220 may not store any data related to the paging state of the UE 115-*a*.

The SMF 220 may also store data related to a CM idleness state of the UE 115-*a*. The CM idleness state of the UE 115-*a* may be an idle state (e.g., CM-IDLE), an active state (e.g., CM-CONNECTED), or an unknown state. In other examples, the SMF 220 may not receive any information about the CM idleness state of the UE 115-*a* and therefore may not store any data related to the CM idleness state of the UE 115-*a*.

The SMF 220 may determine whether to transmit a paging request to the AMF 215 over communications link N11 based at least in part on the paging state of the SMF 220, the paging state of the UE 115-*a*, the CM idleness state of the UE 115-*a*, or a combination thereof. For example, the SMF 220 may determine not to transmit the paging request to the AMF 215 when the SMF 220 is in the no paging state. The SMF 220 may also determine not to transmit the paging request to the AMF 215 when the paging state of the UE 115-*a* is in the paging prohibited state and the CM idleness state of the UE 115-*a* is in the CM idle state. If the SMF 220 determines not to transmit the paging request to the AMF 215 and the SMF 220 is not in the no paging state, the SMF 220 may also determine whether to set the paging state of the SMF 220 to the no paging state. In some examples, the SMF 220 may set the paging state of the SMF 220 to the no paging state (e.g., by starting a timer) whenever the SMF 220 determines not to transmit a paging request to the AMF 215.

In some examples, the SMF 220 may determine to transmit the paging request to the AMF 215. For example, the SMF 220 may determine to transmit the paging request to the AMF 215 when the paging state of the UE 115-*a* is the paging prohibited state but the CM idleness state of the UE 115-*a* is unknown. However, the SMF 220 may include an indication that the UE 115-*a* is in the paging prohibited state in the paging request. The SMF 220 may also determine to transmit the paging request to the AMF 215 when the paging state of the UE 115-*a* is unknown. In response, the AMF 220 may receive a paging request rejection from the AMF 215 (e.g., when the AMF determines that the UE 115-*a* is in the CM idle state). Upon receiving the paging request rejection from the AMF 215, the SMF 220 may set the paging state of the SMF 220 to the no paging state (e.g., by starting a timer). In some examples, the SMF 220 may set the paging state of the SMF 220 to the no paging state if the paging request rejection indicates that the UE 115-*a* is not able to be paged or that user plane resources cannot be established.

In some examples, the SMF 220 may set the paging mode of the SMF 220 to the no paging mode by starting a timer. In some examples, the SMF 220 may not transmit any paging requests to the AMF 215 when the timer is active. In some other examples, the SMF 220 may not transmit any paging requests related to PDU sessions over a particular RAT (e.g., the non-3GPP RAT) to the AMF 215 when the timer is active. When setting the paging mode of the SMF 220 to the no paging mode, the SMF 220 may also transmit a message to the UPF 225. In some examples, the message may instruct the UPF 225 to stop buffering downlink (DL) data related to the UE 115-*a*. The message may additionally or alternatively instruct the UPF 225 to stop sending notifications for DL data related to the UE 115-*a*. When the timer expires, the SMF 220 may send another message to the UPF 225 reversing these instructions.

The UPF 225 may include functionality for serving as the point of interconnect to DN 230 for an external PDU session. In some cases, the UPF 225 may be the anchor point for intra-RAT and inter-RAT mobility. The UPF 225 may route and forward packets to and from the DN 230, inspect packets and enforce policy rules in the user plane, report traffic usage, handle quality of service (QoS) for user plane packets, and verify uplink traffic.

The N3IWF 235 may include functionality for serving as an intermediary between the UE 115-*a* and the AMF 215 for communications over the non-3GPP access, especially for registration and session establishment. For example, during registration the N3IWF 235 may select an appropriate AMF and relay authentication and registration messages received from the UE 115-*a* to the AMF 215 and vice versa. The N3IWF 235 may also route uplink and downlink transmissions between the UE 115-*a* and the DN 230 via the UPF 235 over a communications link N3.

As illustrated the different functions of a core network may be virtualized to support a more flexible architecture. That is, the different functions described above may be implemented in software.

Figure 3:
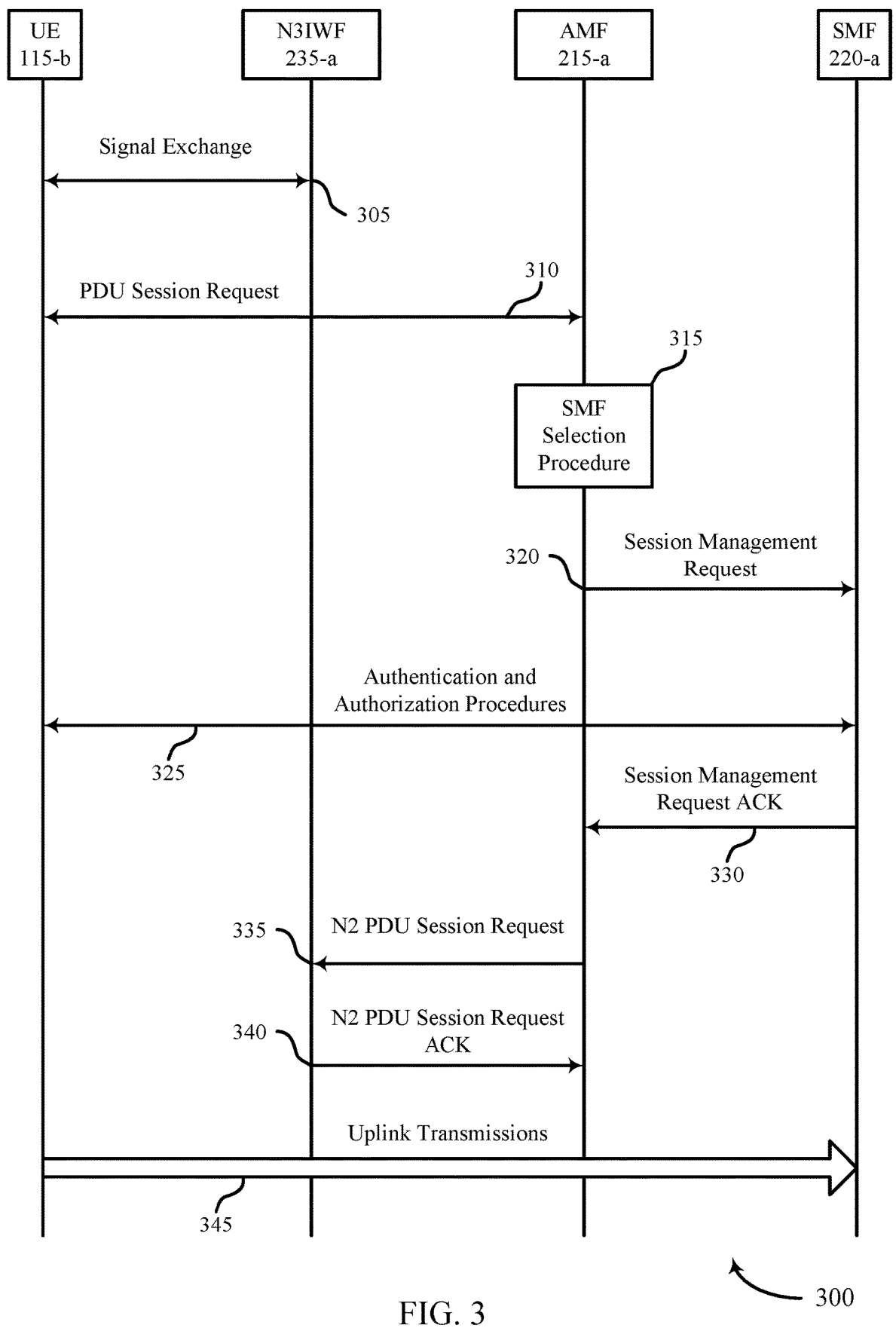
FIG. 3 illustrates an example of a session establishment procedure in a wireless communication system that supports mechanisms for establishing user plane connectivity for non-3GPP access in accordance with one or more aspects of the present disclosure.

FIG. 3 illustrates an example of a session establishment procedure 300 in a wireless communications system in accordance with one or more aspects of the present disclosure. The wireless communications system may include an UE 115-b, a N3IWF 235-a, AMF 215-a, and a SMF 220-a, which may be examples of aspects of UE 115 as described with reference to FIG. 1, and the N3IWF 235, the AMF 215, and the SMF 220 as described with reference to FIG. 2. The signals in the session establishment procedure 300 may be transmitted over a first RAT, such as a non-3GPP access.

The session establishment procedure 300 may occur after the UE 115-b has registered with the core network over non-3GPP access. For example, the session establishment procedure 300 may represent an initial session establishment over the non-3GPP access, a session re-establishment over the non-3GPP access, a session modification over the non-3GPP access, or a session establishment with a handover indication when the UE hands over the PDU session to the non-3GPP access from a second RAT (e.g., a 3GPP access). The session establishment procedure 300 may include a signal exchange 305 that creates an IPsec security association for Non-Stratum Access (NAS) between the UE 115-b and N3IWF 235-a.

The UE 115-b may determine whether paging is permitted over a second RAT, such as 3GPP access, for a PDU session routed over the non-3GPP access when the UE 115-b is in a CM idle state. The core network may determine that the PDU session is routed over the non-3GPP access when the user plane for the PDU session is routed over the non-3GPP access, or when the core network maintains an indication that the PDU session is routed over the non-3GPP access. Such an indication may be stored, for example, at the AMF 215-a.

In some examples, the UE 115-b may determine whether paging is permitted over 3GPP access for a PDU session routed over the non-3GPP access based at least in part on policies associated with the UE 115-b, policies associated with the particular PDU session, or a combination thereof. For example, when the UE 115-b has a policy that PDU sessions routed over the non-3GPP access may not be transmitted over the 3GPP access, the UE 115-b may determine that paging is prohibited over the 3GPP access for the PDU session over the non-3GPP access if the PDU session is over the non-3GPP access. As another example, when a policy associated with PDU session indicates that the PDU session is forbidden over the 3GPP access, the UE 115-b may determine that paging is prohibited over the 3GPP access for that PDU session. In some examples, the policies may indicate that transmitting data for a PDU session (e.g., a PDU session routed over the non-3GPP access) over the 3GPP access is forbidden. In some examples, the policies may indicate that data for a PDU session (e.g., a non-3GPP access) is preferably transmitted over the non-3GPP access.

The UE 115-b may make this determination for the PDU session that the UE 115-b is attempting to establish through use of the session establishment procedure 300. In other examples, the UE 115-b may make this determination for an active PDU session, i.e., a PDU session that was established prior to the start of session establishment procedure 300. The UE 115-b may then send a PDU session request 310 to the AMF 215-a over the non-3GPP access. The PDU session request 310 may include at least one indicator of whether paging is permitted over the 3GPP access for a PDU session when the PDU session is routed over the non-3GPP access and the UE 115-b is in a CM idle state.

Upon receiving the PDU session request 310, the AMF 215-a may store data related to the indicator of whether paging is permitted over the 3GPP access for the PDU session when the PDU session is routed over the non-3GPP access and the UE 115-b is in a CM idle state. The AMF 215-a may utilize this stored data when it receives a paging request related to the UE 115-b. The AMF 215-a may also perform a SMF selection procedure 315 to select the SMF 220-a as the SMF to be used for this PDU session.

The AMF 215-a may then transmit a session management request 320 to the SMF 220-a. The session management request 320 may include at least a portion of the PDU session establishment request 310. In some examples, the session management request 320 may include the entire PDU session establishment request 310. In some examples, the SMF 220-a may store data related to the indicator of whether paging is permitted over the 3GPP access for the PDU session when the PDU session is routed over the non-3GPP access and the UE 115-b is in a CM idle state. The SMF 220-a may utilize this stored data when it determines whether to transmit a paging request related to the UE 115-b to the AMF 215-b.

The PDU session authentication and authorization procedures 325 may then be performed between the UE 115-b and the core network. After these procedures are completed, the SMF 220-a may transmit a session management request acknowledgement 330 to the AMF 215-a. The session management request acknowledgement 330 may include a PDU session establishment accept message. The AMF 215-a may then transmit a N2 PDU session request 335 to the N3IWF 235-a, and may receive a N2 PDU session request acknowledgement 340 in response. The UE 115-b may thereafter commence uplink transmissions 345. The uplink transmissions 345 may be routed to the data network via a UPF and N3IWF, as described with reference to FIG. 2.

While FIG. 3 describes a session establishment procedure for a PDU session over non-3GPP access, at least one indicator of whether paging is permitted over the 3GPP access when the PDU session is routed over the non-3GPP access and the UE 115-b is in a CM idle state may additionally or alternatively be transmitted as part of a different communication exchange between the UE 115-b and the core network (including, e.g., the AMF 215-a and/or the SMF 220-a). The UE 115-b may also transmit one or more modification requests to the core network, including the AMF 215-a and/or the SMF 220-a, to update the paging state of the UE 115-b.

Figure 4:
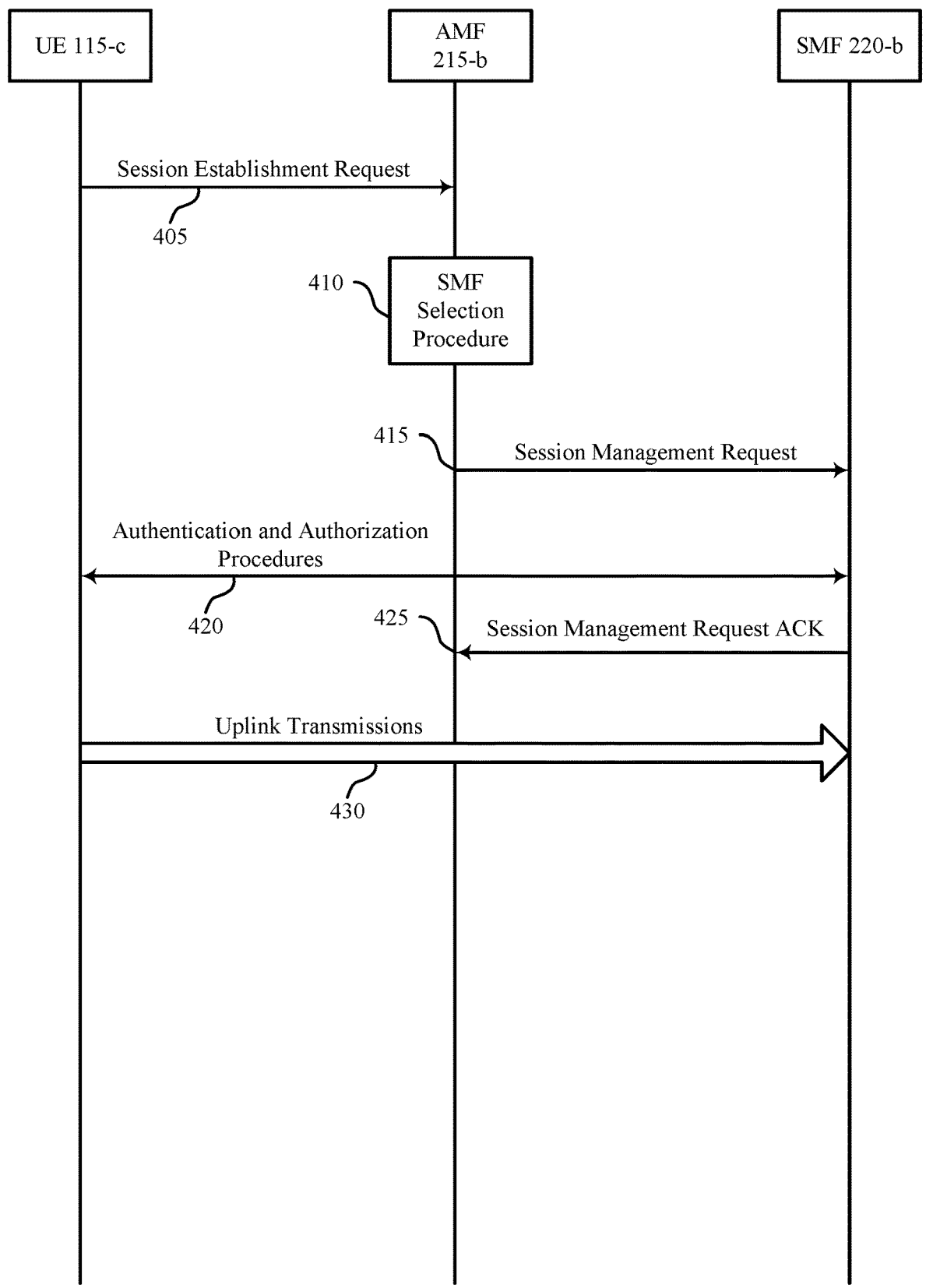
FIG. 4 illustrates an example of a session establishment procedure in a wireless communication system that supports mechanisms for establishing user plane connectivity for non-3GPP access in accordance with one or more aspects of the present disclosure.

FIG. 4 illustrates an example of a session establishment procedure 400 in a wireless communications system in accordance with one or more aspects of the present disclosure. The wireless communications system may include an UE 115-c, an AMF 215-b, and a SMF 220-b, which may be examples of aspects of UE 115, as described with reference to FIG. 1, and AMF 215 and SMF 220 as described with reference to FIG. 2. The signals in the session establishment procedure 400 may be transmitted over a first RAT, such as a 3GPP access.

The session establishment procedure 400 may occur after the UE 115-b has registered with the core network over the 3GPP access. For example, the session establishment procedure 300 may represent an initial session establishment over the 3GPP access, a session re-establishment over the 3GPP access, a session modification over the 3GPP access, or a session establishment with a handover indication when the UE hands over the PDU session to the 3GPP access from a second RAT (e.g., a non-3GPP access).

The UE 115-c may determine whether paging is permitted over the 3GPP access for a PDU session routed over the non-3GPP access when the UE 115-c is in a CM idle state. In some examples, the UE 115-c may determine whether paging is permitted over the 3GPP access for an active PDU session routed over the non-3GPP access when the PDU session is routed over the non-3GPP access and the UE 115-c is in a CM idle state. In some other examples, the UE 115-c may determine whether paging is permitted over the 3GPP access for the PDU session being established over the 3GPP access (or an active PDU session over the 3GPP access) when the PDU session is routed over the non-3GPP access and the UE 115-c is in a CM idle state. In these examples, the core network may not ignore this information while the PDU session is being routed over the 3GPP access, but may utilize this information after the PDU session is handed over from the 3GPP access to the non-3GPP access.

The UE 115-c may send a session establishment request 405 to the AMF 215-b over the 3GPP access. The session establishment request 405 may be, for example, a PDU session establishment request. The session establishment request 405 may include at least one indicator of whether paging is permitted over the 3GPP access for a PDU session when the PDU session is routed over the non-3GPP access and the UE 115-c is in a CM idle state.

Upon receiving the session establishment request 405, the AMF 215-b may store data related to the indicator of whether paging is permitted over the 3GPP access for the PDU session when the PDU session is routed over the non-3GPP access and the UE 115-c is in a CM idle state. The AMF 215-b may utilize this stored data when it receives a paging request related to UE 115-c. In some examples, the AMF 215-c may not utilize this information intil the PDU session is handed over from the 3GPP access to the non-3GPP access. The AMF 215-b may also perform a SMF selection procedure 410 to select the SMF 220-b as the SMF to be used for this PDU session.

The AMF 215-b may then transmit a session management request 415 to the SMF 220-b. The session management request 415 may include at least a portion of the session establishment request 405. In some examples, the session management request 415 may include the entire session establishment request 405. In some examples, the SMF 220-b may store data related to the indicator of whether paging is permitted over the 3GPP access for the PDU session when the PDU session is routed over the non-3GPP access and the UE 115-c is in a CM idle state. The SMF 220-b may utilize this stored data when it determines whether to transmit a paging request related to the UE 115-c to the AMF 215-b.

PDU session authentication and authorization procedures 420 may then be performed between the UE 115-c and the core network. After these procedures are completed, the SMF 220-b may transmit a session management request acknowledgement 425 to the AMF 215-b. The session management request acknowledgement 425 may include a PDU session establishment accept message. After further communications, which may include the exchange of N2 PDU Session messages between the AMF 215-b and a RAN such as RAN 205 described with reference to FIG. 2, the UE 115-c may commence uplink transmissions 430. Uplink transmissions 430 may be routed to the data network via a UPF, as described with reference to FIG. 2.

While FIG. 4 describes a session establishment procedure for a PDU session over 3GPP access, at least one indicator of whether paging is permitted over the 3GPP access when the PDU session is routed over the non-3GPP access and the UE 115-c is in a CM idle state may additionally or alternatively be transmitted as part of a different communication exchange between the UE 115-c and the core network (including, e.g., the AMF 215-b and/or SMF 220-b). The UE 115-c may also transmit one or more modification requests to the core network, including the AMF 215-b and/or the SMF 220-b, to update the paging state of the UE 115-b.

Figure 5:
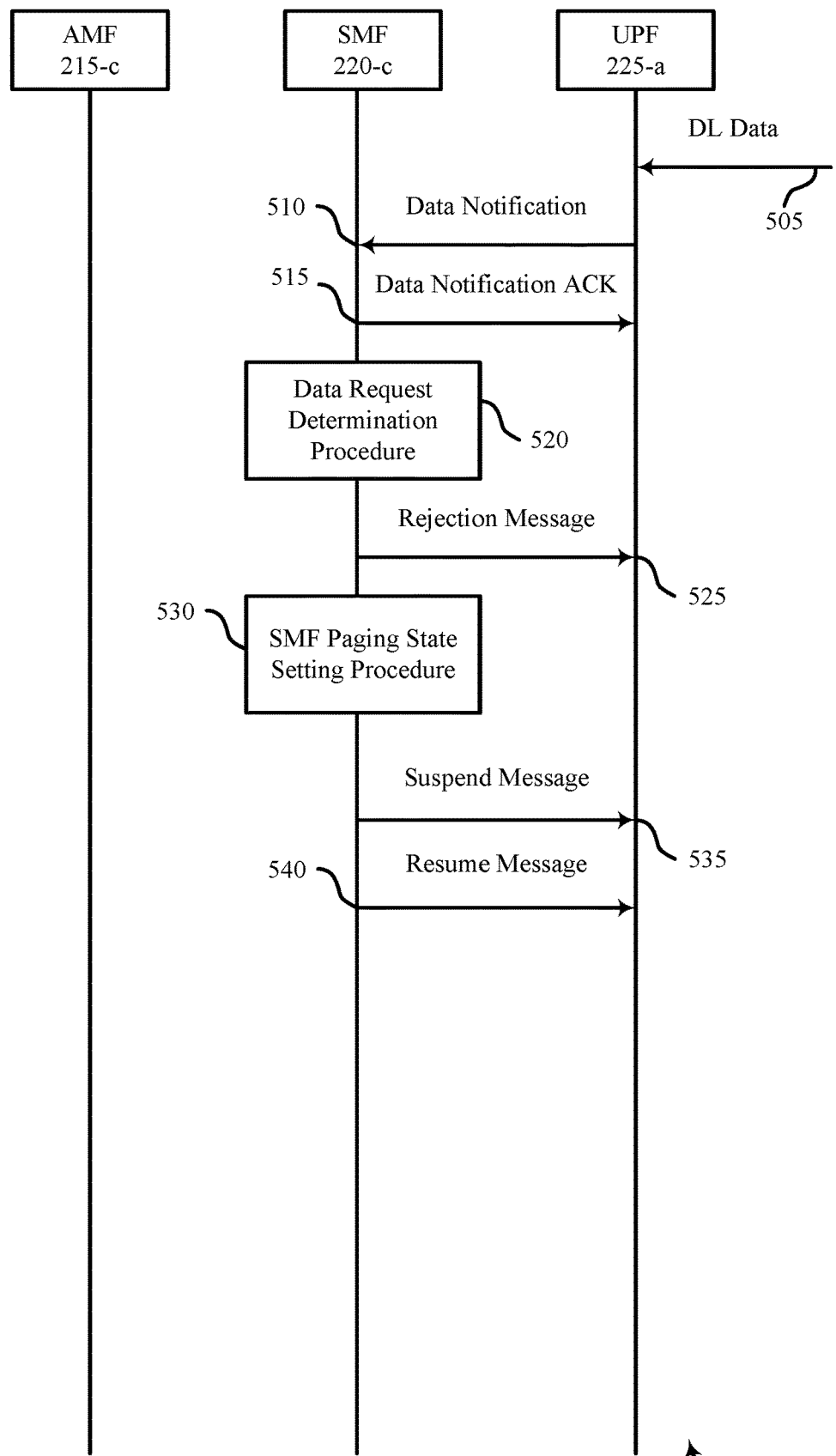
FIG. 5 illustrates an example of a communication flow at a core network that supports mechanisms for establishing user plane connectivity for non-3GPP access in accordance with one or more aspects of the present disclosure.

FIG. 5 illustrates an example of a communication flow 500 at a core network in accordance with one or more aspects of the present disclosure. The core network may include an AMF 215-c, a SMF 220-c, and an UPF 225-a, which may be examples of aspects of the AMF 215, the SMF 220, and the UPF 225 as described with reference to FIG. 2.

The communication flow 500 may being when the UPF 225-a receives downlink (DL) data 505. The DL data 505 may be received from a data network such as the DN 230 as described with reference to FIG. 2. The DL data 505 may be intended for transmission to the UE 115-d as part of a PDU session. The UE 115-d may be an example of aspects of UE 115 described with reference to FIG. 1. The UPF 225-a may determine that no user plane resources exist for the PDU session.

The UPF 225-a may transmit a data notification 510 to the SMF 220-c. The data notification 510 may indicate that there is data ready to be transmitted to the UE 115-d. The SMF 220-c may respond with a data notification acknowledgement (ACK) 515 to confirm that the data notification was received.

The SMF 220-c may then perform a paging request determination procedure 520 to determine whether to transmit a paging request to the AMF 215-c. The SMF 220-c may determine whether to transmit a paging request to the AMF 215-c based at least in part on a paging state of the SMF 220-c, a paging state of the UE 115-d, a CM idleness state of the UE 115-d, the access over which the PDU session related to the DL data 505 is routed, or a combination thereof.

In some examples, the paging request determination procedure 520 may include determining the paging state of the SMF 220-c. The paging state of the SMF 220-c may be represented by a timer, such that the SMF 220-c is in a no paging state when the timer is active. When the SMF 220-c is in the no paging state, the SMF 220-c may determine not to transmit a paging request to the AMF 215-c.

In some examples, the paging request determination procedure 520 may include determining the access over which the PDU session related to the DL data is routed. For example, the SMF 220-c may store, for each PDU session, a PDU session identifier, an address for the associated AMF (e.g., the AMF 215-c), and an indication of the access type over which the PDU session is routed. The indication of the access type over which the PDU session may be stored by the SMF 220-c upon receiving a session establishment request regarding the PDU session and may be updated when the SMF 220-c receives information indicating that the information should be updated. For example, the SMF 220-c may update the indication of the access type over which the PDU session is routed when the UE 115-d performs a handover procedure for a PDU session from one access type to another, e.g., from non-3GPP access to 3GPP access. The SMF 220-c may receive the PDU session identifier with the DL data 505 and then look up the indication of the access type based on the PDU session identifier. In some other examples, the SMF 220-c may receive an indication of the access over which the PDU session related to the DL data 505 with the DL data 505. In some other examples, the SMF 220-c may receive an indication of the access of which the PDU session related to the DL data 505 is routed from the AMF 215-c in response to a request for such information.

When the PDU session is routed over the non-3GPP access, the SMF 220-c may then determine whether to transmit the paging request to the AMF 215-c based at least in part on a paging state of the UE 115-d, a CM idleness state of the UE 115-d, or a combination thereof.

In some examples, the paging request determination procedure 520 may include determining the paging state of the UE 115-d. The SMF 220-c may determine the paging state of the UE 115-d by checking a subscription profile for the UE 115-d, which may indicate the paging state of the UE 115-d. In other examples, the SME 220-c may receive a paging state indication (e.g., a no paging indication) from the UE 115-d (either directly or via the AMF 215-c), e.g., as part of the session establishment procedure as described with reference to FIG. 3 or 4. The paging state of the UE 115-d may be a paging permitted state or a paging prohibited state.

When the SMF 220-c determines that the paging state of the UE 115-d is the paging prohibited state, the SMF 220-c may determine the CM idleness state of the UE 115-d. The CM idleness state of the UE 115-d may be, for example, CM idle, CM connected, or unknown. The SMF 220-c may determine that the UE 115-d is in the CM idle state when the UE 115-d is in the CM idle state over both the first RAT (e.g., 3GPP access) and the second RAT (e.g., non-3GPP access). When the SMF 220-c determines that the CM idleness state of the UE 115-d is the CM idle state, the SMF 220-c may determine not to transmit the paging request to the AMF 215-c. When the SMF 220-c determines not to transmit the paging request to the AMF 215-c, the SMF 220-c may then transmit a rejection message 525 to the UPF 225-a.

The SMF 220-c may also perform a SMF paging state setting procedure 530. The SMF paging state setting procedure 530 may include setting the paging state of the SMF 220-c to a no paging state. When the SMF 220-c is in the no paging state, the SMF 220-c may not transmit any paging requests related to the UE 115-d to the AMF 215-c. In other examples, the SMF 220-c may transmit paging requests related to PDU sessions over a first RAT (e.g., 3GPP access) but may not transmit paging requests related to PDU sessions over a second RAT (e.g., non-3GPP access) related to the UE 115-d.

The SMF 220-c may set the paging state of the SMF 220-c to a no paging state by initiating a timer. The SMF 220-c may also transmit a suspend message 535 to the UPF 225-a. The suspend message 535 may include instructions to the UPF 225-a to suspend certain operations. For example, the suspend message 535 may include instructions to the UPF 225-a to stop transmitting data notifications meeting certain criteria (e.g., for data to be delivered to the UE 115-d) to the SMF 220-c. The suspend message 535 may additionally or alternatively include instructions to the UPF 225-a to stop buffering DL data meeting certain criteria (e.g., data to be delivered to the UE 115-d via the SMF 220-c).

The SMF 220-c may remain in the no paging state until the timer expires. In some examples, the SMF 220-c may receive a paging indication from UE 115-d that causes the SMF 220-c to set the timer to zero. After the timer expires, the SMF 220-c may switch from the no paging state to the paging state. The SMF 220-c may also transmit a resume message 540 to the UPF 225-a. The resume message 540 may include instructions for the UPF 225-a to resume the operations that were suspended in response to the suspend message 535.

Figure 6:
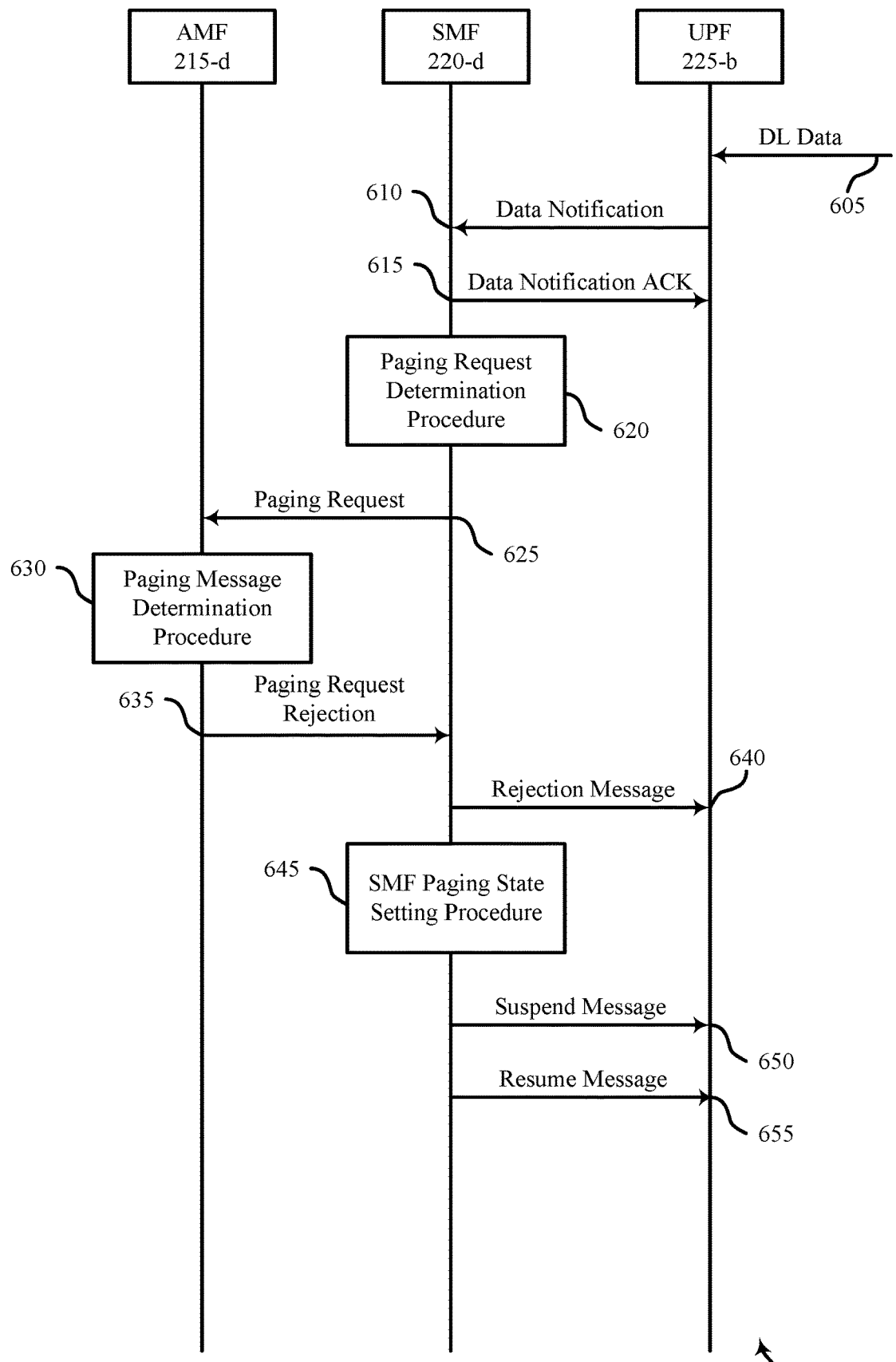
FIG. 6 illustrates an example of a communication flow at a core network that supports mechanisms for establishing user plane connectivity for non-3GPP access in accordance with one or more aspects of the present disclosure.

FIG. 6 illustrates an example of a communication flow 600 at a core network in accordance with one or more aspects of the present disclosure. The core network may include an AMF 215-d, a SMF 220-d, and an UPF 225-c, which may be examples of aspects of the AMF 215, the SMF 220, and the UPF 225 as described with reference to FIG. 2.

The communication flow 600 may begin when the UPF 225-b receives downlink (DL) data 605. The DL data 605 may be received from a data network such as the DN 230 as described with reference to FIG. 2. The DL data 605 may be intended for transmission to a UE 115-e as part of a PDU session. The UE 115-e may be an example of aspects of the UE 115 described with reference to FIG. 1. The UPF 225-b may determine that no user plane resources exist for the PDU session.

The UPF 225-b may transmit a data notification 610 to the SMF 220-d. The data notification 610 may indicate that there is data ready to be transmitted to the UE 115-e. The SMF 220-d may respond with a data notification ACK 615 to confirm that the data notification was received.

The SMF 220-d may then perform a paging request determination procedure 620 to determine whether to transmit a paging request to the AMF 215-d. The SMF 220-d may determine whether to transmit a paging request to the AMF 215-d based at least in part on a paging state of the UE 115-e, a CM idleness state of the UE 115-e, the access over which the PDU session related to the DL data 605 is routed, or a combination thereof In some examples, the paging request determination procedure 620 may include determining the access over which the PDU session related to the DL data 605 is routed. For example, the SMF 220-d may store, for each PDU session, a PDU session identifier, an address for the associated AMF (e.g., the AMF 215-d), and an indication of the access type over which the PDU session is routed. The indication of the access type over which the PDU session may be stored by the SMF 220-d upon receiving a session establishment request regarding the PDU session and may be updated when the SMF 220-d receives information indicating that the information should be updated. For example, the SMF 220-d may update the indication of the access type over which the PDU session is routed when the UE 115-e performs a handover procedure for a PDU session from one access type to another, e.g., from non-3GPP access to 3GPP access. The SMF 220-d may receive the PDU session identifier with the DL data 605 and then look up the indication of the access type based on the PDU session identifier. In some other examples, the SMF 220-d may receive an indication of the access over which the PDU session related to the DL data 605 is routed with the DL data 605. In some other examples, the SMF 220-d may receive an indication of the access of which the PDU session related to the DL data 605 is routed from the AMF 215-d in response to a request for such information.

When the PDU session is routed over the 3GPP access, the SMF 220-d may determine to transmit the paging request to the AMF 215-d. When the PDU session is routed over the non-3GPP access, or the access over which the PDU session is routed is unknown, the SMF 220-d may then determine whether to transmit the paging request to AMF 215-d based at least in part on a paging state of the UE 115-e, a CM idleness state of the UE 115-e, or a combination thereof.

In some examples, the paging request determination procedure 620 may include determining the paging state of the UE 115-e. The SMF 220-d may determine the paging state of the UE 115-e by checking a subscription profile for the UE 115-e, which may indicate the paging state of the UE 115-e. In other examples, the SMF 220-d may receive a paging state indication (e.g., a no paging indication) from the UE 115-e, e.g., as part of the session establishment procedure as described with reference to FIG. 3 or 4.

When the SMF 220-d determines that the paging state of the UE 115-e is the paging prohibited state, the SMF 220-d may determine the CM idleness state of the UE 115-e. In some examples, the SMF 220-d may determine that the CM idleness state of the UE 115-e is unknown, e.g., when the SMF 220-d does not receive or store information related to the CM idleness state of the UE 115-e. When the SMF 220-d determines that the CM idleness state of the UE 115-e is unknown, the SMF 220-d may determine to transmit the paging request to the AMF 215-d.

In some other examples, the paging request determination 620 may include determining that the paging state of the UE 115-e is unknown. When the SMF 220-d determines that the paging state of the UE 115-e is unknown, the SMF 220-d may determine to transmit the paging request to the AMF 215-d.

The SMF 220-d may then transmit the paging request 625 to the AMF 215-d. The paging request 625 may be, for example, a DL Data Notification over N11 or another N11 message requesting the establishment of user plane resources for the PDU session. The paging request 625 may include an indication that the UE 115-e is in the paging prohibited state. The AMF 215-d may then perform a paging message determination procedure 630. For example, the AMF 215-d may determine whether the UE 115-e is in a CM idle state. When the AMF 215-d determines that the UE 115-e is in the CM idle state, the AMF 215-d may determine not to transmit the paging message based at least in part on the determination that the UE 115-e is in the idle state and the indication that the UE 115-e is in the paging prohibited state.

In other examples, paging message determination procedure 630 may include determining that the UE 115-e is in the paging prohibited state. The AMF 215-d may determine the paging state of the UE 115-e by checking a subscription profile for the UE 115-e, which may indicate the paging state of the UE 115-e. In other examples, the AMF 215-d may receiving a paging state indication (e.g., a no paging indication) from the UE 115-e, e.g., as part of the session establishment procedure as described with reference to FIG. 3 or 4. The AMF 215-d may then determine that the UE 115-e is in a CM idle state. Based on these two determinations, the AMF 215-d may determine not to transmit the paging message.

When the AMF 215-d determines not to transmit the paging message, the AMF 215-d may transmit a paging request rejection 635 to the SMF 220-d. The paging request rejection 635 may be, for example, a DL Notification Reject over N11 or another N11 rejection message. The paging request rejection 635 may include a rejection cause field. In some examples, the rejection cause field may indicate "UE not pageable" or "User plane resources cannot be established." The SMF 220-d may also transmit a rejection message 640 to the UFP 225-b.

The SMF 220-d may also perform a SMF paging state setting procedure 645, which may include initiating a timer as described with reference to FIG. 5. In some examples, the SMF 220-d may perform the SMF paging state setting procedure 645 only if the rejection cause field of the paging request rejection 635 indicates "UE not pageable" or "User plane resources cannot be established." The SMF 220-d may also transmit a suspend message 650 and a resume message 655 as described with reference to FIG. 5.

Figure 7:
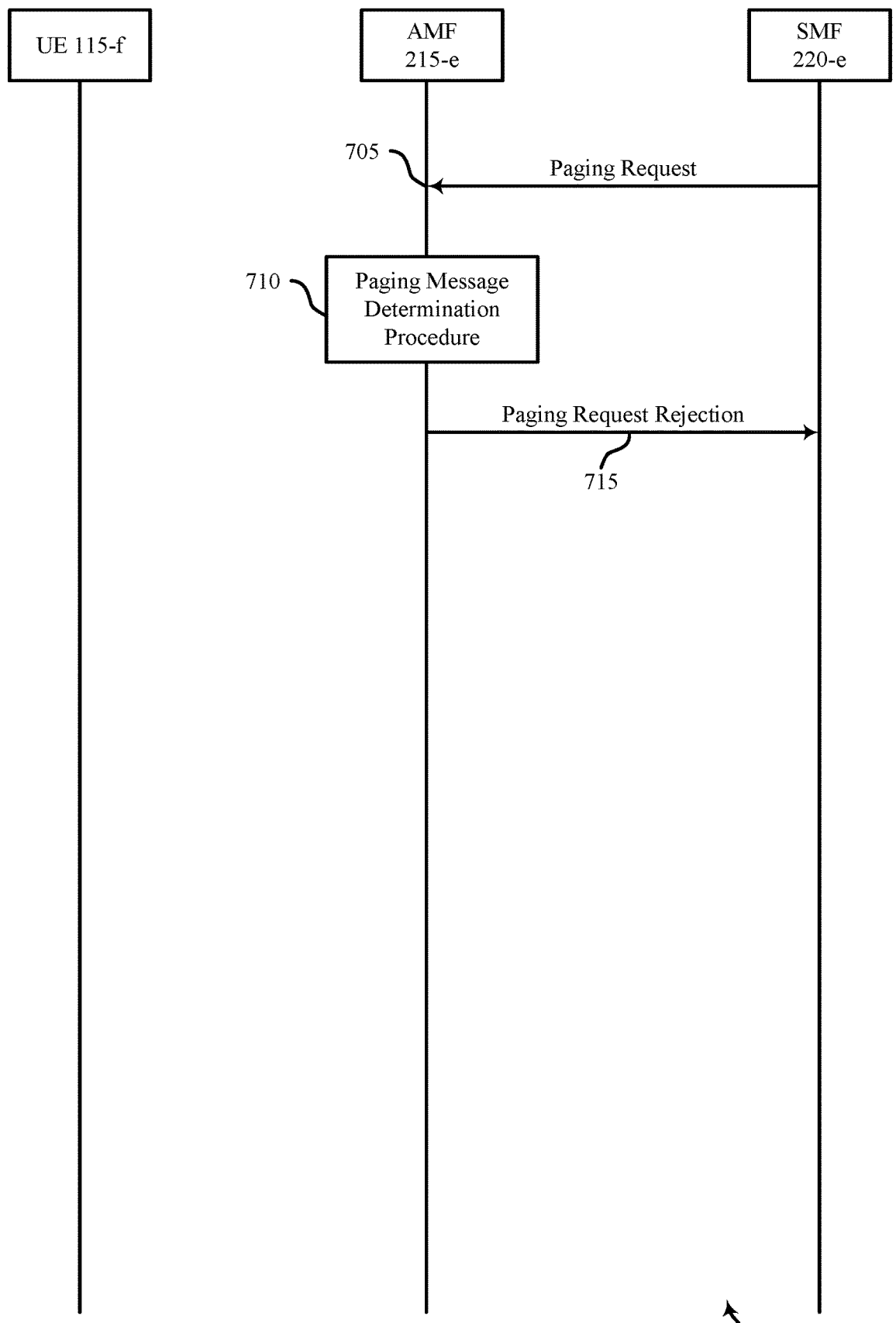
FIG. 7 illustrates an example of a communication flow in a wireless communication network that supports mechanisms for establishing user plane connectivity for non-3GPP access in accordance with one or more aspects of the present disclosure.

FIG. 7 illustrates an example of a communication flow 700 in a wireless communication network in accordance with one or more aspects of the present disclosure. The wireless communication network may include a core network including an AMF 215-e and a SMF 220-e, which may be examples of aspects of AMF 215 and SMF 215 as described with reference to FIG. 2. The wireless communication network may also include an UE 115-f, which may be an example of aspects of the UE 115 described with reference to FIG. 1. The UE 115-f may be capable of communicating with the AMF 215-e over a first RAT (e.g., a 3GPP access) and a second RAT (e.g., a non-3GPP access).

In communications flow 700, the SMF 220-e may transmit a paging request 705 to the AMF 215-e. In some examples, the paging request 705 may include an indication that the UE 115-f is in a paging prohibited state, as described with reference to FIG. 5.

The AMF 215-e may then perform a paging message determination procedure 710 to determine whether to transmit a paging message to the UE 115-f. In some examples, the AMF 215-e may determine whether to transmit a paging message to the UE 115-f based at least in part on a paging state of the UE 115-f, a CM idleness state of the UE 115-f, the access over which the PDU session related to the paging request 705 is routed or a combination thereof.

In some examples, the paging message determination procedure 710 may include determining that the PDU session related to paging request 705 is routed over the non-3GPP access. For example, the AMF 215-e may store, for each PDU session, a PDU session identifier, an address for the serving SMF (e.g., the SMF 220-e), and an indication of the access type over which the PDU session is routed. The indication of the access type over which the PDU session may be stored by the AMF 215-e upon receiving a session establishment request regarding the PDU session and may be updated when the AMF 215-e receives information indicating that the information should be updated. For example, the AMF 215-e may update the indication of the access type over which the PDU session is routed when the UE 115-f performs a handover procedure for a PDU session from one access type to another, e.g., from non-3GPP access to 3GPP access. The AMF 215-e may receive the PDU session identifier in the paging request 705 and then look up the indication of the access type based on the PDU session identifier. In some other examples, the AMF 215-e may receive an indication of the access over which the PDU session related to paging request 705 is routed in paging request 705. When the AMF 215-e determines that the PDU session related to paging request 705 is routed over the non-3GPP access, the AMF 215-e may then determine whether to transmit a paging message to the UE 115-f based at least in part on the paging state of the UE 115-f, the CM idleness state of the UE 115-f, or a combination thereof.

In some examples, the paging message determination procedure 710 may include determining that the paging state of UE 115-f is a paging prohibited state. The AMF 215-e may determine that the paging state of the UE 115-f is a paging prohibited state based on receipt of a no paging indicator from the UE 115-f, e.g., during the session establishment procedure as described with reference to FIG. 3. In other examples, the AMF 215-e may determine that the paging state of the UE 115-f is a paging prohibited state based on receipt of the paging request 705 that includes an indication that the UE 115-f is in the paging prohibited state.

When the AMF 215-*e* determines that the paging state of the UE 115-*f* is a paging prohibited state, the AMF 215-*e* may determine the CM idleness state of the UE 115-*f*. When the AMF 215-*e* determines that the CM idleness state of the UE 115-*f* is the CM idle state, the AMF 215-*e* may determine not to transmit the paging message to the UE 115-*f*, and may transmit a paging request rejection 715 to the SMF 220-*e*. The paging request rejection 220-*e* may include a rejection cause field indicating "UE not pageable" or "User plane resources cannot be established."

Figure 8:
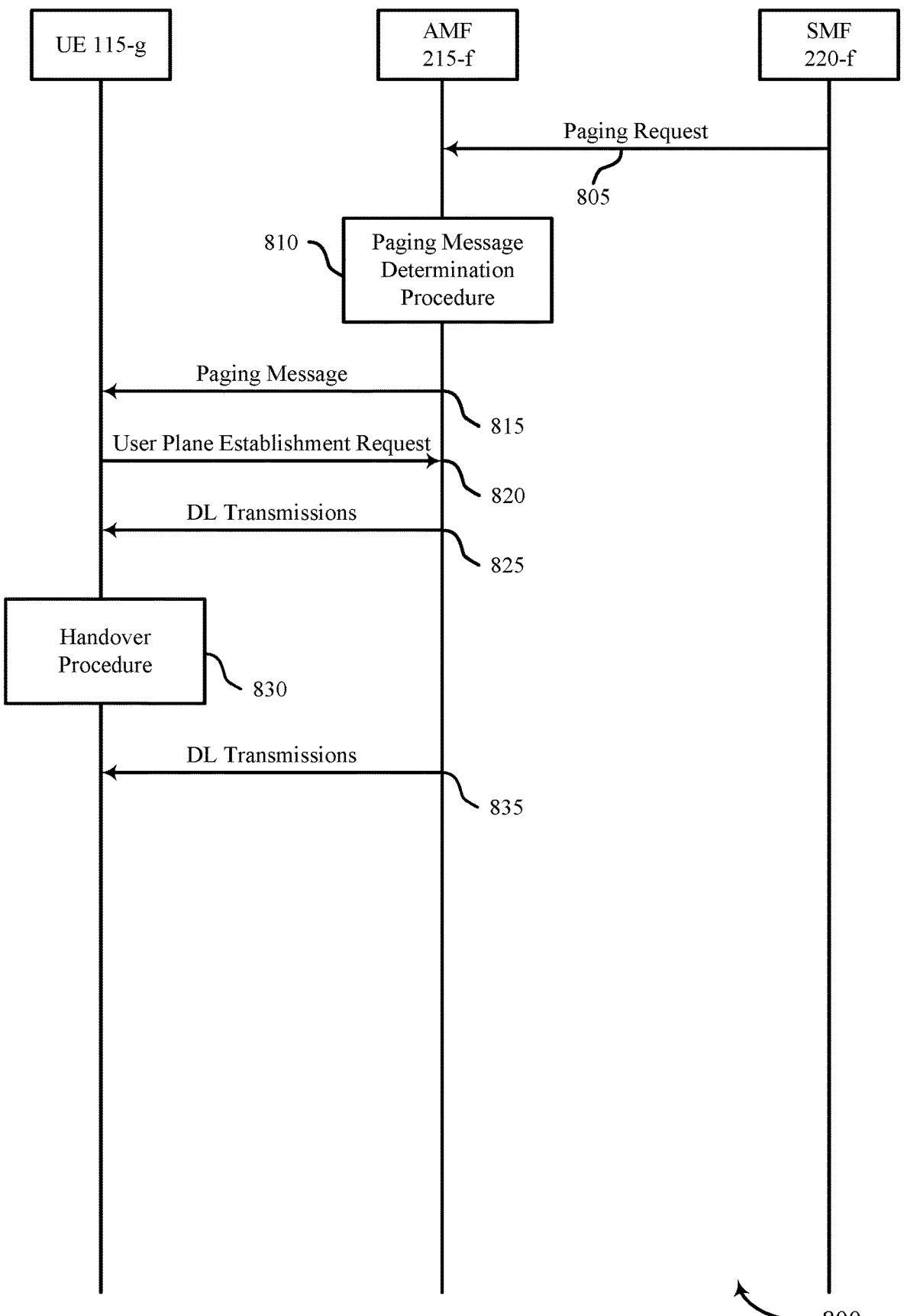
FIG. 8 illustrates an example of a communication flow in a wireless communication network that supports mechanisms for establishing user plane connectivity for non-3GPP access in accordance with one or more aspects of the present disclosure.

FIG. 8 illustrates an example of a communication flow 800 in a wireless communication network in accordance with one or more aspects of the present disclosure. The wireless communication network may include a core network including an AMF 215-*f* and a SMF 220-*f*, which may be examples of aspects of the AMF 215 and the SMF 215 as described with reference to FIG. 2. The wireless communication network may also include an UE 115-*g*, which may be an example of aspects of the UE 115 described with reference to FIG. 1. The UE 115-*g* may be capable of communicating with the AMF 215-*f* over a first RAT (e.g., a 3GPP access) and a second RAT (e.g., a non-3GPP access).

In communications flow 800, the SMF 220-*f* may transmit a paging request 805 to the AMF 215-*f*. The AMF 215-*f* may then perform a paging message determination procedure 810 to determine whether to transmit a paging message to the UE 115-*g*.

In some examples, the paging message determination procedure 810 may include determining the access over which the PDU session related to the paging request 805 is routed. For example, the AMF 215-*f* may store, for each PDU session, a PDU session identifier, an address for the serving SMF (e.g., the SMF 220-*f*), and an indication of the access type over which the PDU session is routed. The indication of the access type over which the PDU session may be stored by the AMF 215-*f* upon receiving a session establishment request regarding the PDU session and may be updated when the AMF 215-*f* receives information indicating that the information should be updated. For example, the AMF 215-*f* may update the indication of the access type over which the PDU session is routed when the UE 115-*g* performs a handover procedure for a PDU session from one access type to another, e.g., from non-3GPP access to 3GPP access. The AMF 215-*f* may receive the PDU session identifier in the paging request 805 and then look up the indication of the access type based on the PDU session identifier. In some other examples, the AMF 215-*f* may receive an indication of the access over which the PDU session related to paging request 805 is routed in paging request 805. When the AMF 215-*f* determines that the PDU session related to paging request 805 is routed over the 3GPP access, the AMF 215-*f* may determine to transmit the paging message to the UE 115-*g*. When the AMF 215-*f* determines that the PDU session related to paging request 805 is routed over the non-3GPP access, the AMF 215-*f* may then determine whether to transmit a paging message to the UE 115-*g* based at least in part on the paging state of the UE 115-*g*, the CM idleness state of the UE 115-*g*, or a combination thereof.

In some examples, the paging message determination procedure 810 includes determining a CM idleness state of the UE 115-*g*. When the AMF 215-*f* determines that the CM idleness state of the UE 115-*g* is a CM idle state, the AMF 215-*f* may determine to transmit the paging message.

The AMF 215-*f* may then transmit a paging message 815 to the UE 115-*g* over the 3GPP access. The UE 115-*g* may receive the paging message 815 and transmit a user plane establishment request 820 over the 3GPP access in response to the paging message. The user plane establishment request 820 may include, or be component of, a service request. In some examples, the UE 115-*g* may ignore policies indicating that one or more PDU sessions are forbidden over the 3GPP access. The AMF 215-*f* may then establish user plane resources for all PDU sessions for which the core network has data ready to transmit and may transmit all data ready for transmission to the UE 115-*g* over the 3GPP access in one or more downlink (DL) transmissions 825.

In some examples, the UE 115-*g* may immediately perform a handover procedure 830 to communicate the PDU session over the non-3GPP access when UE policies indicate that the PDU session is forbidden over 3GPP access. The subsequent DL transmission 835 may then be transmitted over the non-3GPP access. In some other examples, the UE 115-*g* may terminate communication when UE policies indicates that the PDU session is forbidden over 3GPP access.

Figure 9:
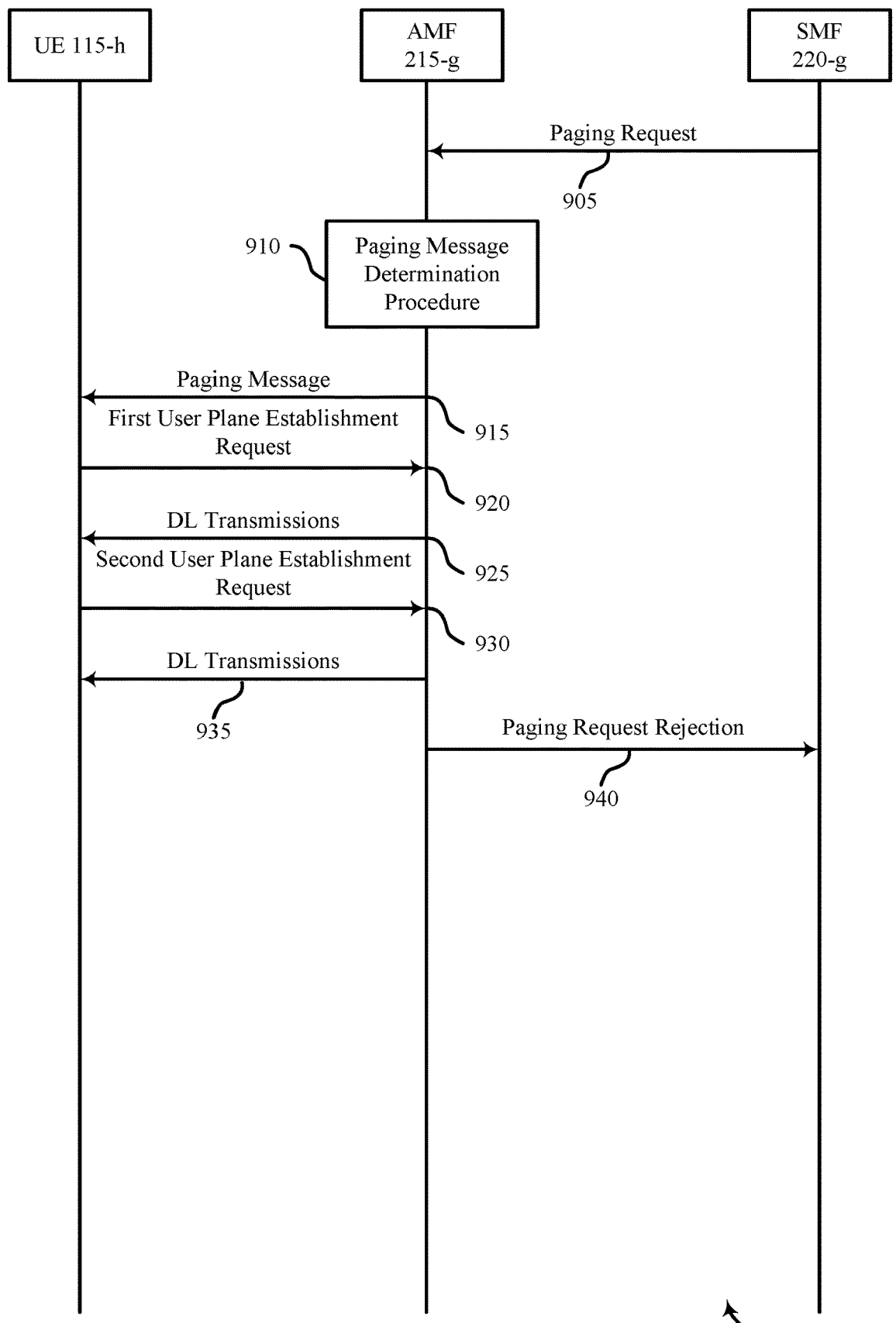
FIG. 9 illustrates an example of a communication flow in a wireless communication network that supports mechanisms for establishing user plane connectivity for non-3GPP access in accordance with one or more aspects of the present disclosure.

FIG. 9 illustrates an example of a communication flow 900 in a wireless communication network in accordance with one or more aspects of the present disclosure. The wireless communication network may include a core network including AMF 215-*g* and SMF 220-*g*, which may be examples of aspects of AMF 215 and SMF 215 as described with reference to FIG. 2. The wireless communication network may also include a UE 115-*h*, which may be an example of aspects of UE 115 described with reference to FIG. 1. UE 115-*h* may be capable of communicating with AMF 215-*g* over a first RAT (e.g., a 3GPP access) and a second RAT (e.g., a non-3GPP access).

In communications flow 900, SMF 220-*g* may transmit a paging request 905 to AMF 215-*g*. The AMF 215-*g* may then perform a paging message determination procedure 910 to determine whether to transmit a paging message to UE 115-*h*.

In some examples, the paging message determination procedure 910 may include determining the access over which the PDU session related to the paging request 905 is routed. For example, the AMF 215-*g* may store, for each PDU session, a PDU session identifier, an address for the serving SMF (e.g., SMF 220-*g*), and an indication of the access type over which the PDU session is routed. The indication of the access type over which the PDU session may be stored by AMF 215-*g* upon receiving a session establishment request regarding the PDU session and may be updated when the AMF 215-*g* receives information indicating that the information should be updated. For example, the AMF 215-*g* may update the indication of the access type over which the PDU session is routed when UE 115-*h* performs a handover procedure for a PDU session from one access type to another, e.g., from non-3GPP access to 3GPP access. The AMF 215-*g* may receive the PDU session identifier in the paging request 905 and then look up the indication of the access type based on the PDU session identifier. In some other examples, AMF 215-*g* may receive an indication of the access over which the PDU session related to paging request 905 is routed in paging request 905. When the AMF 215-*g* determines that the PDU session related to paging request 905 is routed over the 3GPP access, the AMF 215-*g* may determine to transmit the paging message to UE 115-*h*. When the AMF 215-*g* determines that the PDU session related to paging request 905 is routed over the non-3GPP access, the AMF 215-*g* may then determine whether to transmit a paging message to UE 115-*h* based at least in part on the paging state of UE 115-*h*, the CM idleness state of UE 115-*h*, or a combination thereof.

In some examples, the paging message determination procedure 910 includes determining a CM idleness state of UE 115-*h*. When the AMF 215-*g* determines that the CM idleness state of UE 115-*h* is a CM idle state, the AMF 215-*g* may determine to transmit the paging message.

The AMF 215-*g* may then transmit a paging message 915 to UE 115-*h* over the 3GPP access. The UE 115-*h* may receive the paging message 915 and generate a list of PDU sessions that are forbidden over 3GPP and accordingly for which user plane connectivity is not to be re-established over the 3GPP access. The list may be generated based at least in part on policies at the UE 115-*h*. For example, UE 115-*h* may have active PDU sessions PDU1, PDU2, and PDU3. PDU1 may be a PDU session over the 3GPP access, and therefore would not be placed on the list. PDU2 and PDU3 may be a PDU sessions over the non-3GPP access. For both PDU2 and PDU3, UE 115-*h* may determine whether the PDU session is forbidden over 3GPP based on policies at the UE 115-*h*. For example, PDU2 may be a streaming video PDU session over a non-3GPP access, and UE 115-*h* may have a policy that streaming video PDU sessions are forbidden over 3GPP access. On the other hand, the UE 115-*h* may not have any policies that prevent PDU3 from being transmitted over 3GPP access. Accordingly, the UE 115-*h* may include PDU2, but not PDU1 or PDU3, on the list of PDU sessions that are forbidden over 3GPP.

In some examples, the list of PDU sessions may include all PDU sessions active over the non-3GPP access. A PDU session may be described as active over a RAT when the user plane for the PDY session is transported over the RAT when a user plane connection exists for the PDU session. A UE may indicate that the PDU session is active over a RAT by storing, in a CN context, an indication of a RAT type associated with the PDU session. For PDU sessions active over the non-3GPP access, the RAT type would be non-3GPP access.

The UE 115-*h* may then transmit a first user plane establishment request 920 including the list of PDU sessions that are forbidden over 3GPP. The first user plane establishment request may be transmitted over the 3GPP access. The AMF 215-*g* may then transmit one or more DL transmissions 925 to UE 115-*h* over the 3GPP access. The DL transmissions 825 may include data ready for transmissions to UE 115-*h* for PDU sessions that were not included on the list, but may not include data ready for transmission to UE 115-*h* for PDU sessions that were included on the list of PDU sessions forbidden over 3GPP. In some examples, the list of PDU sessions forbidden over 3GPP may include all PDU sessions that have data ready for transmission to UE 115-*h*. In such cases, the AMF 215-*g* may respond to the first user plane establishment request 920 with a service reject message including a rejection cause field indicating "No PDU sessions."

The UE 115-*h* may also transmit a second user plane establishment request 930 to AMF 215-*g* over the non-3GPP access. In some examples, the UE 115-*h* may transmit the second user plane establishment request when the list of PDU sessions that are forbidden over 3GPP contains one or more PDU sessions (e.g., identifies one or more PDU session by a PDU session identifier). In some other examples, UE 115-*h* may transmit the second user plane establishment request 930 in response to receiving a service reject message over the 3GPP access indicating "No PDU Sessions," which the AMF 215-*g* may transmit, e.g., when the list of PDU sessions forbidden over 3GPP includes all PDU sessions that have data ready for transmission to UE 115-*h* In response, the AMF 215-*g* may transmit one or more DL transmissions 935 to UE 115-*h* over the non-3GPP access. The DL transmissions 935 may include data ready for transmission to UE 115-*h* for PDU sessions that were included on the list of PDU sessions forbidden over 3GPP.

In some examples, UE 115-*h* may also include a list of PDU sessions that are preferably transmitted over the non-3GPP access in the first user plane establishment request 920. The AMF 215-*g* may transmit DL data related to PDU sessions that are preferably transmitted over the non-3GPP access over the 3GPP access if the AMF 215-*g* does not receive a second user plane establishment request 930 over the non-3GPP access. However, if the AMF 215-*g* receives the second user plane establishment request 930 over the non-3GPP access, the AMF 215-*g* may transmit DL data related to PDU sessions that are preferably transmitted over the non-3GPP access over the non-3GPP access.

The AMF 215-*g* may also transmit a rejection message 940 to SMF 215-*g* for all PDU sessions for which the AMF 215-*g* received a paging request 905 but was unable to establish a user plane. The rejection message 940 may include a rejection cause field indicating that user plane resources cannot be established for the PDU session.

Figure 10:
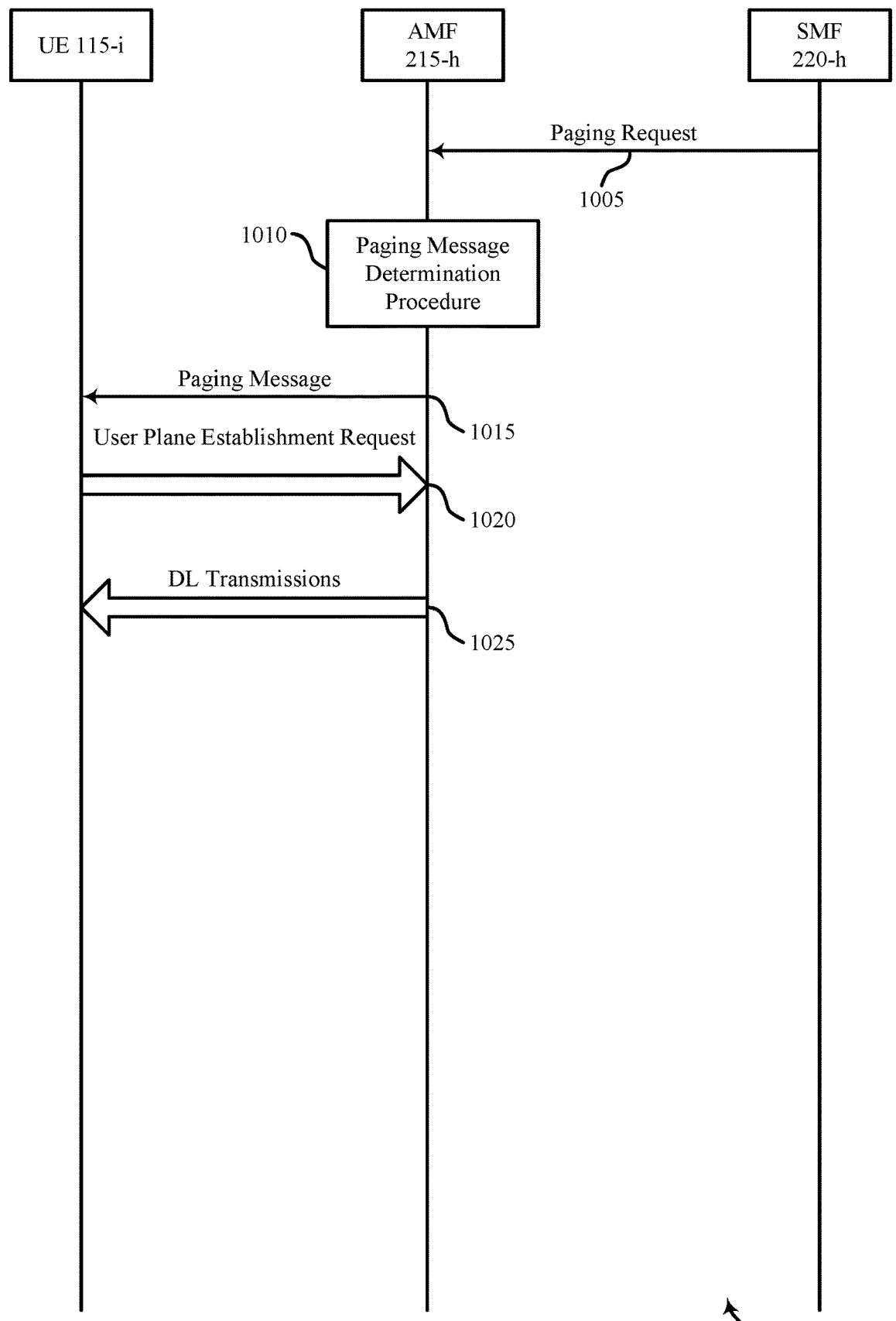
FIG. 10 illustrates an example of a communication flow in a wireless communication network that supports mechanisms for establishing user plane connectivity for non-3GPP access in accordance with one or more aspects of the present disclosure.

FIG. 10 illustrates an example of a communication flow 1000 in a wireless communication network in accordance with one or more aspects of the present disclosure. The wireless communication network may include a core network including AMF 215-*h* and SMF 220-*h*, which may be examples of aspects of AMF 215 and SMF 215 as described with reference to FIG. 2. The wireless communication network may also include a UE 115-*i*, which may be an example of aspects of UE 115 described with reference to FIG. 1. UE 115-*i* may be capable of communicating with AMF 215-*h* over a first RAT (e.g., a 3GPP access) and a second RAT (e.g., a non-3GPP access).

In communications flow 1000, SMF 220-*h* may transmit a paging request 1005 to AMF 215-*h*. The AMF 215-*h* may then perform a paging message determination procedure 1010 to determine whether to transmit a paging message to UE 115-*i*.

In some examples, the paging message determination procedure 1010 may include determining the access over which the PDU session related to the paging request 1005 is routed. For example, the AMF 215-*h* may store, for each PDU session, a PDU session identifier, an address for the serving SMF (e.g., SMF 220-*h*), and an indication of the access type over which the PDU session is routed. The indication of the access type over which the PDU session may be stored by AMF 215-*h* upon receiving a session establishment request regarding the PDU session and may be updated when the AMF 215-*h* receives information indicating that the information should be updated. For example, the AMF 215-*h* may update the indication of the access type over which the PDU session is routed when UE 115-*g* performs a handover procedure for a PDU session from one access type to another, e.g., from non-3GPP access to 3GPP access. The AMF 215-*h* may receive the PDU session identifier in the paging request 1005 and then look up the indication of the access type based on the PDU session identifier. In some other examples, AMF 215-*h* may receive an indication of the access over which the PDU session related to paging request 1005 is routed in paging request 1005. When the AMF 215-*h* determines that the PDU session related to paging request 1005 is routed over the 3GPP access, the AMF 215-*h* may determine to transmit the paging message to UE 115-*i*. When the AMF 215-*h* determines that the PDU session related to paging request 1005 is routed over the non-3GPP access, the AMF 215-*h* may then determine whether to transmit a paging message to UE 115-*i* based at least in part on the paging state of UE 115-*i*, the CM idleness state of UE 115-*i*, or a combination thereof.

In some examples, the paging message determination procedure 1010 includes determining a CM idleness state of UE 115-*i*. When the AMF 215-*h* determines that the CM idleness state of UE 115-*i* is a CM idle state, the AMF 215-*h* may determine to transmit the paging message.

The AMF 215-*h* may then transmit a paging message 1015 to UE 115-*i* over the 3GPP access. The paging message 1015 may include an access type identifier that indicates whether the paging message relates to PDU sessions over 3GPP, PDU sessions over non-3GPP, or PDU sessions over both 3GPP and non-3GPP. In some examples, AMF 215-*h* may store information related to the current status of a PDU session including an association of a user identification with the address of the serving SMF, a PDU session identifier, and an indication of the type of access currently associated with the PDU session, e.g., the access type identifier for the particular PDU session. The AMF 215-*h* may update this information when UE 115-*i* performs a handover procedure for a PDU session from one access type to another, e.g., from non-3GPP access to 3GPP access. In some examples, the AMF 215-*h* may receive PDU session identifiers from SMF 220-*h* and determine the access type identifier to include in the paging message based at least in part on the indications of the type of access currently associated with the PDU sessions for each of the received PDU session identifiers. In some other examples, AMF 215-*h* may inform SMF 220-*h* of the access type for each PDU session, and may receive the access type identifier from the SMF 220-*h* in the paging request 1005.

The UE 115-*i* may then transmit one or more user plane establishment requests 1020 based at least in part on the access type identifier.

For example, when the access type identifier indicates that the paging message 1015 relates to PDU sessions over 3GPP access only, the UE 115-*i* may transmit the user plane establishment request 1020 over 3GPP access. The AMF 215-*h* may then transmit DL transmissions 1025 over the 3GPP access. The UE 115-*i* may also transmit the user plane establishment request 1020 over 3GPP access when the access type identifier does not indicate whether the data to be transmitted relates to PDU sessions over 3GPP access or non-3GPP access.

When the access type identifier indicates that the paging message 1015 relates to PDU sessions over the non-3GPP access only, the UE 115-*i* may transmit the user plane establishment request 1020 over the non-3GPP access. The user plane establishment request 1020 may include a paging message identifier that indicates that the user plane establishment message 1020 was transmitted in response to the paging message 1015. The AMF 215-*h* may then transmit DL transmissions 1025 over the non-3GPP access.

In some examples, the UE 115-*i* may determine, prior to transmitting the user plane establishment request 1020 over the non-3GPP access, that the non-3GPP access is not available (e.g., because there is no WLAN connectivity). In such examples, the UE 115-*i* may transmit the user plane establishment request 1020 over the 3GPP access. The user plane establishment request 1020 may indicate that PDU sessions over the non-3GPP access cannot be established. For example, the user plane establishment request 1020 may include a code indicating that the non-3GPP access is not available.

When the access type identifier indicates that the paging message 1015 relates to PDU sessions over both the 3GPP access and the non-3GPP access, the one or more user plane establishment requests 1020 may include a first user plane establishment request transmitted over the 3GPP access and a second user plane establishment request transmitted over the non-3GPP access. The AMF 215-*h* may then transmit DL transmissions 1025 over the 3GPP access and the non-3GPP access.

Figure 11:
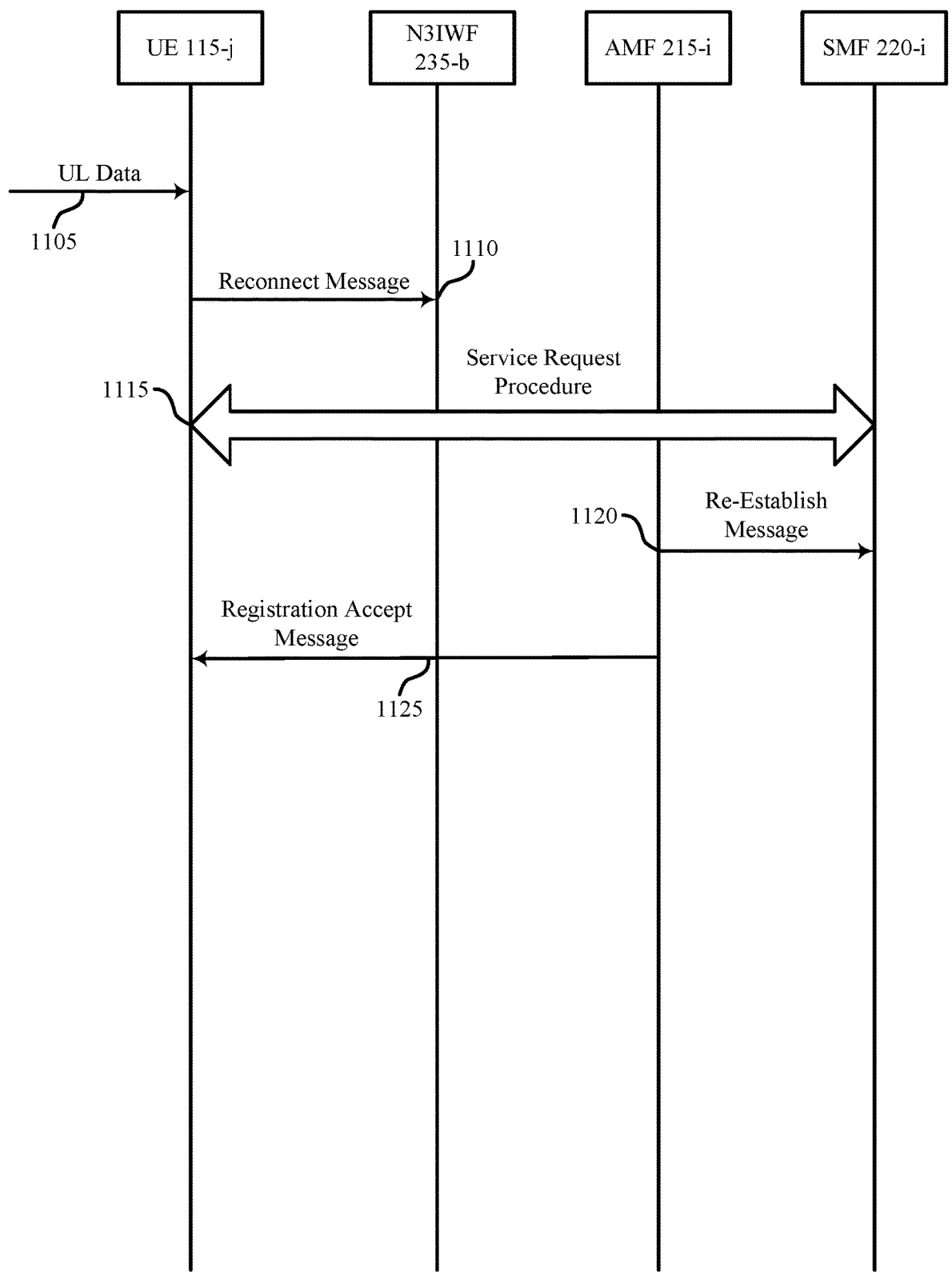
FIG. 11 illustrates an example of a communication flow in a wireless communication network that supports mechanisms for establishing user plane connectivity for non-3GPP access in accordance with one or more aspects of the present disclosure.

FIG. 11 illustrates an example of a communication flow 1100 in a wireless communication network in accordance with one or more aspects of the present disclosure. The wireless communication network may include a core network including AMF 215-*i* and SMF 220-*i*, which may be examples of aspects of AMF 215 and SMF 215 as described with reference to FIG. 2. The core network may also include a N3IWF 235-*b*, which may be an example of N3IWF 235 as described with reference to FIG. 2. The wireless communication network may also include a UE 115-*j*, which may be an example of aspects of UE 115 described with reference to FIG. 1.

Uplink data 1105 may become available at UE 115-*j*. For example, the uplink data 1105 may be generated by UE 115-*j*, or may be received by UE 115-*j* from an external device. The uplink data 1105 may be related to one or more PDU sessions over a first RAT, e.g., a non-3GPP access. UE 115-*j* may be in a CM idle state, and thus may re-establish user plane resources for the one or more PDU sessions in order to transmit the uplink data 1105 to the core network. UE 115-*j* may transmit a reconnect message 1110 to N3IWF 235-*b* to reconnect the connection.

UE 115-*j* may then perform a service request procedure 1115 over the non-3GPP access. The service request procedure 1115 may include transmitting a registration request over the non-3GPP access. The registration request may include an indication of the NAS procedure being "SR" instead of "registration type." The service request procedure 1115 may also include providing a list of identifiers for the PDU sessions for which user plane resources need to be re-established.

In other examples, the service request procedure 1115 may include performing a registration procedure and providing a list of identifiers for the PDU sessions for which user plane resources need to be re-established.

The AMF 215-*i* may then transmit a message 1120 to one or more SMFs 220-*i* corresponding to the PDU session identifiers to re-establish the user plane resources. Upon completion, the AMF 215-*i* transmits a registration accept message 1025 to UE 115-*j*. The registration accept message 1025 may include an indication of the PDU sessions for which user plane resources have been re-established.

Figure 12:
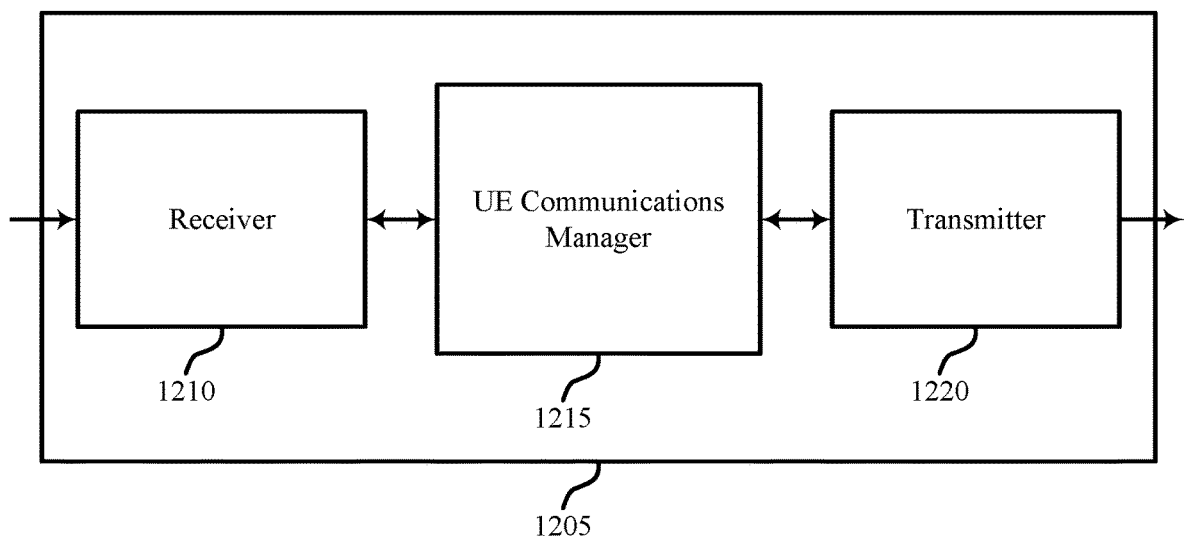
FIGS. 12 through 14 show block diagrams of a device that supports mechanisms for establishing user plane connectivity for non-3GPP access in accordance with one or more aspects of the present disclosure.

FIG. 12 shows a block diagram 1200 of a wireless device 1205 that supports mechanisms for establishing user plane connectivity for non-3GPP access in accordance with one or more aspects of the present disclosure. Wireless device 1205 may be an example of aspects of a UE 115 as described with reference to FIG. 1. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to establishing user plane connectivity for non-3GPP access, etc.). Information may be passed on to other components of the device. The receiver 1210 may be an example of aspects of the transceiver 1535 described with reference to FIG. 15. The receiver 1210 may utilize a single antenna or a set of antennas.

Receiver 1210 may receive a paging request over a second RAT when the indicator indicates that paging is permitted for the PDU session over the first RAT. Further, the receiver may receive, at a wireless device in a CM idle state for both a first RAT and a second RAT, a paging request over the first RAT, downlink data over the first RAT, a service reject message when the list includes all PDU sessions for which downlink data is available, and downlink data over the second RAT. In some cases, the downlink data may include downlink data associated with at least one PDU session that was not included on the list of PDU sessions. In some cases, receiving the paging request may include receiving an access type identifier that identifies at least one RAT type corresponding to the PDU sessions for which the paging request is transmitted. In some cases, the access type identifier may identify the first RAT. In some cases, the access type identifier may identify the second RAT. In some cases, the access type identifier may identify both the first RAT and the second RAT.

UE communications manager 1215 may be an example of aspects of the UE communications manager 1515 described with reference to FIG. 15.

UE communications manager 1215 and/or at least some of its various sub-components may be implemented in hardware, software executed by a processor, firmware, or any combination thereof. If implemented in software executed by a processor, the functions of the UE communications manager 1215 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 1215 and/or at least some of its various sub-components may be physically located at various positions, including being distributed such that portions of functions are implemented at different physical locations by one or more physical devices. In some examples, UE communications manager 1215 and/or at least some of its various sub-components may be a separate and distinct component in accordance with various aspects of the present disclosure. In other examples, UE communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1215 may determine, by a wireless device, whether paging is permitted for a PDU session over a first RAT when the wireless device is in a CM idle state over the first RAT. The UE communications manager 1215 may also initiate a user plane establishment procedure in response to the paging request.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Transmitter 1220 may transmit a session establishment message to a receiving device in a communications network, the session establishment message including an indicator of whether paging is permitted for the PDU session over the first RAT when the wireless device is in a CM idle state over the first RAT. Additionally or alternatively, the transmitter 1220 may transmit a modification request including a second indicator that indicates whether paging is permitted for a PDU session over the first RAT when the wireless device is in CM idle mode. Additionally or alternatively, the transmitter 1220 may transmit a modification request including a second indicator that indicates that paging is not permitted for the PDU session over the first RAT. In some cases, the session establishment message may include a session establishment message for a communication session over the first RAT. In some cases, the session establishment message may include a session establishment message for a communication session over the second RAT. In some cases, the indication may be included in non-access stratum (NAS) signaling.

Figure 13:
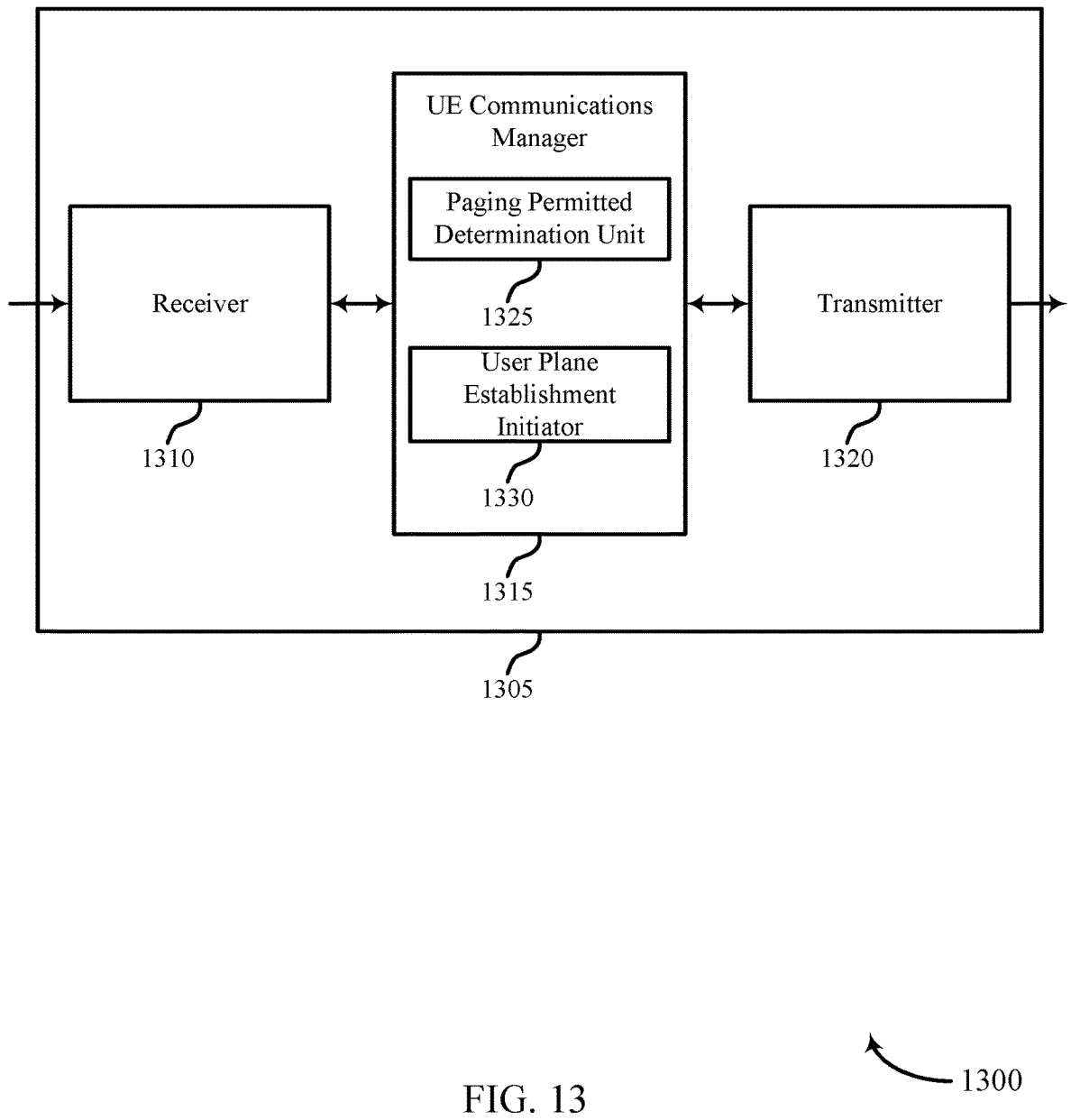

FIG. 13 shows a block diagram 1300 of a wireless device 1305 that supports mechanisms for establishing user plane connectivity for non-3GPP access in accordance with one or more aspects of the present disclosure. Wireless device 1305 may be an example of aspects of a wireless device 1205 or a UE 115 as described with reference to FIGS. 1 and 12. Wireless device 1305 may include receiver 1310, UE communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to establishing user plane connectivity for non-3GPP access, etc.). Information may be passed on to other components of the device. The receiver 1310 may be an example of aspects of the transceiver 1535 described with reference to FIG. 15. The receiver 1310 may utilize a single antenna or a set of antennas.

UE communications manager 1315 may be an example of aspects of the UE communications manager 1515 described with reference to FIG. 15.

UE communications manager 1315 may also include paging permitted determination unit 1325 and user plane establishment initiator 1330.

Paging permitted determination unit 1325 may determine whether paging is permitted for a PDU session over a first RAT when the wireless device is in a CM idle state over the first RAT.

User plane establishment initiator 1330 may initiate a user plane establishment procedure in response to the paging request. Additionally or alternatively, user plane establishment initiator 1330 may initiate the user plane establishment procedure over the second RAT. Additionally or alternatively, user plane establishment initiator 1330 may transmit the list of PDU sessions for which a user plane cannot be established over the first RAT, where the list of PDU session may include all PDU sessions active over the second RAT when the second RAT is not available. Additionally or alternatively, initiating the user plane establishment procedure may include transmitting a service request, the service request may include an indicator of whether paging is permitted for the PDU session over the second RAT when the wireless device is in a CM idle state over the second RAT. Additionally or alternatively, initiating the user plane establishment procedure may include transmitting a service request, the service request may include a cause code indicating that the wireless device is not pageable. In some cases, initiating the user plane establishment procedure may include initiating the user plane establishment procedure over the first RAT and the second RAT when the access type identifier identifies both the first RAT and the second RAT. In some cases, the list of PDU sessions may be generated based on policies associated with each of the PDU sessions. In some cases, the list of PDU sessions may include PDU sessions that are active over the second RAT. In some cases, initiating the user place establishment procedure may include transmitting a service request over the first RAT, the service request including a list of PDU sessions for which a user plane cannot be established over the first RAT. In some cases, the user plane establishment procedure may be initiated over the first RAT when the access type identifier identifies the first RAT. In some cases, the user plane establishment procedure may be initiated over the second RAT when the access type identifier identifies the second RAT. In some cases, initiating the user plane establishment procedure may include transmitting a service request including a response indicator that indicates that the service request is being transmitted in response to the paging request. In some cases, initiating the user plane establishment procedure over the second RAT may include transmitting a registration request over the second RAT, the registration request including a user plane establishment request indicator that indicates that a NAS procedure is a user plane establishment procedure and a list of PDU session identifiers that identify each PDU session for which a user plane is to be re-established. In some cases, initiating the user plane establishment procedure over the second RAT may include performing a registration procedure over the second RAT, where performing the registration procedure includes identifying each PDU session for which a user plane is to be re-established. In some cases, initiating the user plane establishment procedure may include transmitting a message over the first RAT, the message indicating that a user plane for the PDU sessions cannot be established.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
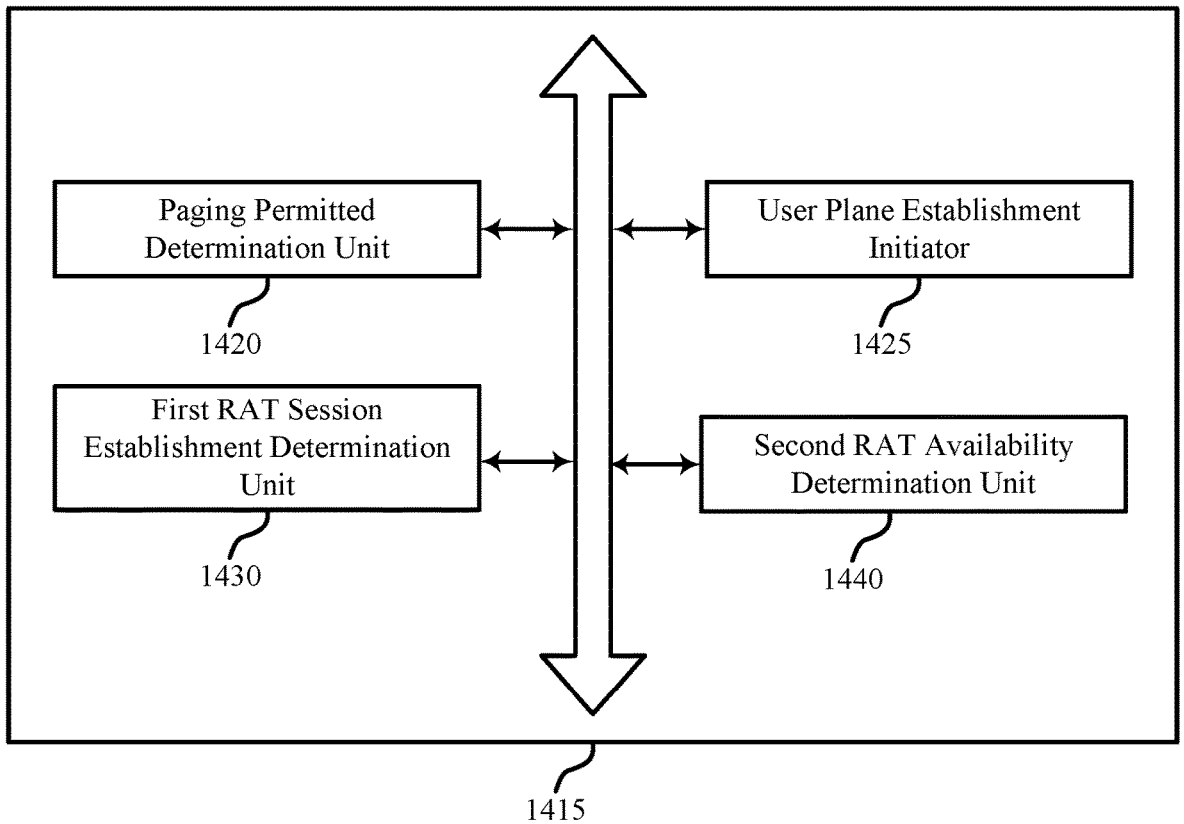

FIG. 14 shows a block diagram 1400 of a UE communications manager 1415 that supports Mechanisms for establishing user plane connectivity for non-3GPP access in accordance with one or more aspects of the present disclosure. The UE communications manager 1415 may be an example of aspects of a UE communications manager 1215, a UE communications manager 1315, or a UE communications manager 1515 described with reference to FIGS. 12, 13, and 15. The UE communications manager 1415 may include paging permitted determination unit 1420, user plane establishment initiator 1425, first RAT session establishment determination unit 1430, undefined 1435, and second RAT availability determination unit 1440. Each of these modules may communicate, directly or indirectly, with one another (e.g., via one or more buses).

Paging permitted determination unit 1420 may determine, by a wireless device, whether paging is permitted for a PDU session over a first RAT when the wireless device is in a CM idle state over the first RAT.

User plane establishment initiator 1425 may initiate a user plane establishment procedure in response to the paging request. Additionally or alternatively, user plane establishment initiator 1425 may initiate the user plane establishment procedure over the second RAT. Additionally or alternatively, user plane establishment initiator 1425 may transmit the list of PDU sessions for which a user plane cannot be established over the first RAT includes all PDU sessions active over the second RAT when the second RAT is not available. Additionally or alternatively, user plane establishment initiator 1425 may initiate the user plane establishment procedure includes transmitting a service request, the service request including an indicator of whether paging is permitted for the PDU session over the second RAT when the wireless device is in a CM idle state over the second RAT. Additionally or alternatively, user plane establishment initiator 1425 may initiate the user plane establishment procedure includes transmitting a service request, the service request including a cause code indicating that the wireless device is not pageable. In some cases, initiating the user plane establishment procedure may include initiating the user plane establishment procedure over the first RAT and the second RAT when the access type identifier identifies both the first RAT and the second RAT. In some cases, the list of PDU sessions may be generated based on policies associated with each of the PDU sessions. In some cases, the list of PDU sessions may include PDU sessions that are active over the second RAT. In some cases, initiating the user place establishment procedure may include transmitting a service request over the first RAT, the service request including a list of PDU sessions for which a user plane cannot be established over the first RAT. In some cases, the user plane establishment procedure may be initiated over the first RAT when the access type identifier identifies the first RAT. In some cases, the user plane establishment procedure may be initiated over the second RAT when the access type identifier identifies the second RAT. In some cases, initiating the user plane establishment procedure may include transmitting a service request including a response indicator that indicates that the service request is being transmitted in response to the paging request. In some cases, initiating the user plane establishment procedure over the second RAT may include transmitting a registration request over the second RAT, the registration request including a user plane establishment request indicator that indicates that a NAS procedure is a user plane establishment procedure and a list of PDU session identifiers that identify each PDU session for which a user plane is to be re-established. In some cases, initiating the user plane establishment procedure over the second RAT may include performing a registration procedure over the second RAT, where performing the registration procedure includes identifying each PDU session for which a user plane is to be re-established. In some cases, initiating the user plane establishment procedure may include transmitting a message over the first RAT, the message indicating that a user plane for the PDU sessions cannot be established.

First RAT session establishment determination unit 1430 may determine that the PDU session is to be established over the first RAT.

In some cases, the first RAT may be a non-3GPP access and the second RAT may be a 3GPP access. In some cases, the receiving device may include an access and mobility management function (AMF) module. In some cases, the receiving device may include a session management function (SMF) module. In some cases, the first RAT may include a non-3GPP access. In some cases, the first RAT may be a 3GPP access and the second RAT may be a non-3GPP access.

Second RAT availability determination unit 1440 may determine whether access to the second RAT is available and determine that a user plane cannot be established for any PDU session over the second RAT when the access type identifier indicates that the paging request relates to a PDU session over the second RAT.

Figure 15:
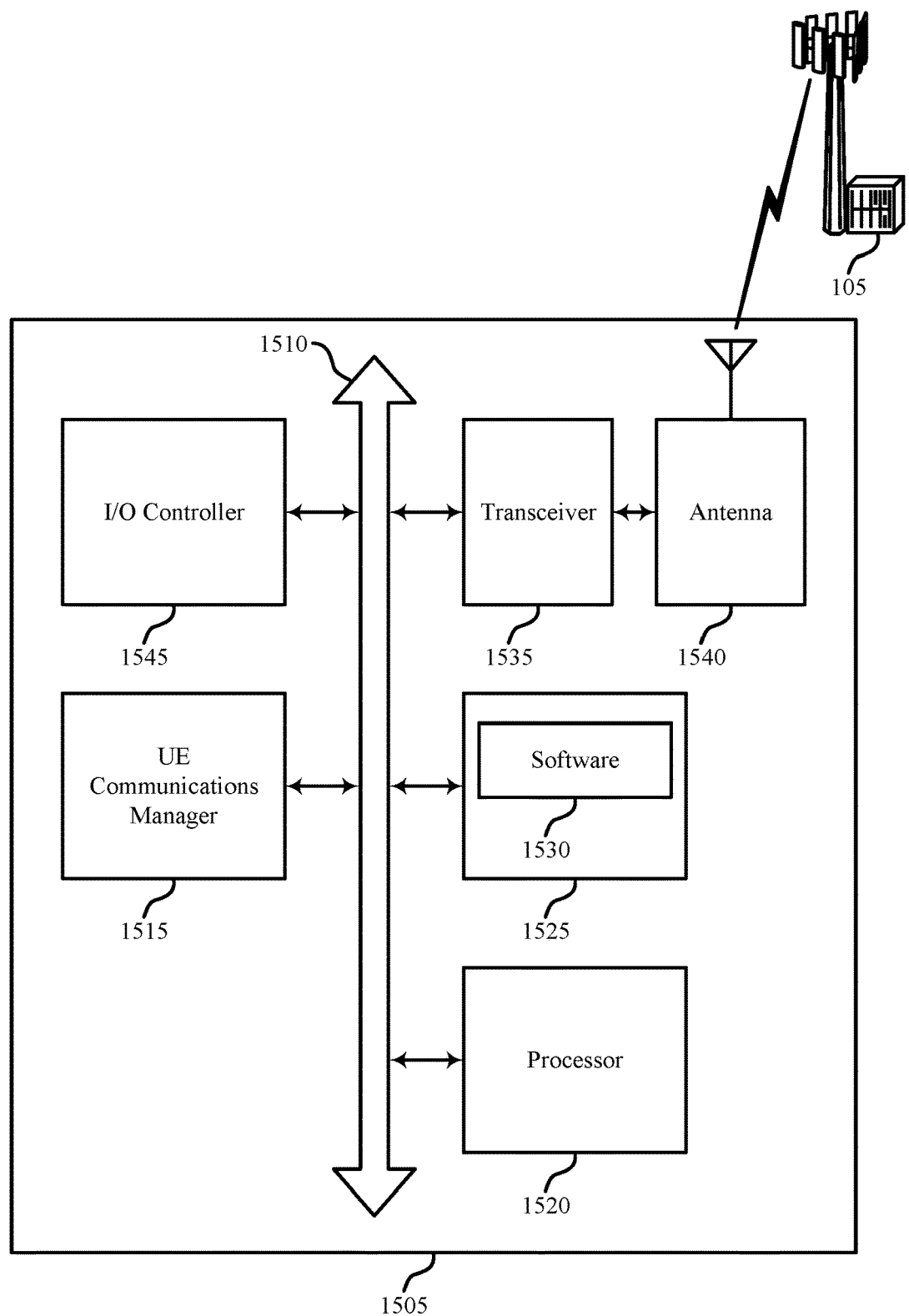
FIG. 15 illustrates a block diagram of a system including a UE that supports mechanisms for establishing user plane connectivity for non-3GPP access in accordance with one or more aspects of the present disclosure.

FIG. 15 shows a diagram of a system 1500 including a device 1505 that supports mechanisms for establishing user plane connectivity for non-3GPP access in accordance with one or more aspects of the present disclosure. Device 1505 may be an example of or include the components of wireless device 1205, wireless device 1305, or a UE 115 as described above, e.g., with reference to FIGS. 1, 12 and 13. Device 1505 may include components for bi-directional voice and data communications including components for transmitting and receiving communications, including UE communications manager 1515, processor 1520, memory 1525, software 1530, transceiver 1535, antenna 1540, and I/O controller 1545. These components may be in electronic communication via one or more busses (e.g., bus 1510). Device 1505 may communicate wirelessly with one or more base stations 105.

Processor 1520 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting Mechanisms for establishing user plane connectivity for non-3GPP access).

Memory 1525 may include random access memory (RAM) and read only memory (ROM). The memory 1525 may store computer-readable, computer-executable software 1530 including instructions that, when executed, cause the processor to perform various functions described herein. In some cases, the memory 1525 may contain, among other things, a basic input/output system (BIOS) which may control basic hardware and/or software operation such as the interaction with peripheral components or devices.

Software 1530 may include code to implement one or more aspects of the present disclosure, including code to support Mechanisms for establishing user plane connectivity for non-3GPP access. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system. In other cases, I/O controller 1545 may represent or interact with a modem, a keyboard, a mouse, a touchscreen, or a similar device. In some cases, I/O controller 1545 may be implemented as part of a processor. In some cases, a user may interact with device 1505 via I/O controller 1545 or via hardware components controlled by I/O controller 1545.

Figure 16:
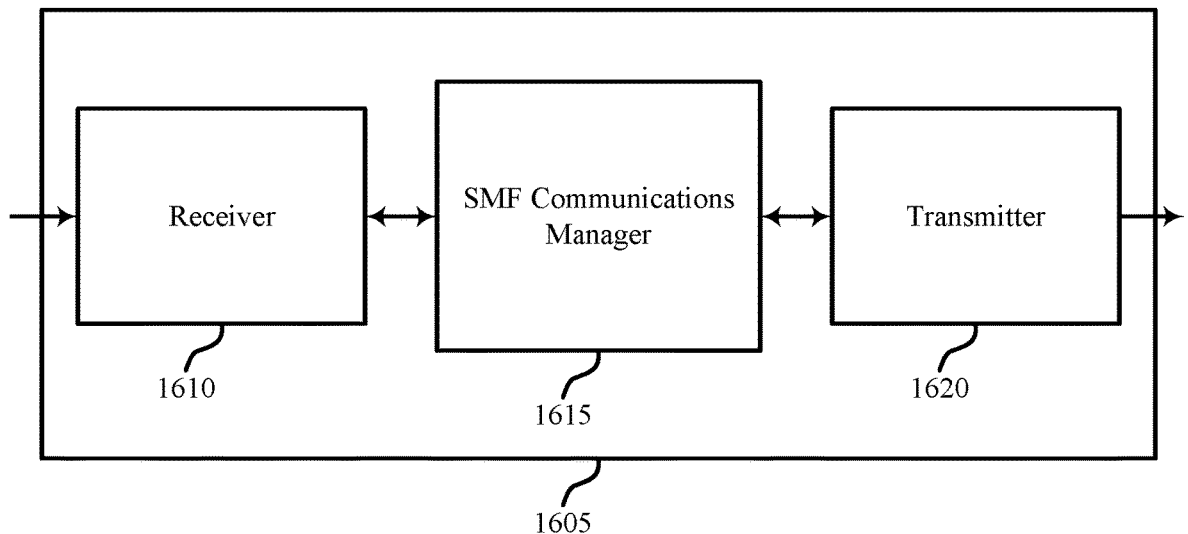
FIGS. 16 through 18 show block diagrams of a device that supports mechanisms for establishing user plane connectivity for non-3GPP access in accordance with one or more aspects of the present disclosure.

FIG. 16 shows a block diagram 1600 of a wireless device 1605 that supports mechanisms for establishing user plane connectivity for non-3GPP access in accordance with one or more aspects of the present disclosure. Wireless device 1605 may be an example of aspects of a SMF 220 as described with reference to FIG. 2. Wireless device 1605 may include receiver 1610, SMF communications manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to establishing user plane connectivity for non-3GPP access, etc.). Information may be passed on to other components of the device. The receiver 1610 may be an example of aspects of the transceiver 1935 described with reference to FIG. 19. The receiver 1610 may utilize a single antenna or a set of antennas.

Receiver 1610 may receive, at a first network device, a notification that there is data to be delivered to a wireless device for a PDU session. Additionally or alternatively, the receiver 1660 may receive a no paging indication from the wireless device prior to determining that the paging state of the wireless device is the paging prohibited state. Additionally or alternatively, the receiver 1660 may receive, from the second network device, a paging request rejection. Additionally or alternatively, the receiver 1660 may receive a paging request rejection in response to the paging request. In some cases, the paging request rejection may indicate that the wireless device is not able to be paged. In some cases, the paging request rejection may indicate that user plane resources cannot be established. In some cases, the paging request rejection may indicate that the wireless device is not able to be paged. In some cases, the paging request rejection may indicate that user plane resources cannot be established. In some cases, determining whether to set the paging state of the network device to the no paging state may include receiving a no paging indication from the wireless device.

SMF communications manager 1615 may be an example of aspects of the SMF communications manager 1915 described with reference to FIG. 19.

SMF communications manager 1615 and/or at least some of its various sub-components may be implemented in hardware, software executed by a processor, firmware, or any combination thereof. If implemented in software executed by a processor, the functions of the SMF communications manager 1615 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The SMF communications manager 1615 and/or at least some of its various sub-components may be physically located at various positions, including being distributed such that portions of functions are implemented at different physical locations by one or more physical devices. In some examples, SMF communications manager 1615 and/or at least some of its various sub-components may be a separate and distinct component in accordance with one or more aspects of the present disclosure. In other examples, SMF communications manager 1615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

SMF communications manager 1615 may determine whether to transmit a paging request to a second network device, based on a paging state of the first network device, a paging state of the wireless device, a CM idleness state of the wireless device, or a combination thereof.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1935 described with reference to FIG. 19. The transmitter 1620 may utilize a single antenna or a set of antennas.

Transmitter 1620 may transmit the paging request to the second network device, the paging request including an indication that the wireless device is in the paging prohibited state and transmit the paging request to the second network device.

Figure 17:
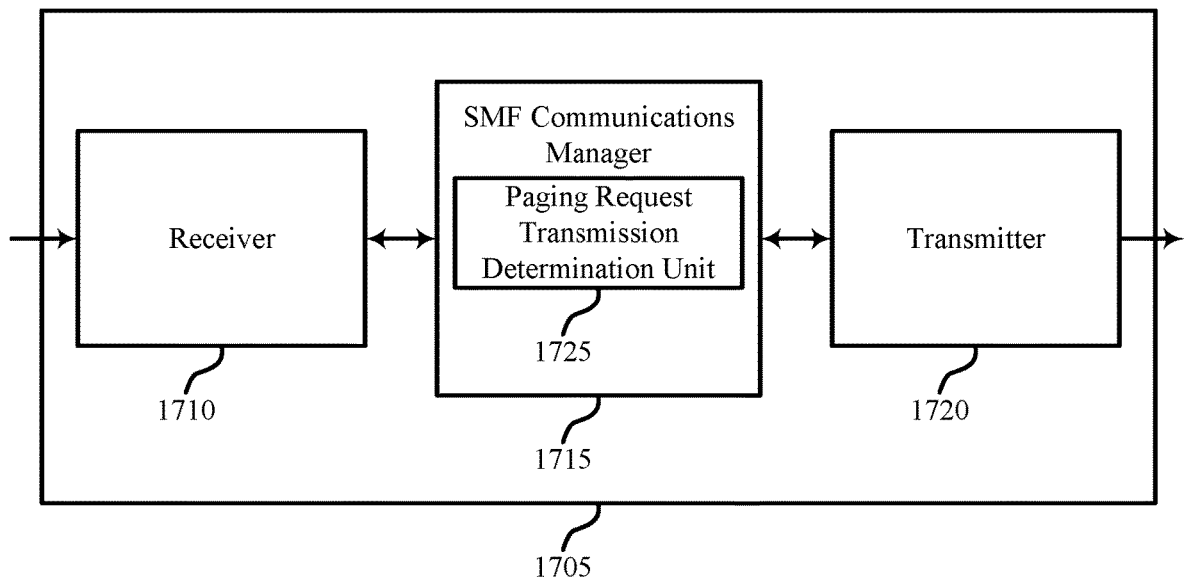

FIG. 17 shows a block diagram 1700 of a wireless device 1705 that supports mechanisms for establishing user plane connectivity for non-3GPP access in accordance with one or more aspects of the present disclosure. Wireless device 1705 may be an example of aspects of a wireless device 1605 or a SMF 220 as described with reference to FIGS. 2 and 16. Wireless device 1705 may include receiver 1710, SMF communications manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to establishing user plane connectivity for non-3GPP access, etc.). Information may be passed on to other components of the device. The receiver 1710 may be an example of aspects of the transceiver 1935 described with reference to FIG. 19. The receiver 1710 may utilize a single antenna or a set of antennas.

SMF communications manager 1715 may be an example of aspects of the SMF communications manager 1915 described with reference to FIG. 19.

SMF communications manager 1715 may also include paging request transmission determination unit 1725.

Paging request transmission determination unit 1725 may determine whether to transmit a paging request to a second network device, based on a paging state of the first network device, a paging state of the wireless device, a CM idleness state of the wireless device, or a combination thereof. Additionally or alternatively, the paging request transmission determination unit 1725 may determine to transmit the paging request to the second network device based on determining that the paging state of the wireless device is unknown. Additionally or alternatively, the paging request transmission determination unit 1725 may determine not to transmit the paging request to the second network device based on determining that the first network device is in the no paging state. Additionally or alternatively, the paging request transmission determination unit 1725 may determine that the CM idleness state of the wireless device is a CM idle state. Additionally or alternatively, the paging request transmission determination unit 1725 may determine not to transmit the paging request to the second network device based on determining that the wireless device is in the paging prohibited state and the wireless device is in the CM idle state. Additionally or alternatively, the paging request transmission determination unit 1725 may determine that the CM idleness state of the wireless device is unknown. Additionally or alternatively, the paging request transmission determination unit 1725 may determine to transmit the paging request to the second network device based on determining that the CM idleness state of the wireless device is unknown. In some cases, determining whether to transmit the paging request may include determining that the paging state of the wireless device is a paging prohibited state. In some cases, determining whether to transmit the paging request may include determining that the paging state of the first network device is a no paging state. In some cases, the first network device may determine that the paging state of the wireless device is the paging prohibited station based on the no paging indication. In some cases, determining whether to transmit the paging request may include determining that the paging state of the wireless device is a paging prohibited state. In some cases, determining whether to transmit the paging request may include determining that the paging state of the wireless device is unknown. In some cases, determining that the paging state of the wireless device is the paging prohibited state may include determining that a subscription profile for the wireless device indicates that the wireless device is in the paging prohibited state.

Transmitter 1720 may transmit signals generated by other components of the device. In some examples, the transmitter 1720 may be collocated with a receiver 1710 in a transceiver module. For example, the transmitter 1720 may be an example of aspects of the transceiver 1935 described with reference to FIG. 19. The transmitter 1720 may utilize a single antenna or a set of antennas.

Figure 18:
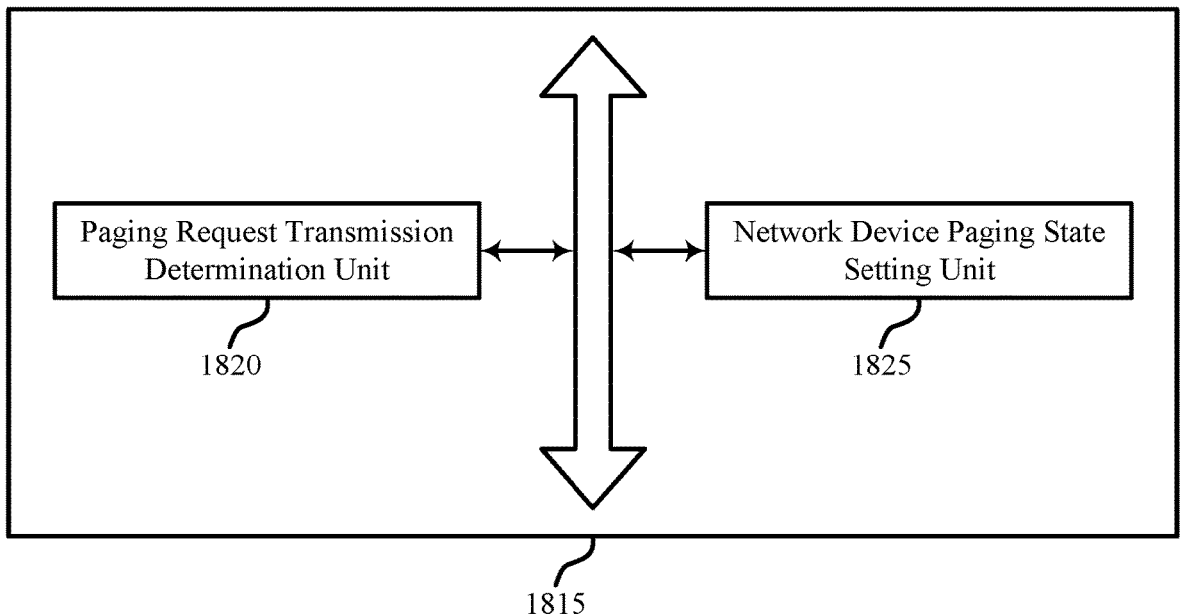

FIG. 18 shows a block diagram 1800 of a SMF communications manager 1815 that supports mechanisms for establishing user plane connectivity for non-3GPP access in accordance with one or more aspects of the present disclosure. The SMF communications manager 1815 may be an example of aspects of a SMF communications manager 1915 described with reference to FIGS. 16, 17, and 19. The SMF communications manager 1815 may include paging request transmission determination unit 1820, network device paging state setting unit 1825, and undefined 1830. Each of these modules may communicate, directly or indirectly, with one another (e.g., via one or more buses).

Paging request transmission determination unit 1820 may determine whether to transmit a paging request to a second network device, based on a paging state of the first network device, a paging state of the wireless device, a CM idleness state of the wireless device, or a combination thereof. Additionally or alternatively, the paging request transmission determination unit 1820 may determine to transmit the paging request to the second network device based on determining that the paging state of the wireless device is unknown. Additionally or alternatively, the paging request transmission determination unit 1820 may determine not to transmit the paging request to the second network device based on determining that the first network device is in the no paging state. Additionally or alternatively, the paging request transmission determination unit 1820 may determine that the CM idleness state of the wireless device is a CM idle state. Additionally or alternatively, the paging request transmission determination unit 1820 may determine not to transmit the paging request to the second network device based on determining that the wireless device is in the paging prohibited state and the wireless device is in the CM idle state. Additionally or alternatively, the paging request transmission determination unit 1820 may determine that the CM idleness state of the wireless device is unknown. Additionally or alternatively, the paging request transmission determination unit 1820 may determine to transmit the paging request to the second network device based on determining that the CM idleness state of the wireless device is unknown. In some cases, determining whether to transmit the paging request may include determining that the paging state of the wireless device is a paging prohibited state. In some cases, determining whether to transmit the paging request may include determining that the paging state of the first network device is a no paging state. In some cases, the first network device may determine that the paging state of the wireless device is the paging prohibited station based on the no paging indication. In some cases, determining whether to transmit the paging request may include determining that the paging state of the wireless device is a paging prohibited state. In some cases, determining whether to transmit the paging request may include determining that the paging state of the wireless device is unknown. In some cases, determining that the paging state of the wireless device is the paging prohibited state may include determining that a subscription profile for the wireless device indicates that the wireless device is in the paging prohibited state.

Network device paging state setting unit 1825 may set the paging state of the first network device to a no paging state. Additionally or alternatively, the network device paging state setting unit 1825 may determine whether to set the paging state of the network device to a no paging state. Additionally or alternatively, the network device paging state setting unit 1825 may determine whether to set the paging state of the first network device to the no paging state based on the no paging indication. Additionally or alternatively, the network device paging state setting unit 1825 may determine whether to set the paging state of the first network device to the no paging state based on the CM idleness state of the wireless device. Additionally or alternatively, the network device paging state setting unit 1825 may set the paging state of the first network device to the no paging state. Additionally or alternatively, the network device paging state setting unit 1825 may set the paging state of the first network device to a paging permitted state when the timer expires. Additionally or alternatively, the network device paging state setting unit 1825 may set the paging state of the first network device to the no paging state includes transmitting a message to a third network device to stop sending notifications to the first network device regarding data to be transmitted to the wireless device. Additionally or alternatively, the network device paging state setting unit 1825 may set the paging state of the first network device to the no paging state includes transmitting a message to a third network device to stop buffering of data to be transmitted to the wireless device. Additionally or alternatively, the network device paging state setting unit 1825 may set the paging state of the first network device to the no paging state includes starting a timer. In some cases, the first RAT may be a non-3GPP access. In some cases, the data may include data to be transmitted to the wireless device over a first RAT. In some cases, the data may include data to be transmitted to the wireless device over a first RAT.

In some cases, the first network device may include a session management function (SMF) module and the second network device may include an access and mobility management function (AMF) module.

Figure 19:
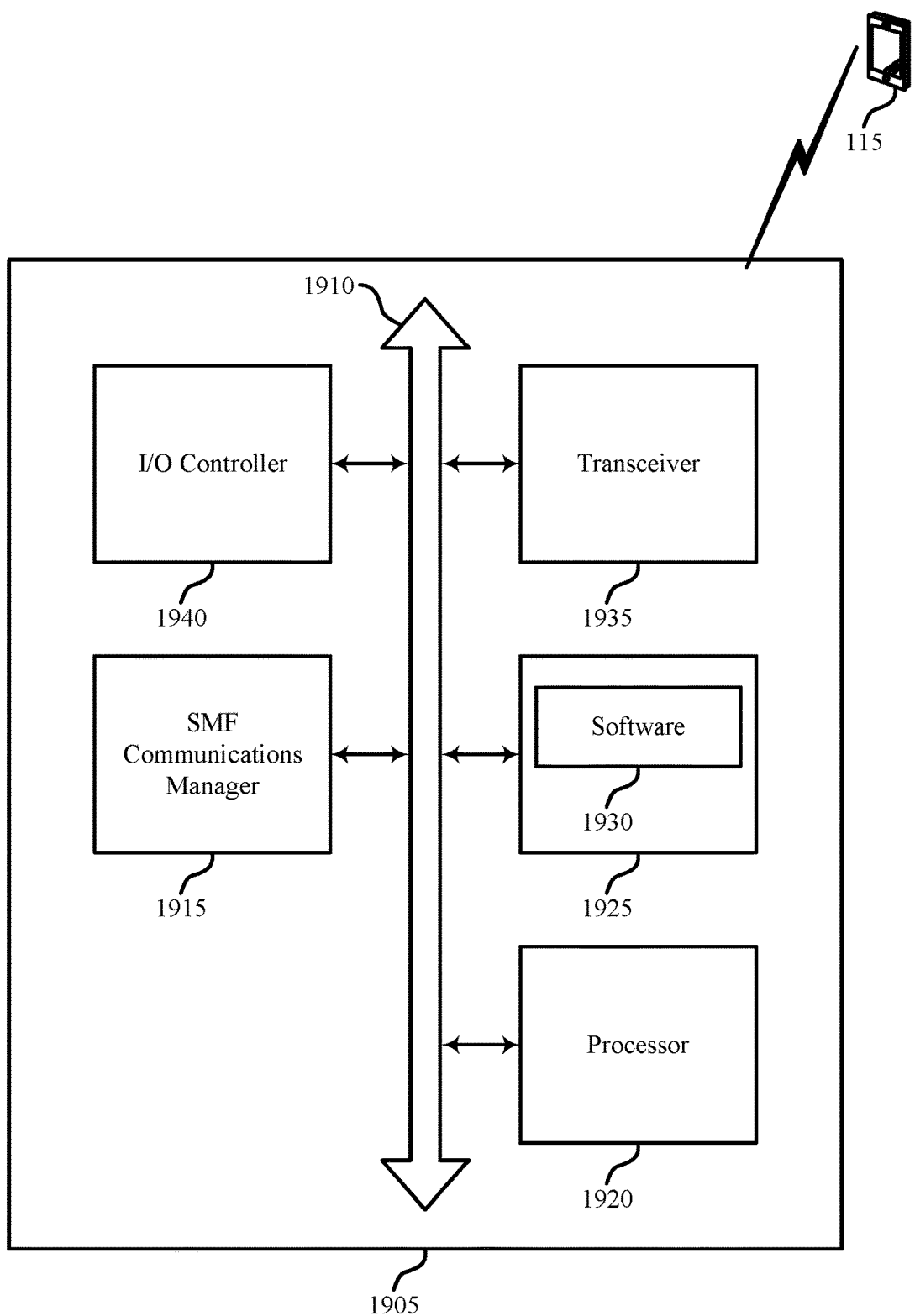
FIG. 19 illustrates a block diagram of a system including a SMF that supports mechanisms for establishing user plane connectivity for non-3GPP access in accordance with one or more aspects of the present disclosure.

FIG. 19 shows a diagram of a system 1900 including a device 1905 that supports mechanisms for establishing user plane connectivity for non-3GPP access in accordance with one or more aspects of the present disclosure. Device 1905 may be an example of or include the components of SMF 220 as described above, e.g., with reference to FIG. 2. Device 1905 may include components for bi-directional voice and data communications including components for transmitting and receiving communications, including SMF communications manager 1915, processor 1920, memory 1925, software 1930, transceiver 1935, and I/O controller 1940. These components may be in electronic communication via one or more busses (e.g., bus 1910).

Processor 1920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1920 may be configured to operate a memory array using a memory controller. In other cases, a memory controller may be integrated into processor 1920. Processor 1920 may be configured to execute computer-readable instructions stored in a memory to perform various functions (e.g., functions or tasks supporting mechanisms for establishing user plane connectivity for non-3GPP access).

Memory 1925 may include RAM and ROM. The memory 1925 may store computer-readable, computer-executable software 1930 including instructions that, when executed, cause the processor to perform various functions described herein. In some cases, the memory 1925 may contain, among other things, a BIOS which may control basic hardware and/or software operation such as the interaction with peripheral components or devices.

Software 1930 may include code to implement one or more aspects of the present disclosure, including code to support mechanisms for establishing user plane connectivity for non-3GPP access. Software 1930 may be stored in a non-transitory computer-readable medium such as system memory or other memory. In some cases, the software 1930 may not be directly executable by the processor but may cause a computer (e.g., when compiled and executed) to perform functions described herein.

Transceiver 1935 may communicate bi-directionally, via one or more antennas, wired, or wireless links as described above. For example, the transceiver 1935 may represent a wireless transceiver and may communicate bi-directionally with another wireless transceiver. The transceiver 1935 may also include a modem to modulate the packets and provide the modulated packets to the antennas for transmission, and to demodulate packets received from the antennas.

I/O controller 1940 may manage input and output signals for device 1905. I/O controller 1940 may also manage peripherals not integrated into device 1905. In some cases, I/O controller 1940 may represent a physical connection or port to an external peripheral. In some cases, I/O controller 1940 may utilize an operating system such as iOS®, ANDROID®, MS-DOS®, MS-WINDOWS®, OS/2®, UNIX®, LINUX®, or another known operating system. In other cases, I/O controller 1940 may represent or interact with a modem, a keyboard, a mouse, a touchscreen, or a similar device. In some cases, I/O controller 1940 may be implemented as part of a processor. In some cases, a user may interact with device 1905 via I/O controller 1940 or via hardware components controlled by I/O controller 1940.

Figure 20:
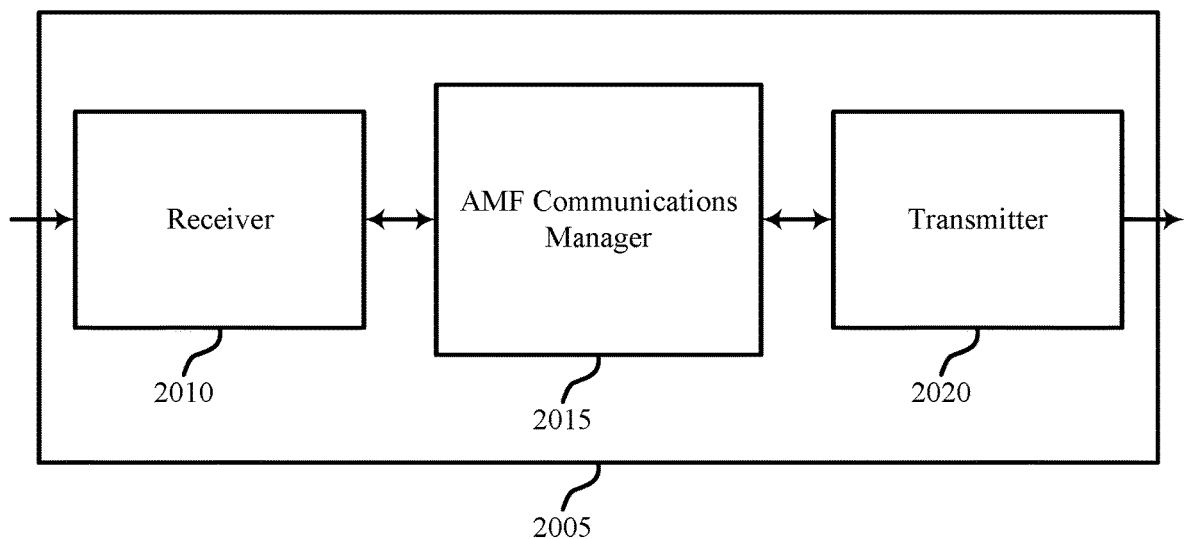
FIGS. 20 through 22 show block diagrams of a device that supports mechanisms for establishing user plane connectivity for non-3GPP access in accordance with one or more aspects of the present disclosure.

FIG. 20 shows a block diagram 2000 of a wireless device 2005 that supports mechanisms for establishing user plane connectivity for non-3GPP access in accordance with one or more aspects of the present disclosure. Wireless device 2005 may be an example of aspects of a AMF 215 as described with reference to FIG. 2. Wireless device 2005 may include receiver 2010, AMF communications manager 2015, and transmitter 2020. Wireless device 2005 may also include a processor. Each of these components may be in communication with one another (e.g., via one or more buses).

Receiver 2010 may receive information such as packets, user data, or control information associated with various information channels (e.g., control channels, data channels, and information related to establishing user plane connectivity for non-3GPP access, etc.). Information may be passed on to other components of the device. The receiver 2010 may be an example of aspects of the transceiver 2335 described with reference to FIG. 23. The receiver 2010 may utilize a single antenna or a set of antennas.

Receiver 2010 may receive, at a first network device, a paging request related to data to be delivered to a wireless device for at least one PDU session over a first RAT. Additionally or alternatively, the receiver 2010 may receive a second user plane establishment request over the second RAT in response to the paging message. Additionally or alternatively, the receiver 2010 may determine that the paging state of the wireless device is a paging prohibited state. Additionally or alternatively, the receiver 2010 may receive an indication that the paging state of the wireless device is a paging prohibited state in the paging request. Additionally or alternatively, the receiver 2010 may receive a user plane establishment request in response to the paging message over the second RAT. Additionally or alternatively, the receiver 2010 may determine that the paging state of the wireless device is the paging prohibited state. Additionally or alternatively, the receiver 2010 may receive an indication that the paging state of the wireless device is a paging prohibited state from the wireless device. Additionally or alternatively, the receiver 2010 may receive a second user plane establishment request in response to the paging message over the first RAT. Additionally or alternatively, the receiver 2010 may receive a user plane establishment request over the second RAT in response to the paging message. Additionally or alternatively, the receiver 2010 may receive a user plane establishment request over the second RAT in response to the paging message, the user plane establishment request indicating that a communication session over the first RAT cannot be established. Additionally or alternatively, the receiver 2010 may receive a user plane establishment request over the first RAT in response to the paging message, the user plane establishment request including a paging message identifier that indicates that the user plane establishment request was sent in response to the paging message. Additionally or alternatively, the receiver 2010 may receive a first user plane establishment request over the first RAT in response to the paging message. Additionally or alternatively, the receiver 2010 may receive a first user plane establishment request in response to the paging message over the second RAT, the first user plane establishment request including a list of PDU sessions that are forbidden over the second RAT. In some cases, the paging request rejection may include an indication that user plane resources cannot be established. In some cases, the paging request rejection may include an indication that the wireless device is not pageable. In some cases, the paging request rejection may include an indication that user plane resources cannot be established.

AMF communications manager 2015 may be an example of aspects of the AMF communications manager 2315 described with reference to FIG. 23.

AMF communications manager 2015 and/or at least some of its various sub-components may be implemented in hardware, software executed by a processor, firmware, or any combination thereof. If implemented in software executed by a processor, the functions of the AMF communications manager 2015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The AMF communications manager 2015 and/or at least some of its various sub-components may be physically located at various positions, including being distributed such that portions of functions are implemented at different physical locations by one or more physical devices. In some examples, AMF communications manager 2015 and/or at least some of its various sub-components may be a separate and distinct component in accordance with various aspects of the present disclosure. In other examples, AMF communications manager 2015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

AMF communications manager 2015 may determine whether to transmit a paging message to the wireless device based on a paging state of the wireless device, a CM idleness state of the wireless device, or a combination thereof.

Transmitter 2020 may transmit signals generated by other components of the device. In some examples, the transmitter 2020 may be collocated with a receiver 2010 in a transceiver module. For example, the transmitter 2020 may be an example of aspects of the transceiver 2335 described with reference to FIG. 23. The transmitter 2020 may utilize a single antenna or a set of antennas.

Transmitter 2020 may transmit the data to the wireless device over the second RAT. Additionally or alternatively, the transmitter 2020 may transmit a data message to the wireless device over the second RAT, the data message including data related to PDU sessions not included in the list of PDU sessions that are forbidden over the second RAT. Additionally or alternatively, the transmitter 2020 may transmit a data message to the wireless device over the first RAT. In some cases, the paging message may include an access type identifier that indicates whether the paging message relates to a PDU session over the first RAT or a PDU session over the second RAT. In some cases, the access type identifier may indicate that the paging message relates to a PDU session over the second RAT. In some cases, the access type identifier may indicate that the paging message relates to a PDU session over the first RAT. In some cases, the access type identifier may indicate that the paging message relates to a PDU session over the first RAT and a PDU session over the second RAT.

Figure 21:
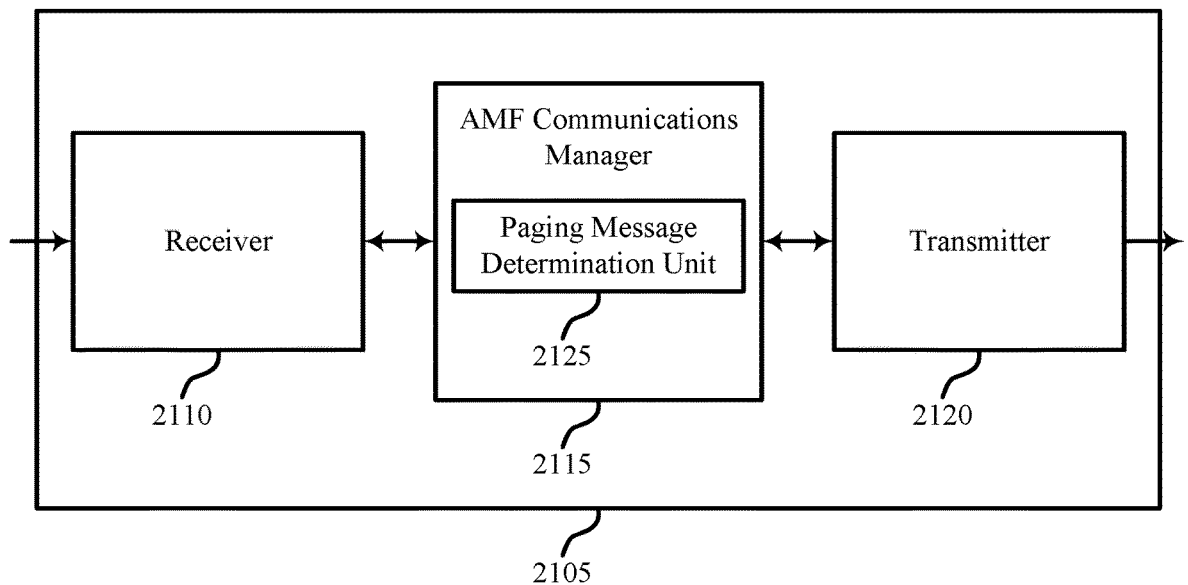

FIG. 21 shows a block diagram 2100 of a wireless device 2105 that supports mechanisms for establishing user plane connectivity for non-3GPP access in accordance with one or more aspects of the present disclosure. Wireless device 2105 may be an example of aspects of a wireless device 2005 or a AMF 220 as described with reference to FIGS. 2 and 20. Wireless device 2105 may include receiver 2110, AMF communications manager 2115, and transmitter 2120. Wireless device 2105 may also include a processor. Each of these components may be in communication with one another (e.g., via one or more buses).

Receiver 2110 may receive information such as packets, user data, or control information associated with various information channels (e.g., control channels, data channels, and information related to establishing user plane connectivity for non-3GPP access, etc.). Information may be passed on to other components of the device. The receiver 2110 may be an example of aspects of the transceiver 2335 described with reference to FIG. 23. The receiver 2110 may utilize a single antenna or a set of antennas.

AMF communications manager 2115 may be an example of aspects of the AMF communications manager 2315 described with reference to FIG. 23.

AMF communications manager 2115 may also include paging message determination unit 2125.

Paging message determination unit 2125 may determine whether to transmit a paging message to the wireless device based on a paging state of the wireless device, an CM idleness state of the wireless device, or a combination thereof, determine that the CM idleness state of the wireless device is a CM idle state. Additionally or alternatively, the paging message determination unit 2125 may determine not to transmit the paging message to the wireless device based on determining that the paging state of the wireless device is a paging prohibited state and determining that the CM idleness state of the wireless device is a CM idle state. Additionally or alternatively, the paging message determination unit 2125 may determine to transmit the paging message to the wireless device based on determining that the CM idleness state of the wireless device is a CM idle state. Additionally or alternatively, the paging message determination unit 2125 may transmit the paging message to the wireless device over a second RAT. In some cases, determining whether to transmit the paging message to the wireless device may include determining that the paging state of the wireless device is a paging prohibited state. In some cases, determining whether to transmit the paging request to the wireless device may include determining that the CM idleness state of the wireless device is a CM idle state.

Transmitter 2120 may transmit signals generated by other components of the device. In some examples, the transmitter 2120 may be collocated with a receiver 2110 in a transceiver module. For example, the transmitter 2120 may be an example of aspects of the transceiver 2335 described with reference to FIG. 23. The transmitter 2120 may utilize a single antenna or a set of antennas.

Figure 22:
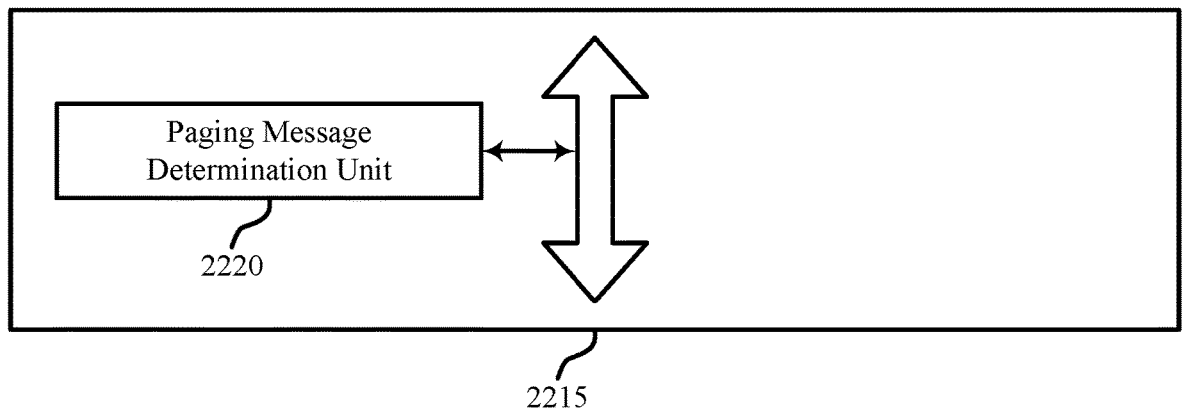

FIG. 22 shows a block diagram 2200 of a AMF communications manager 2215 that supports mechanisms for establishing user plane connectivity for non-3GPP access in accordance with one or more aspects of the present disclosure. The AMF communications manager 2215 may be an example of aspects of a AMF communications manager 2315 described with reference to FIGS. 20, 21, and 23. The AMF communications manager 2215 may include paging message determination unit 2220 and undefined 2225. Each of these modules may communicate, directly or indirectly, with one another (e.g., via one or more buses).

Paging message determination unit 2220 may determine whether to transmit a paging message to the wireless device based on a paging state of the wireless device, an CM idleness state of the wireless device, or a combination thereof. Additionally or alternatively, the paging message determination unit 2220 may determine that the CM idleness state of the wireless device is a CM idle state Additionally or alternatively, the paging message determination unit 2220 may determine not to transmit the paging message to the wireless device based on determining that the paging state of the wireless device is a paging prohibited state and determining that the CM idleness state of the wireless device is a CM idle state. Additionally or alternatively, the paging message determination unit 2220 may determine to transmit the paging message to the wireless device based on determining that the CM idleness state of the wireless device is a CM idle state. Additionally or alternatively, the paging message determination unit 2220 may transmit the paging message to the wireless device over a second RAT. In some cases, determining whether to transmit the paging message to the wireless device may include determining that the paging state of the wireless device is a paging prohibited state. In some cases, determining whether to transmit the paging request to the wireless device may include determining that the CM idleness state of the wireless device is a CM idle state.

In some cases, the first RAT may be a non-3GPP access and the second RAT may be a 3GPP access. In some cases, the first network device may include an access and mobility management function (AMF) module.

Figure 23:
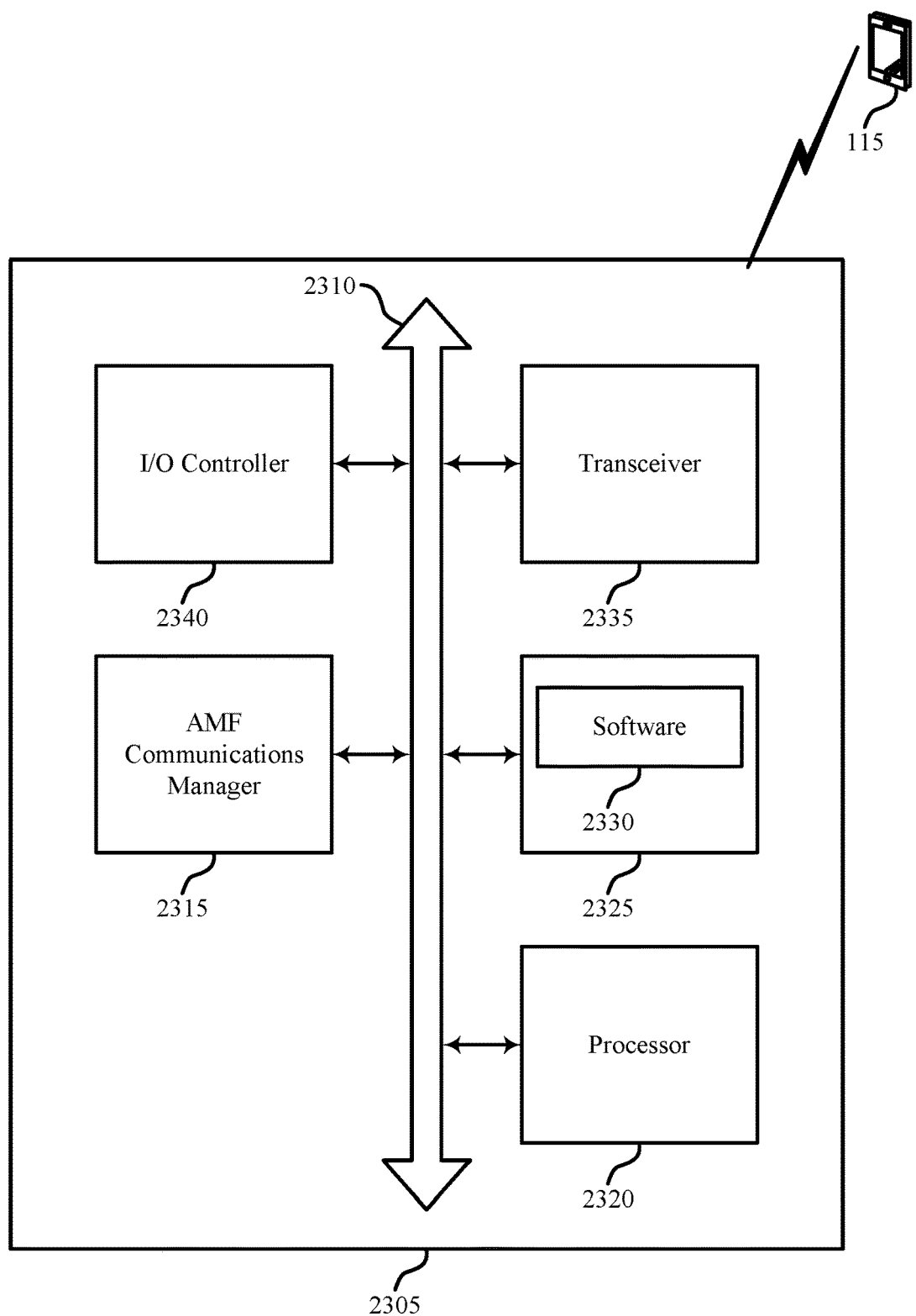
FIG. 23 illustrates a block diagram of a system including an AMF that supports mechanisms for establishing user plane connectivity for non-3GPP access in accordance with one or more aspects of the present disclosure.

FIG. 23 shows a diagram of a system 2300 including a device 2305 that supports mechanisms for establishing user plane connectivity for non-3GPP access in accordance with one or more aspects of the present disclosure. Device 2305 may be an example of or include the components of AMF 220 as described above, e.g., with reference to FIG. 2. Device 2305 may include components for bi-directional voice and data communications including components for transmitting and receiving communications, including AMF communications manager 2315, processor 2320, memory 2325, software 2330, transceiver 2335, and I/O controller 2340. These components may be in electronic communication via one or more busses (e.g., bus 2310).

Processor 2320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2320 may be configured to operate a memory array using a memory controller. In other cases, a memory controller may be integrated into processor 2320. Processor 2320 may be configured to execute computer-readable instructions stored in a memory to perform various functions (e.g., functions or tasks supporting mechanisms for establishing user plane connectivity for non-3GPP access).

Memory 2325 may include RAM and ROM. The memory 2325 may store computer-readable, computer-executable software 2330 including instructions that, when executed, cause the processor to perform various functions described herein. In some cases, the memory 2325 may contain, among other things, a BIOS which may control basic hardware and/or software operation such as the interaction with peripheral components or devices.

Software 2330 may include code to implement one or more aspects of the present disclosure, including code to support Mechanisms for establishing user plane connectivity for non-3GPP access. Software 2330 may be stored in a non-transitory computer-readable medium such as system memory or other memory. In some cases, the software 2330 may not be directly executable by the processor but may cause a computer (e.g., when compiled and executed) to perform functions described herein.

Transceiver 2335 may communicate bi-directionally, via one or more antennas, wired, or wireless links as described above. For example, the transceiver 2335 may represent a wireless transceiver and may communicate bi-directionally with another wireless transceiver. The transceiver 2335 may also include a modem to modulate the packets and provide the modulated packets to the antennas for transmission, and to demodulate packets received from the antennas.

I/O controller 2340 may manage input and output signals for device 2305. I/O controller 2340 may also manage peripherals not integrated into device 2305. In some cases, I/O controller 2340 may represent a physical connection or port to an external peripheral. In some cases, I/O controller 2340 may utilize an operating system such as iOS®, ANDROID®, MS-DOS®, MS-WINDOWS®, OS/2®, UNIX®, LINUX®, or another known operating system. In other cases, I/O controller 2340 may represent or interact with a modem, a keyboard, a mouse, a touchscreen, or a similar device. In some cases, I/O controller 2340 may be implemented as part of a processor. In some cases, a user may interact with device 2305 via I/O controller 2340 or via hardware components controlled by I/O controller 2340.

Figure 24:
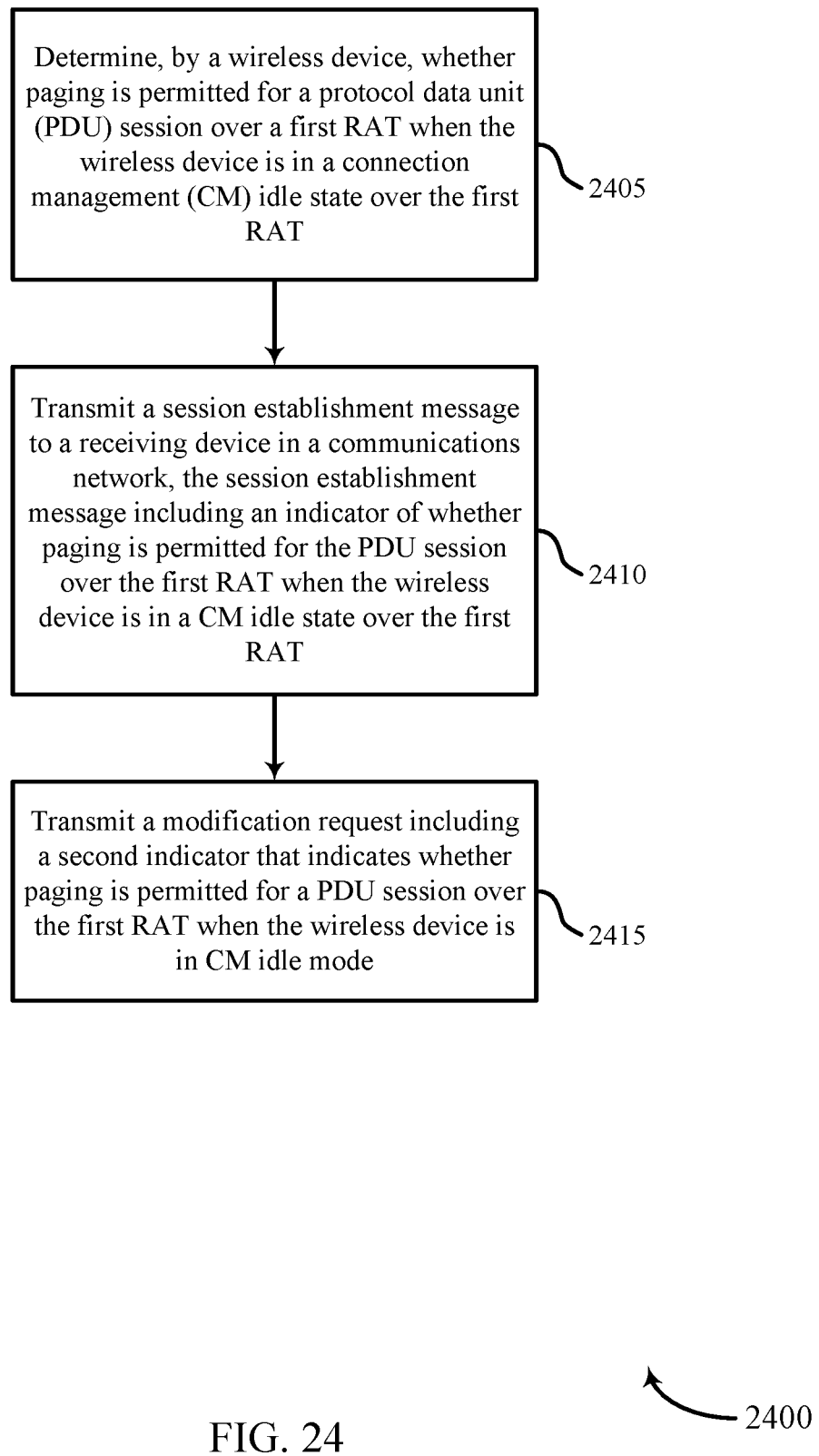
FIGS. 24 through 27 illustrate methods for mechanisms for establishing user plane connectivity for non-3GPP access in accordance with one or more aspects of the present disclosure.

FIG. 24 shows a flowchart illustrating a method 2400 for mechanisms for establishing user plane connectivity for non-3GPP access in accordance with one or more aspects of the present disclosure. The operations of method 2400 may be implemented by a UE 115 or its components as described herein. For example, the operations of method 2400 may be performed by a UE communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2405 the UE 115 may determine, by a wireless device, whether paging is permitted for a PDU session over a first RAT when the wireless device is in a CM idle state over the first RAT. The operations of block 2405 may be performed according to the methods described with reference to FIGS. 1 through 11. In certain examples, aspects of the operations of block 2405 may be performed by a paging permitted determination unit as described with reference to FIGS. 12 through 15.

At block 2410 the UE 115 may transmit a session establishment message to a receiving device in a communications network, the session establishment message comprising an indicator of whether paging is permitted for the PDU session over the first RAT when the wireless device is in a CM idle state over the first RAT. The operations of block 2410 may be performed according to the methods described with reference to FIGS. 1 through 11. In certain examples, aspects of the operations of block 2410 may be performed by a transmitter as described with reference to FIGS. 12 through 15.

At block 2415 the UE 115 may transmit a modification request comprising a second indicator that indicates whether paging is permitted for a PDU session over the first RAT when the wireless device is in CM idle mode. The operations of block 2415 may be performed according to the methods described with reference to FIGS. 1 through 11. In certain examples, aspects of the operations of block 2415 may be performed by a transmitter as described with reference to FIGS. 12 through 15.

Figure 25:
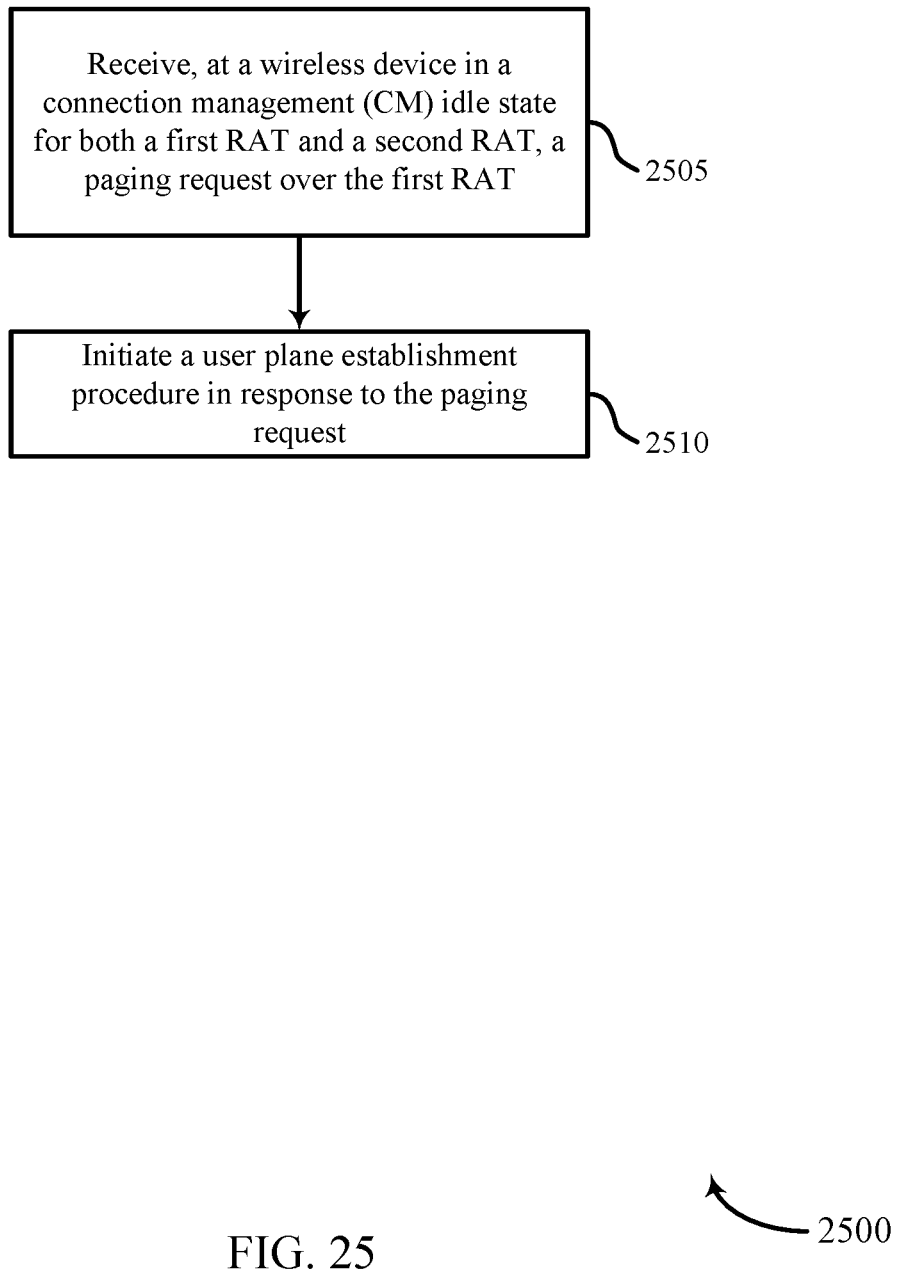

FIG. 25 shows a flowchart illustrating a method 2500 for mechanisms for establishing user plane connectivity for non-3GPP access in accordance with one or more aspects of the present disclosure. The operations of method 2500 may be implemented by a UE 115 or its components as described herein. For example, the operations of method 2500 may be performed by a UE communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2505 the UE 115 may receive, at a wireless device in a CM idle state for both a first RAT and a second RAT, a paging request over the first RAT. The operations of block 2505 may be performed according to the methods described with reference to FIGS. 1 through 11. In certain examples, aspects of the operations of block 2505 may be performed by a receiver as described with reference to FIGS. 12 through 15.

At block 2510 the UE 115 may initiate a user plane establishment procedure in response to the paging request. The operations of block 2510 may be performed according to the methods described with reference to FIGS. 1 through 11. In certain examples, aspects of the operations of block 2510 may be performed by a user plane establishment initiator as described with reference to FIGS. 12 through 15.

Figure 26:
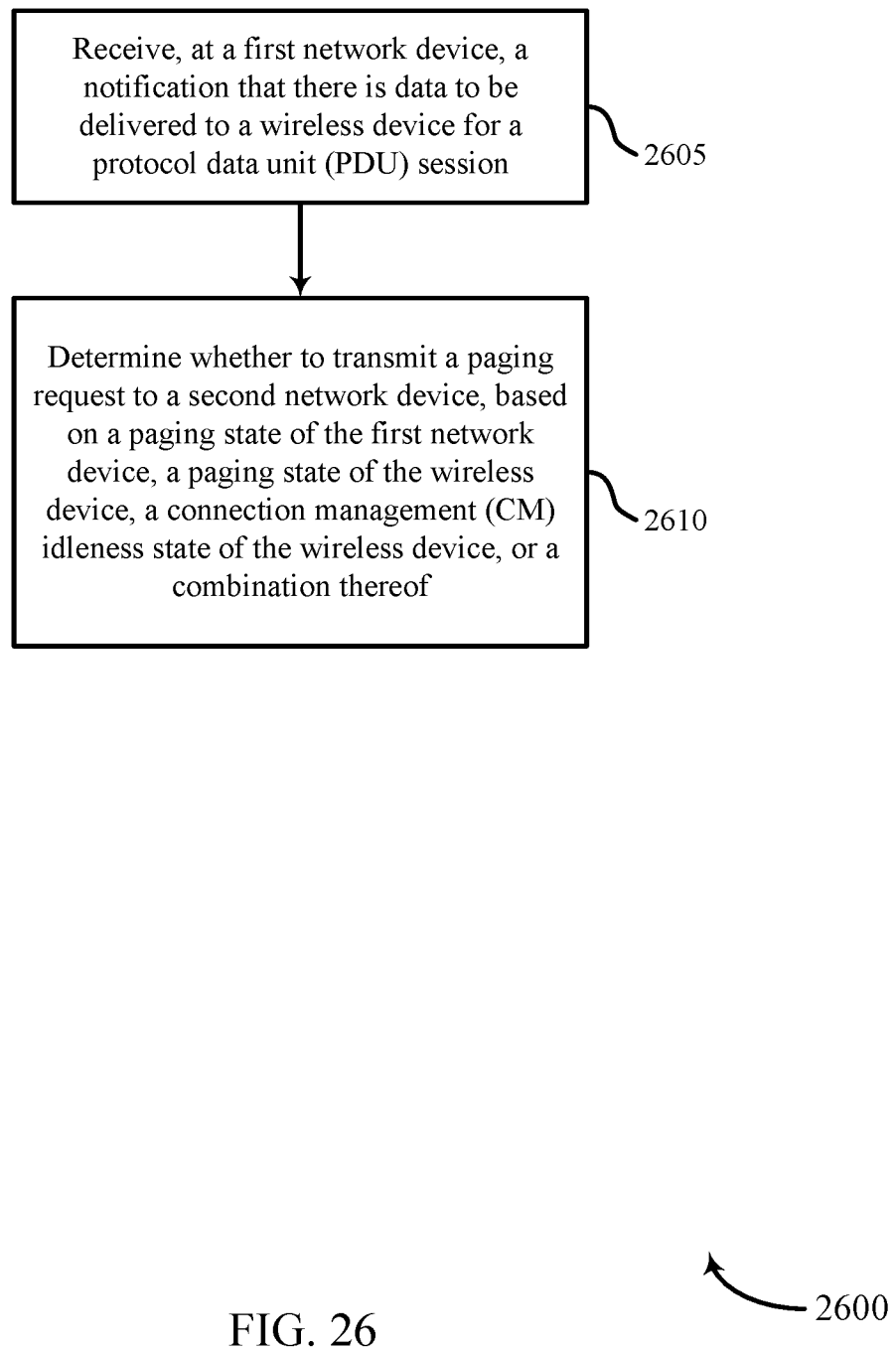

FIG. 26 shows a flowchart illustrating a method 2600 for mechanisms for establishing user plane connectivity for non-3GPP access in accordance with one or more aspects of the present disclosure. The operations of method 2600 may be implemented by a SMF 220 or its components as described herein. For example, the operations of method 2600 may be performed by a SMF communications manager as described with reference to FIGS. 16 through 19. In some examples, a SMF 220 may execute a set of codes to control the functional elements of the device to perform the functions described below. Additionally or alternatively, the SMF 220 may perform aspects of the functions described below using special-purpose hardware.

At block 2605 the SMF 220 may receive, at a first network device, a notification that there is data to be delivered to a wireless device for a PDU session. The operations of block 2605 may be performed according to the methods described with reference to FIGS. 1 through 11. In certain examples, aspects of the operations of block 2605 may be performed by a receiver as described with reference to FIGS. 16 through 19.

At block 2610 the SMF 220 may determine whether to transmit a paging request to a second network device, based at least in part on a paging state of the first network device, a paging state of the wireless device, a CM idleness state of the wireless device, or a combination thereof. The operations of block 2610 may be performed according to the methods described with reference to FIGS. 1 through 11. In certain examples, aspects of the operations of block 2610 may be performed by a paging request transmission determination unit as described with reference to FIGS. 16 through 19.

Figure 27:
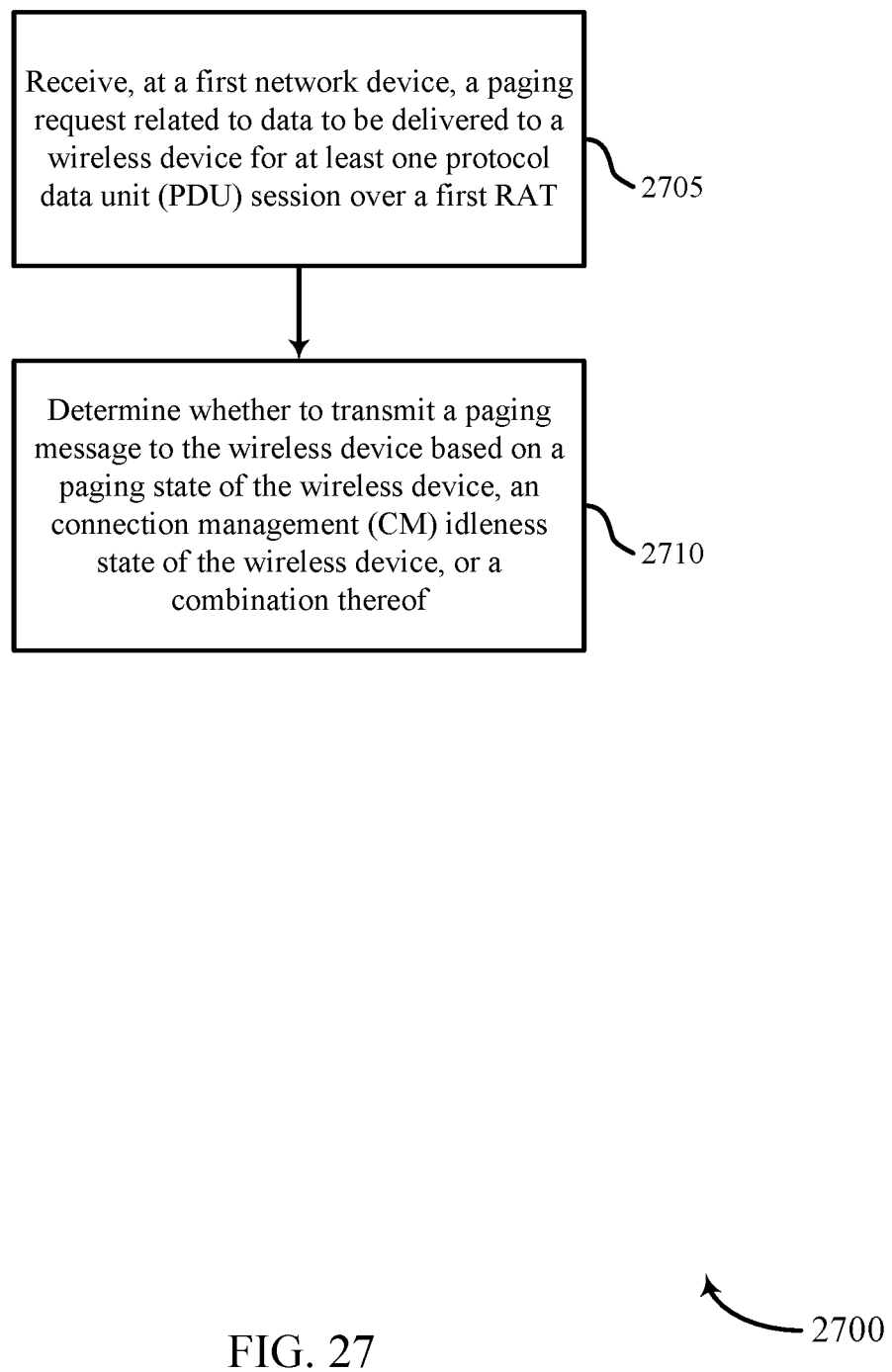

FIG. 27 shows a flowchart illustrating a method 2700 for mechanisms for establishing user plane connectivity for non-3GPP access in accordance with one or more aspects of the present disclosure. The operations of method 2700 may be implemented by an AMF 215 or its components as described herein. For example, the operations of method 2700 may be performed by a AMF communications manager as described with reference to FIGS. 20 through 23. In some examples, an AMF 215 may execute a set of codes to control the functional elements of the device to perform the functions described below. Additionally or alternatively, the AMF 215 may perform aspects of the functions described below using special-purpose hardware.

At block 2705 the AMF 215 may receive, at a first network device, a paging request related to data to be delivered to a wireless device for at least one PDU session over a first RAT. The operations of block 2705 may be performed according to the methods described with reference to FIGS. 1 through 11. In certain examples, aspects of the operations of block 2705 may be performed by a receiver as described with reference to FIGS. 20 through 23.

At block 2710 the AMF 215 may determine whether to transmit a paging message to the wireless device based at least in part on a paging state of the wireless device, an CM idleness state of the wireless device, or a combination thereof. The operations of block 2710 may be performed according to the methods described with reference to FIGS. 1 through 11. In certain examples, aspects of the operations of block 2710 may be performed by a paging message determination unit as described with reference to FIGS. 20 through 23.

It should be noted that the methods described above describe possible implementations, and that the operations may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, from a network by a user equipment (UE) in a connection management (CM) idle state for both a first radio access technology (RAT) and a second radio access technology (RAT), a paging request over the first RAT;
   generating a list of one or more protocol data unit (PDU) sessions based at least in part on one or more policies, the one or more policies indicating a user plane for one or more PDU sessions routed over the second RAT cannot be established over the first RAT;
   initiating a user plane establishment procedure in response to the paging request received from the network by the UE in the CM idle state for both the first RAT and the second RAT, comprising:
   in response to the paging request received from the network by the UE in the CM idle state for both the first RAT and the second RAT, transmitting a service request message over the first RAT, the service request message comprising the list of one or more PDU sessions, which was generated based at least in part on the one or more policies indicating the user plane for the one or more PDU sessions routed over the second RAT cannot be established over the first RAT.

2. The method of claim 1, wherein the service request message that comprises the list of one or more PDU sessions, which was generated based at least in part on the one or more policies indicating the user plane for the one or more PDU sessions routed over the second RAT cannot be established over the first RAT, is a Non-Access Stratum (NAS) service request.

3. An apparatus for wireless communication, comprising:
a processor,
memory coupled with the processor; and
instructions stored in the memory and executable by the processor to cause the apparatus to:
receive, from a network by a user equipment (UE) in a connection management (CM) idle state for both a first radio access technology (RAT) and a second radio access technology (RAT), a paging request over the first RAT;
generate a list of one or more protocol data unit (PDU) sessions based at least in part on one or more policies, the one or more policies indicating a user plane for one or more PDU sessions routed over the second RAT cannot be established over the first RAT; and
initiate a user plane establishment procedure in response to the paging request received from the network by the UE in the CM idle state for both the first RAT and the second RAT, comprising:
in response to the paging request received from the network by the UE in the CM idle state for both the first RAT and the second RAT, transmitting a service request message over the first RAT, the service request message comprising the list of one or more PDU sessions, which was generated based at least in part on the one or more policies indicating the user plane for the one or more PDU sessions routed over the second RAT cannot be established over the first RAT.

4. The apparatus of claim 3, wherein the service request message that comprises the list of one or more PDU sessions, which was generated based at least in part on the one or more policies indicating the user plane for the one or more PDU sessions routed over the second RAT cannot be established over the first RAT, is a Non-Access Stratum (NAS) service request.

5. An apparatus for wireless communication, comprising:
means for receiving, from a network by a user equipment (UE) in a connection management (CM) idle state for both a first radio access technology (RAT) and a second radio access technology (RAT), a paging request over the first RAT;
means for generating a list of one or more protocol data unit (PDU) sessions based at least in part on one or more policies, the one or more policies indicating a user plane for one or more PDU sessions routed over the second RAT cannot be established over the first RAT; and
means for initiating a user plane establishment procedure in response to the paging request received from the network by the UE in the CM idle state for both the first RAT and the second RAT, comprising:
means for, in response to the paging request received from the network by the UE in the CM idle state for both the first RAT and the second RAT, transmitting a service request message over the first RAT, the service request message comprising the list of one or more PDU sessions, which was generated based at least in part on the one or more policies indicating the user plane for the one or more PDU sessions routed over the second RAT cannot be established over the first RAT.

6. The apparatus of claim 5, wherein the service request message that comprises the list of one or more PDU sessions, which was generated based at least in part on the one or more policies indicating the user plane for the one or more PDU sessions routed over the second RAT cannot be established over the first RAT, is a Non-Access Stratum (NAS) service request.

7. A non-transitory computer-readable medium storing code for wireless communication, the code comprising instructions executable by a processor to:
receive, from a network by a user equipment (UE) in a connection management (CM) idle state for both a first radio access technology (RAT) and a second radio access technology (RAT), a paging request over the first RAT;
generate a list of one or more protocol data unit (PDU) sessions based at least in part on one or more policies, the one or more policies indicating a user plane for one or more PDU sessions routed over the second RAT cannot be established over the first RAT; and
initiate a user plane establishment procedure in response to the paging request received from the network by the UE in the CM idle state for both the first RAT and the second RAT, comprising:
in response to the paging request received from the network by the UE in the CM idle state for both the first RAT and the second RAT, transmitting a service request message over the first RAT, the service request message comprising the list of one or more PDU sessions, which was generated based at least in part on the one or more policies indicating the user plane for the one or more PDU sessions routed over the second RAT cannot be established over the first RAT.

8. The non-transitory computer-readable medium of claim 7, wherein the service request message that comprises the list of one or more PDU sessions, which was generated based at least in part on the one or more policies indicating the user plane for the one or more PDU sessions routed over the second RAT cannot be established over the first RAT, is a Non-Access Stratum (NAS) service request.

9. The method of claim 1, wherein the paging request received over the first RAT from the network by the UE in the CM idle state for both the first RAT and the second RAT, includes an access type identifier that identifies at least one radio access technology type associated with one or more PDU sessions for which the paging request was transmitted.

10. The method of claim 9, wherein the first RAT comprises a 3GPP radio access technology; and wherein the second RAT comprises a non-3GPP radio access technology.

11. The apparatus of claim 3, wherein the paging request received over the first RAT from the network by the UE in the CM idle state for both the first RAT and the second RAT, includes an access type identifier that identifies at least one radio access technology type associated with one or more PDU sessions for which the paging request was transmitted.

12. The apparatus of claim 11, wherein the first RAT comprises a 3GPP radio access technology; and wherein the second RAT comprises a non-3GPP radio access technology.

13. The apparatus of claim 5, wherein the paging request received over the first RAT from the network by the UE in the CM idle state for both the first RAT and the second RAT, includes an access type identifier that identifies at least one radio access technology type associated with one or more PDU sessions for which the paging request was transmitted.

14. The apparatus of claim 13, wherein the first RAT comprises a 3GPP radio access technology; and wherein the second RAT comprises a non-3GPP radio access technology.

15. The non-transitory computer-readable medium of claim 7, wherein the paging request received over the first RAT from the network by the UE in the CM idle state for both the first RAT and the second RAT, includes an access type identifier that identifies at least one radio access technology type associated with one or more PDU sessions for which the paging request was transmitted.

16. The non-transitory computer-readable medium of claim 15, wherein the first RAT comprises a 3GPP radio access technology; and wherein the second RAT comprises a non-3GPP radio access technology.

17. The method of claim 1, wherein the paging request received over the first RAT from the network by the UE in the CM idle state for both the first RAT and the second RAT, includes an access type identifier that identifies the second RAT as being associated with one or more PDU sessions for which the paging request was transmitted.

18. The apparatus of claim 3, wherein the paging request received over the first RAT from the network by the UE in the CM idle state for both the first RAT and the second RAT, includes an access type identifier that identifies the second RAT as being associated with one or more PDU sessions for which the paging request was transmitted.

19. The apparatus of claim 5, wherein the paging request received over the first RAT from the network by the UE in the CM idle state for both the first RAT and the second RAT, includes an access type identifier that identifies the second RAT as being associated with one or more PDU sessions for which the paging request was transmitted.

20. The non-transitory computer-readable medium of claim 7, wherein the paging request received over the first RAT from the network by the UE in the CM idle state for both the first RAT and the second RAT, includes an access type identifier that identifies the second RAT as being associated with one or more PDU sessions for which the paging request was transmitted.

21. The method of claim 1, wherein the paging request received over the first RAT from the network by the UE in the CM idle state for both the first RAT and the second RAT, includes an access type identifier that identifies the second RAT as being associated with one or more PDU sessions for which the paging request was transmitted;
wherein the first RAT comprises a 3GPP radio access technology; and
wherein the second RAT comprises a non-3GPP radio access technology.

22. The apparatus of claim 3, wherein the paging request received over the first RAT from the network by the UE in the CM idle state for both the first RAT and the second RAT, includes an access type identifier that identifies the second RAT as being associated with one or more PDU sessions for which the paging request was transmitted;
wherein the first RAT comprises a 3GPP radio access technology; and
wherein the second RAT comprises a non-3GPP radio access technology.

23. The apparatus of claim 5, wherein the paging request received over the first RAT from the network by the UE in the CM idle state for both the first RAT and the second RAT, includes an access type identifier that identifies the second RAT as being associated with one or more PDU sessions for which the paging request was transmitted;
wherein the first RAT comprises a 3GPP radio access technology; and
wherein the second RAT comprises a non-3GPP radio access technology.

24. The non-transitory computer-readable medium of claim 7, wherein the paging request received over the first RAT from the network by the UE in the CM idle state for both the first RAT and the second RAT, includes an access type identifier that identifies the second RAT as being associated with one or more PDU sessions for which the paging request was transmitted;
wherein the first RAT comprises a 3GPP radio access technology; and
wherein the second RAT comprises a non-3GPP radio access technology.

25. The method of claim 1, wherein the first RAT comprises a 3GPP radio access technology; and wherein the second RAT comprises a non-3GPP radio access technology.

26. The apparatus of claim 3, wherein the first RAT comprises a 3GPP radio access technology; and wherein the second RAT comprises a non-3GPP radio access technology.

27. The apparatus of claim 5, wherein the first RAT comprises a 3GPP radio access technology; and wherein the second RAT comprises a non-3GPP radio access technology.

28. The non-transitory computer-readable medium of claim 7, wherein the first RAT comprises a 3GPP radio access technology; and wherein the second RAT comprises a non-3GPP radio access technology.

* * * * *